US012619055B2

(12) United States Patent
Zhao et al.

(10) Patent No.: US 12,619,055 B2
(45) Date of Patent: May 5, 2026

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventors: Qinghua Zhao, Nara (JP); Takuya Imaoka, Kanagawa (JP); Katsu Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 663 days.

(21) Appl. No.: 17/748,636

(22) Filed: May 19, 2022

(65) Prior Publication Data

US 2022/0283412 A1 Sep. 8, 2022

Related U.S. Application Data

(63) Continuation of application No. PCT/JP2020/042917, filed on Nov. 18, 2020.

(30) Foreign Application Priority Data

Jan. 30, 2020 (JP) ................................. 2020-013668

(51) Int. Cl.
*G02B 15/14* (2006.01)
*G02B 13/16* (2006.01)
(Continued)

(52) U.S. Cl.
CPC ...... *G02B 15/144111* (2019.08); *G02B 13/16* (2013.01); *G03B 5/00* (2013.01); *H04N 23/55* (2023.01)

(58) Field of Classification Search
CPC ............ G02B 13/16; G02B 15/144111; G02B 13/12; G02B 13/0095; G02B 15/00;
(Continued)

(56) References Cited

U.S. PATENT DOCUMENTS

2010/0188553 A1* 7/2010 Mihara .......... G02B 15/144507
348/340
2017/0351070 A1 12/2017 Shiokawa
(Continued)

FOREIGN PATENT DOCUMENTS

CN 208818913 U 5/2019
EP 3282298 A1 * 2/2018 ......... G02B 13/0045
(Continued)

OTHER PUBLICATIONS

Gross et al. "Handbook of Optical Systems vol. 3: Aberration Theory and Correction of Optical Systems" Weinheim Germany, WILEY-VCH Verlag Gmbh & Co. KGaA, pp. 377-379 (Year: 2007).*

(Continued)

*Primary Examiner* — William R Alexander
*Assistant Examiner* — Alaina Marie Swanson
(74) *Attorney, Agent, or Firm* — Wenderoth, Lind & Ponack, L.L.P.

(57) ABSTRACT

The present disclosure is directed to an optical system internally having an intermediate imaging position that is conjugate to a magnification conjugate point on a magnification side and a reduction conjugate point on a reduction side, respectively, the optical system including: a magnification optical system having a plurality of lens elements, positioned on the magnification side with respect to the intermediate imaging position; and a relay optical system having a plurality of lens elements, positioned on the reduction side with respect to the intermediate imaging position, wherein a first lens element located closest to the magnification side among the plurality of lens elements in magnification optical system is an aspherical lens having a negative power, the optical system satisfies the conditions (1) to (3).

14 Claims, 22 Drawing Sheets

(51) Int. Cl.
  G03B 5/00          (2021.01)
  H04N 23/55         (2023.01)

(58) Field of Classification Search
  CPC ........ G02B 15/144; H04N 5/74; H04N 23/55;
            G03B 5/00; G03B 21/16
  USPC ........................................................ 359/676
  See application file for complete search history.

(56)                References Cited

U.S. PATENT DOCUMENTS

| | | | | |
|---|---|---|---|---|
| 2018/0284408 A1* | 10/2018 | Imaoka | .............. | G02B 27/0025 |
| 2019/0094533 A1 | 3/2019 | Nagatoshi et al. | | |
| 2019/0306390 A1 | 10/2019 | Nagatoshi et al. | | |

FOREIGN PATENT DOCUMENTS

| | | | | | |
|---|---|---|---|---|---|
| JP | 2006308890 A | * | 11/2006 | .............. | G02B 1/00 |
| JP | 2006-330410 | | 12/2006 | | |
| JP | 2010085732 A | * | 4/2010 | | |
| JP | 2014021309 A | * | 2/2014 | | |
| JP | 2014095754 A | * | 5/2014 | .......... | G02B 15/173 |
| JP | 2016143032 A | * | 8/2016 | | |
| JP | 2017-215503 | | 12/2017 | | |
| JP | 2018-169609 A | | 11/2018 | | |
| JP | 2019-174633 | | 10/2019 | | |

OTHER PUBLICATIONS

International Search Report issued Jan. 26, 2021 in International Application No. PCT/JP2020/042917, with English translation.
Translation of the International Preliminary Report on Patentability issued Aug. 11, 2022 in corresponding International Application No. PCT/JP2020/042917.
Office Action issued Jan. 25, 2025 in corresponding Chinese Patent Application No. 202080090702.7, with English machine translation, 18 pages.
2nd Chinese Office Action and Chinese Search Report issued Jul. 9, 2025 in corresponding Chinese Patent Application No. 202080090702.7 with English machine translation of 2nd Chinese Office Action and English human translation of 2nd Chinese Office Action (Partial) and Chinese Search Report, 21 pages.

* cited by examiner

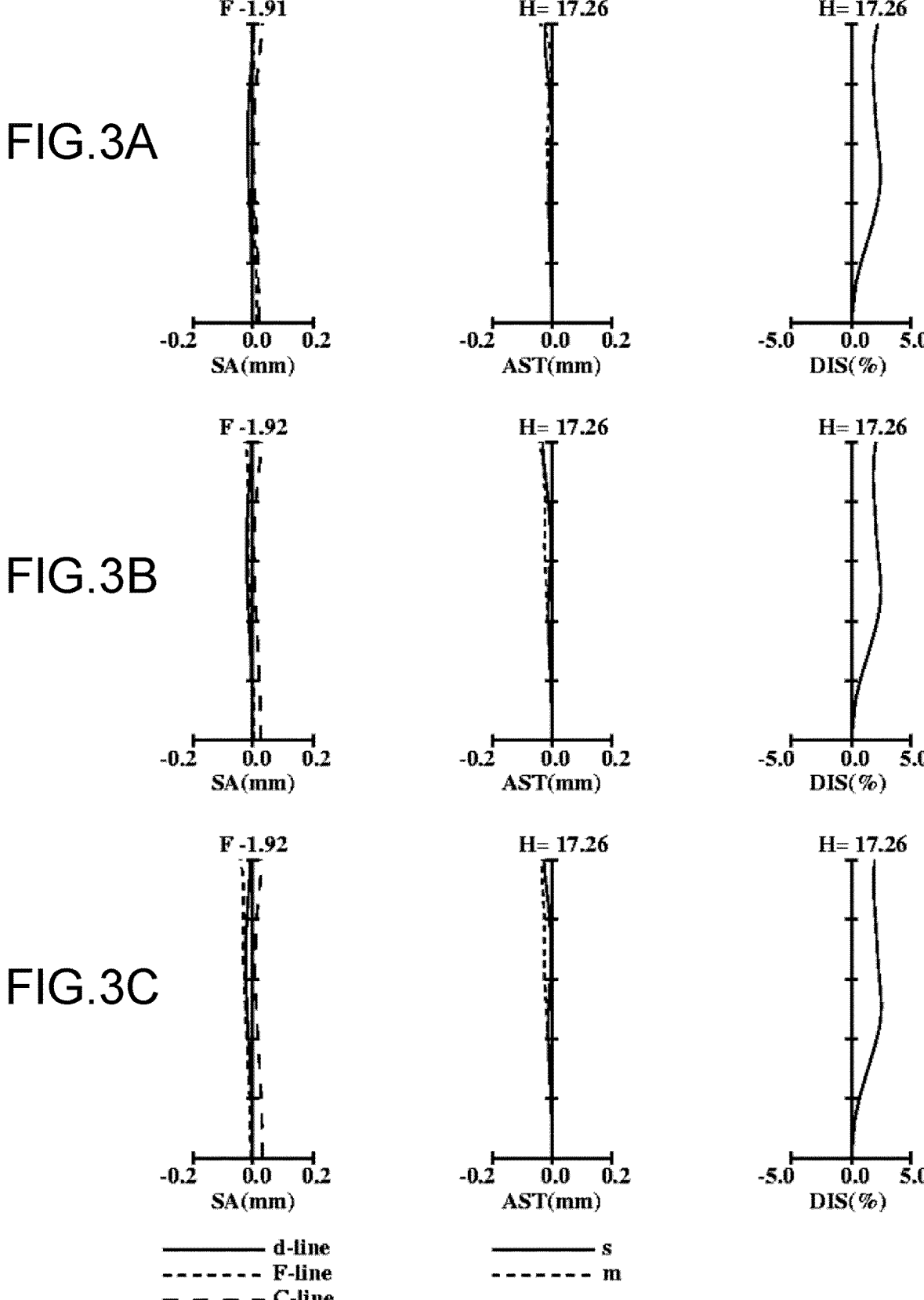

AST(mm)
-0.2    0.0    0.2

H= 17.26

DIS(%)
-5.0    0.0    5.0

AST(mm)
-0.2    0.0    0.2

H= 17.26

DIS(%)
-5.0    0.0    5.0

AST(mm)
-0.2    0.0    0.2

H= 17.26

DIS(%)
-5.0    0.0    5.0 d-line
F-line
C-line s
m

-0.2 0.0 0.2
AST(mm)

H= 17.26

-5.0 0.0 5.0
DIS(%)

-0.2 0.0 0.2
AST(mm)

H= 17.26

-5.0 0.0 5.0
DIS(%)

-0.2 0.0 0.2
AST(mm)

H= 17.26

-5.0 0.0 5.0
DIS(%)

———— d-line
- - - - - F-line
— — — — C-line

———— s
- - - - - - m

OPTICAL SYSTEM, IMAGE PROJECTION APPARATUS, AND IMAGING APPARATUS

CROSS-REFERENCE OF RELATED APPLICATIONS

This application is a continuation of International Patent Application No. PCT/JP2020/042917, filed on Nov. 18, 2020, which claims the benefit of Japanese Patent Application No. 2020-013668, filed on Jan. 30, 2020, the contents all of which are incorporated herein by reference.

TECHNICAL FIELD

The present disclosure relates to an optical system that forms an intermediate image. The present disclosure also relates to an image projection apparatus and an imaging apparatus using such an optical system.

BACKGROUND

Intermediate imaging-based optical systems have an advantage of achieving wide-angle projection with a short focal length and a wide screen, while the total length of the optical system tends to be increased, thereby rendering the optical system heavier. When attaching a portion of the optical system to an outside of a hosing of an image projection apparatus body, a moment acting on the center of gravity may cause the optical system to tilt relative to the apparatus body, thereby possibly degrading the optical performance.

In order to reduce a weight of the optical system, it may be conceived that a lens made of a synthetic resin is used in lieu of a lens made of glass. Such a synthetic resin has a smaller specific gravity, a smaller thermal conductivity and a larger coefficient of linear expansion as compared to glass. Thus, the optical system can be lightweight. However if local temperature elevation and thermal deformation take place, some optical aberrations, in particular, chromatic aberration tends to be increased. This tendency is more remarkable in case of high-intensity projection.

Patent Document 1 discloses a wide-angle imaging optical system, wherein the first lens L1a positioned closest to the magnification conjugate point has the largest diameter. The first lens L1a has aspherical double surfaces with quite complicated shapes, hence, it could be imagined to use a synthetic resin lens. However, such complicated aspherical shapes tend to be sensitive to thermal deformation. Therefore, it is expected that optical aberrations may be significantly degraded due to temperature elevation.

PATENT DOCUMENT

[Patent Document 1] JP 2019-174633 A

SUMMARY

The present disclosure provides an optical system that can reduce a moment acting on the center of gravity and mitigate thermal effect. The present disclosure also provides an image projection apparatus and an imaging apparatus using such an optical system.

One aspect of the present disclosure is directed to an optical system internally having an intermediate imaging position that is conjugate to a magnification conjugate point on a magnification side and a reduction conjugate point on a reduction side, respectively, the optical system comprising:

a magnification optical system having a plurality of lens elements, positioned on the magnification side with respect to the intermediate imaging position; and a relay optical system having a plurality of lens elements, positioned on the reduction side with respect to the intermediate imaging position, wherein a first lens element located closest to the magnification side among the plurality of lens elements in magnification optical system is an aspherical lens having a negative power, the optical system satisfies the following conditions (1) to (3):

$$0.0055 < \Delta pgfn < 0.030 \tag{1}$$

$$53 < vdn < 58 \tag{2}$$

$$0.28 < fp/fr < 1.0 \tag{3}$$

where, $\Delta pgfn = (ngn - nfn)/(nfn - ncn) - (-2.20599 \times 10^{-3} \cdot vdn + 6.69612 \times 10^{-1})$, vdn is an Abbe number of the first lens element, ngn is a refractive index of the first lens element for a g-line, nfn is a refractive index of the first lens element for an F-line, ncn is a refractive index of the first lens element for a C-line, fp is a focal length of the magnification optical system, and fr is a focal length of the relay optical system at a wide-angle end.

Further, an image projection apparatus according to the present disclosure includes the above-described optical system and an image forming element that generates an image to be projected through the optical system onto a screen.

Still further, an imaging apparatus according to the present disclosure includes the above-described optical system and an imaging element that receives an optical image formed by the optical system to convert the optical image into an electrical image signal.

The optical system according to the present disclosure can reduce a moment acting on the center of gravity and mitigate thermal effect. Therefore, even in case of intense light passing through the lens elements, such as, high-intensity projection, the optical performance can be maintained.

BRIEF DESCRIPTION OF THE DRAWINGS

FIGS. 3A-3C are longitudinal aberrations diagram of the zoom lens system of example 1 for an object distance of 1066 mm.

Figure 4:
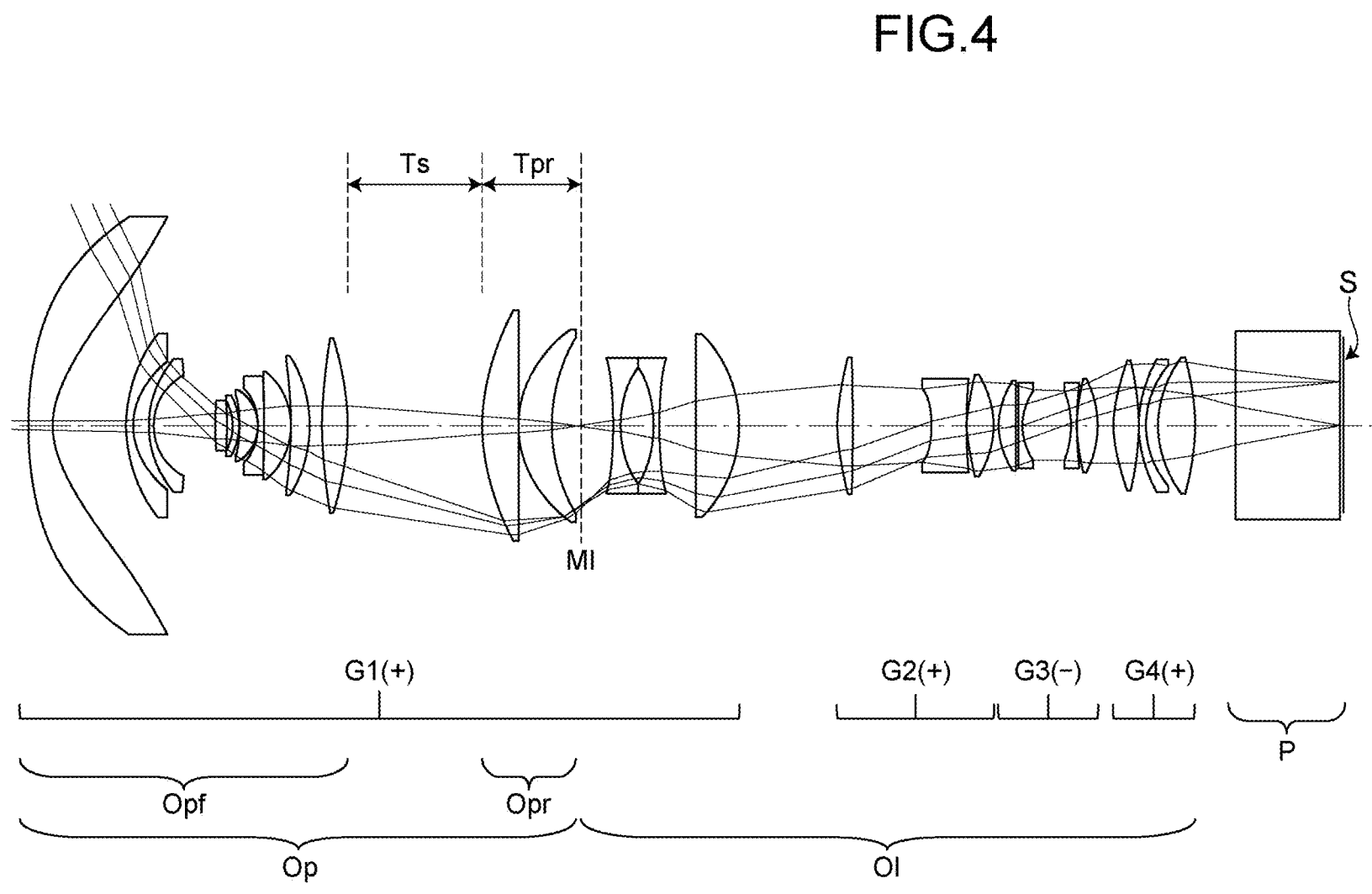

FIG. 4 is a layout diagram showing an optical path at a wide-angle end in a zoom lens system of example 2 for an object distance of 1066 mm.

Figure 7:
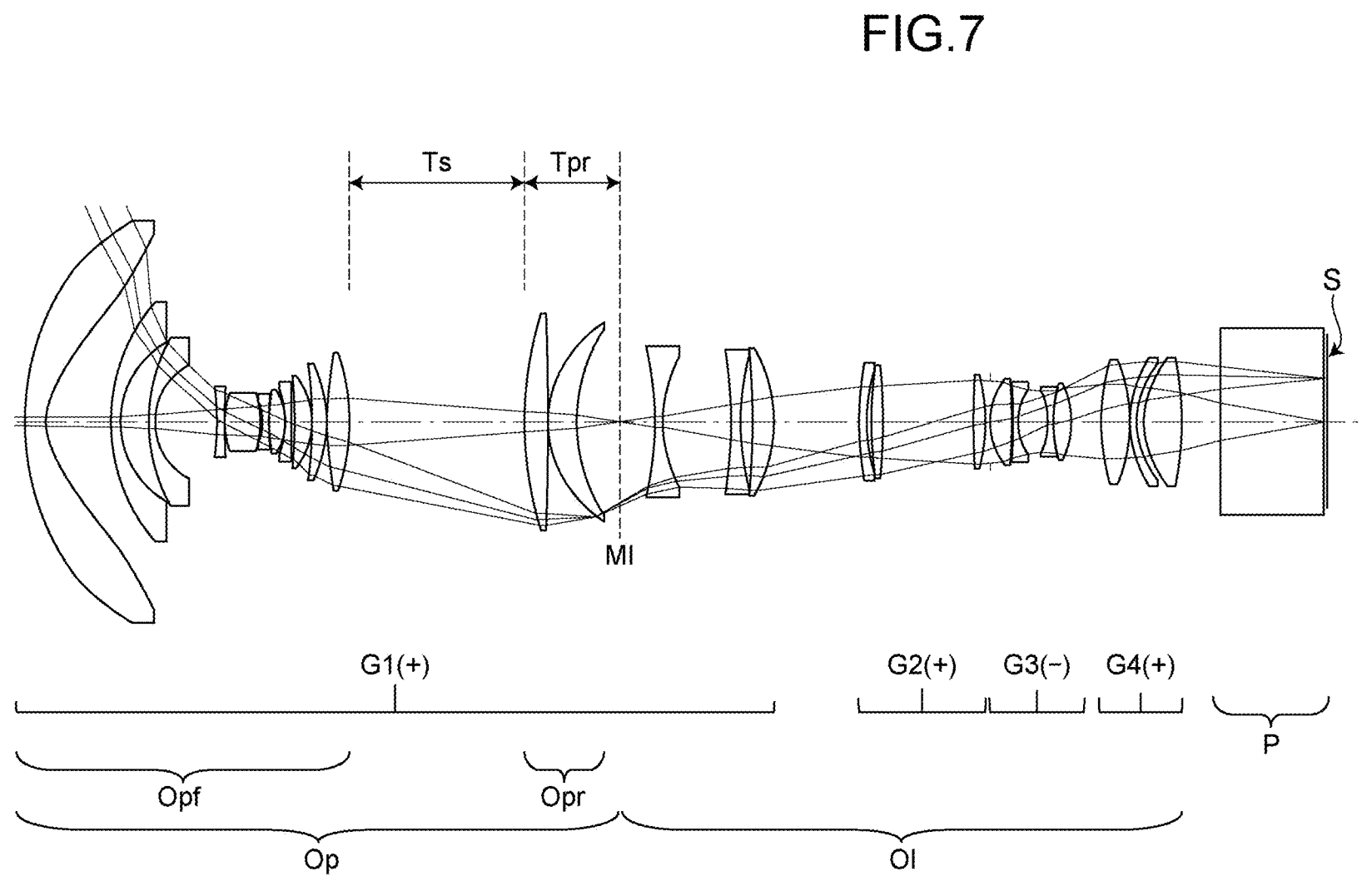

FIG. 7 is a layout diagram showing an optical path at a wide-angle end in a zoom lens system of example 3 for an object distance of 1066 mm.

Figures 15A, 15B, 15C:
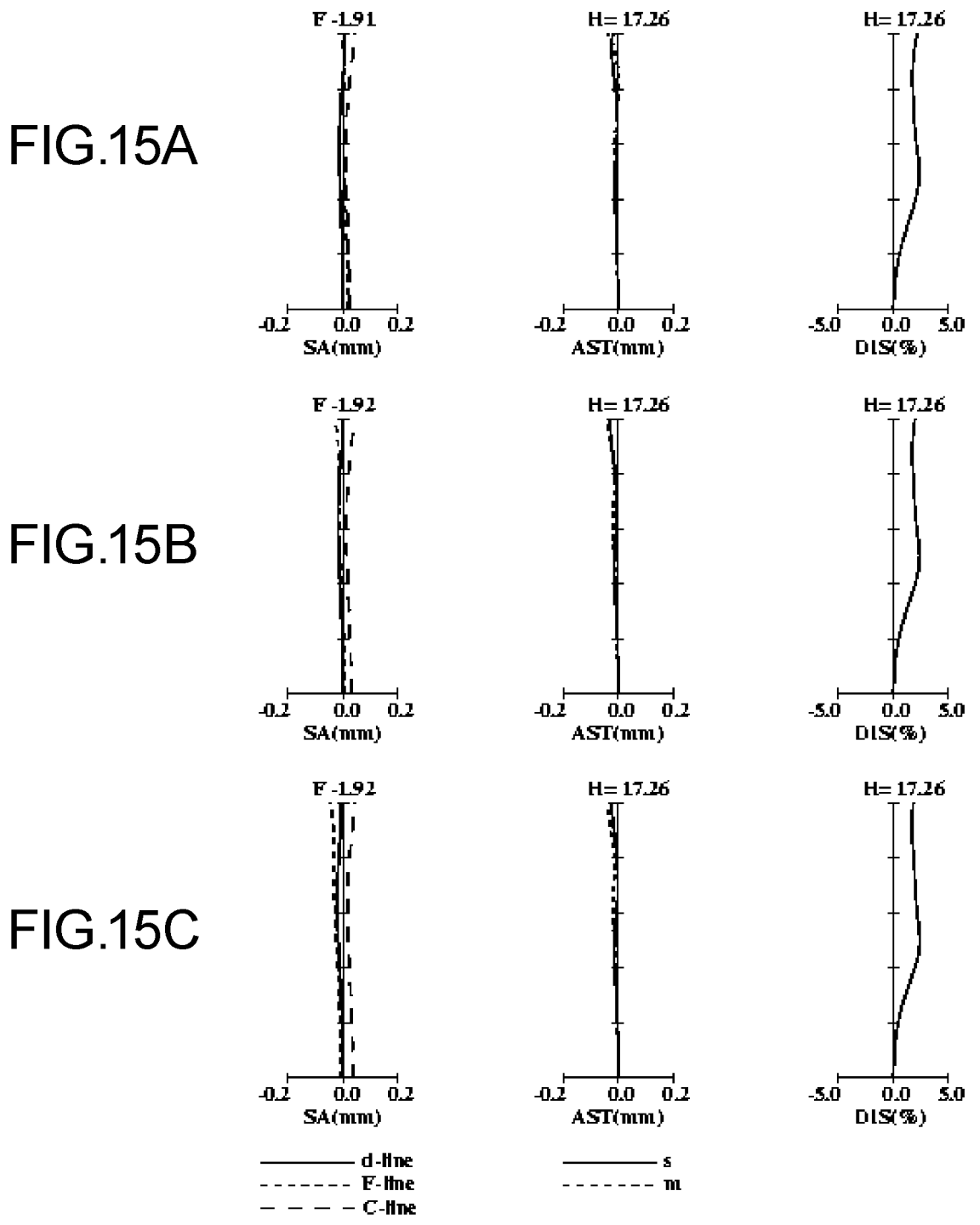

FIGS. 15A-15C are longitudinal aberration diagrams of the zoom lens system of example 5 for an object distance of 1066 mm.

Figures 21A, 21B, 21C:
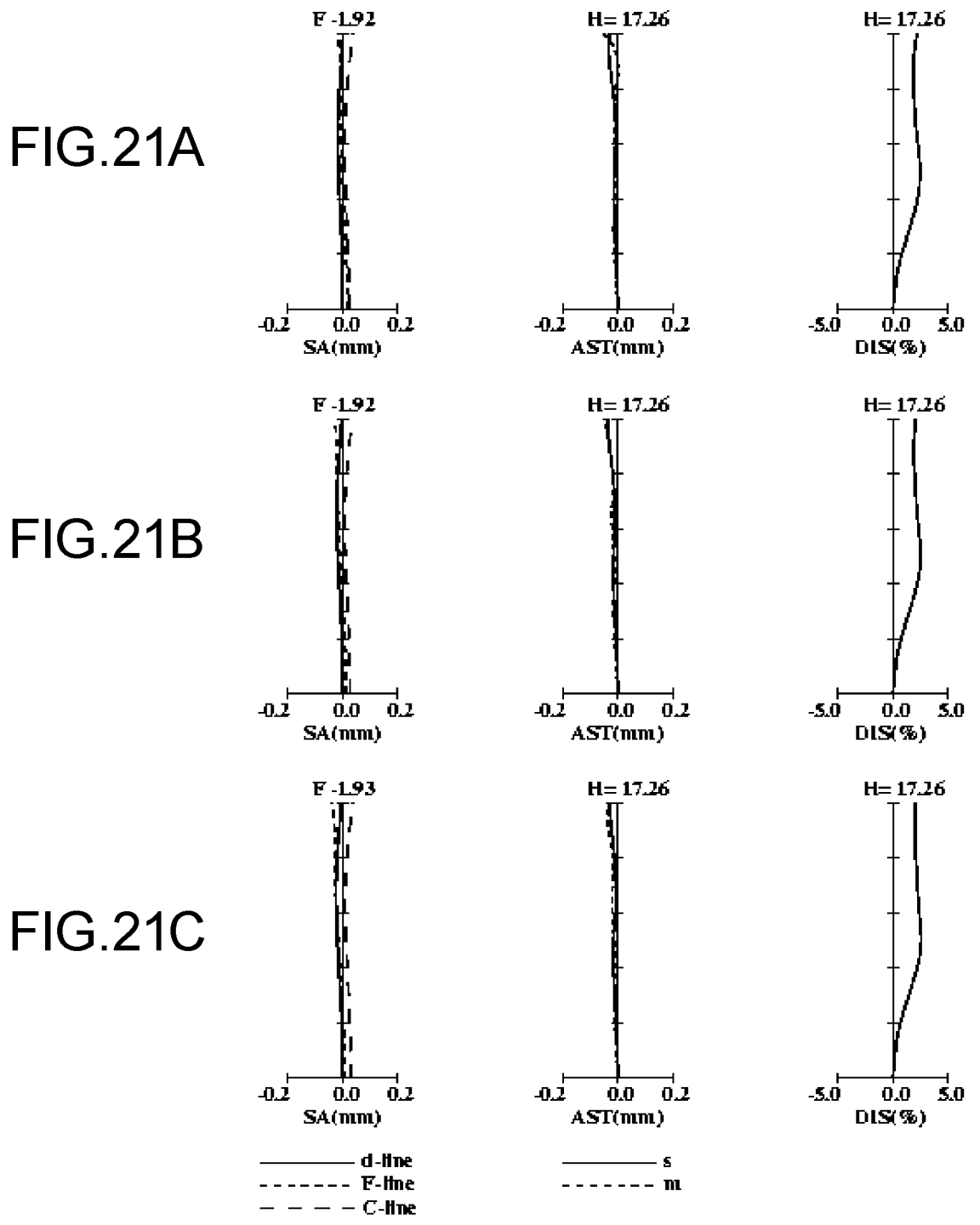

FIGS. 21A-21C are longitudinal aberration diagrams of the zoom lens system of example 7 for an object distance of 1066 mm.

DESCRIPTION OF EMBODIMENT

Figure 1:
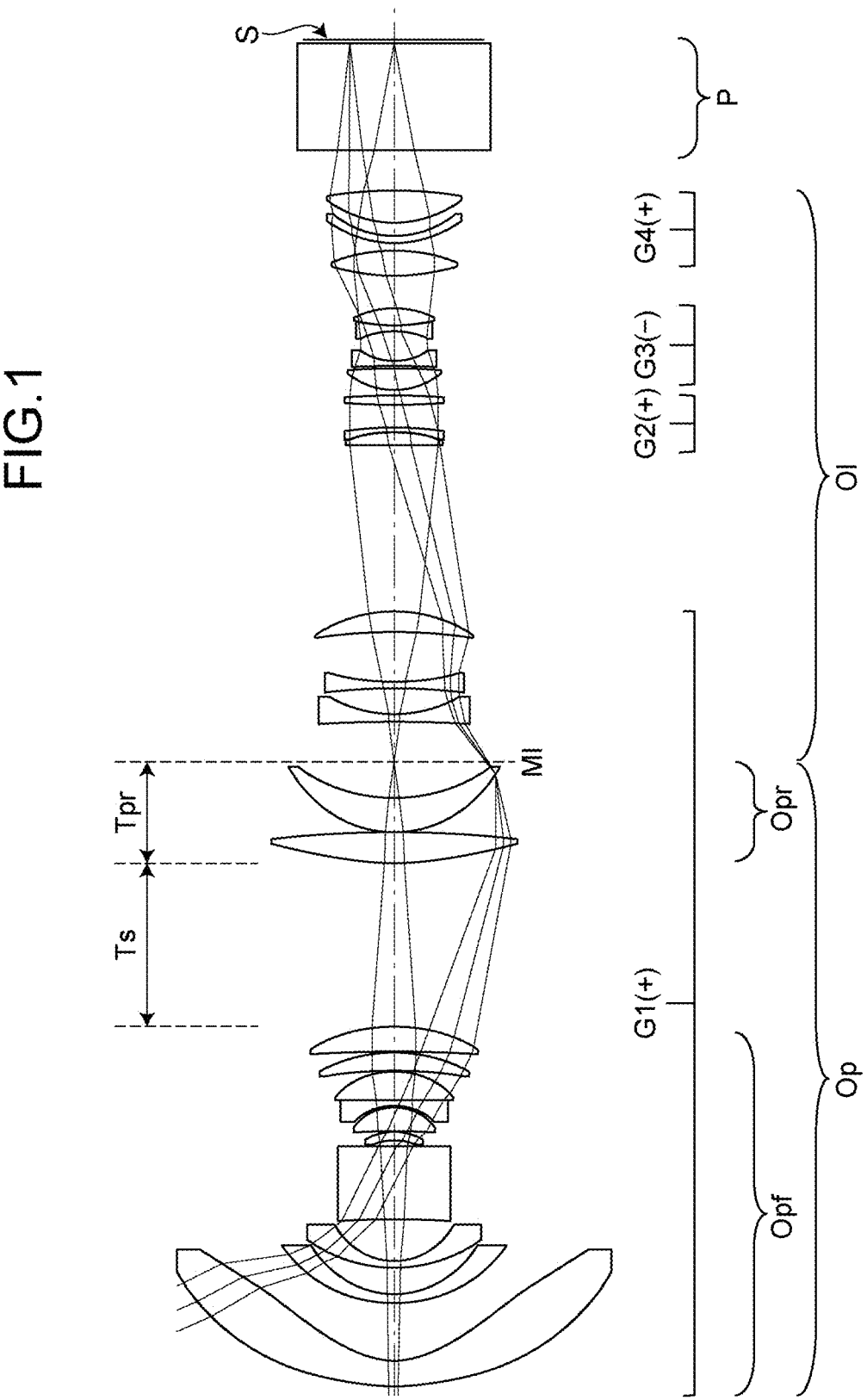
FIG. 1 is a layout diagram showing an optical path at a wide-angle end in a zoom lens system of example 1 for an object distance of 1066 mm.

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image S obtained by spatially modulating incident light using an image forming element, such as liquid crystal or digital micromirror device (DMD), based on an image signal. In other words, the optical system according to the present disclosure can be used for magnifying the original image S on the image forming element arranged on the reduction side to project the image onto the screen (not shown), which is arranged on an extension line on the magnification side.

Further, the optical system according to the present disclosure can also be used for collecting light emitted from an object located on the extension line on the magnification side to form an optical image of the object on an imaging surface of an imaging element arranged on the reduction side.

First Embodiment

Hereinafter, a first embodiment of the present disclosure is described with reference to FIGS. 1 to 21. Here, a zoom lens system is described as an example of the optical system.

FIGS. 1, 4, 7, 10, 13, 16 and 19 are layout diagrams each showing an optical path at a wide-angle end in a zoom lens system according to any of examples 1 to 7 for an object distance of 1066 mm. FIGS. 2A-2C, 5A-5C, 8A-8C, 11A-11C, 14A-14C, 17A-17C and 20A-20C are layout drawings of the zoom lens system according to examples 1 to 7 for an object distance of 1066 mm. FIGS. 2A, 5A, 8A, 11A, 14A, 17A and 20A are lens arrangement diagrams at the wide-angle end in the zoom lens system. FIGS. 2B, 5B, 8B, 11B, 14B, 17B and 20B are lens arrangement diagrams at an intermediate position in the zoom lens system. FIGS. 2C, 5C, 8C, 11C, 14C, 17C and 20C are lens arrangement diagrams at a telephoto end in the zoom lens system.

The wide-angle end is defined as the shortest focal length state in which the entire optical system has the shortest focal length fw. The intermediate position is defined as an intermediate focal length state between the wide-angle end and the telephoto end. The telephoto end is defined as the longest focal length state in which the entire optical system has the longest focal length ft. By using the focal length fw at the wide-angle end and the focal length ft at the telephoto end, the focal length fm at the intermediate position can be defined as $fm = \sqrt{(fw \times ft)}$ ($\sqrt{}$: square root).

The zoom lens system according to example 1 includes a first lens group G1 to a fourth lens group G4 and an optical element P. The first lens group G1 having a positive power is constituted of a first lens element L1 to a 15th lens element L15, including a surface 1 to a surface 30 (see the numerical examples described later). The second lens group G2 having a positive power is constituted of a 16th lens element L16 to a 18th lens element L18, including a surface 31 to a surface 36. The third lens group G3 having a negative power is constituted of a 19th lens element L19 to a 22nd lens element L22, including a surface 37 to a surface 45. The fourth lens group G4 having a positive power is constituted of a 23rd lens element L23 to a 25th lens element L25, including a surface 46 to a surface 51. The optical element P includes a surface 52 to a surface 53.

The zoom lens system according to example 2 includes a first lens group G1 to a fourth lens group G4 and an optical element P, which is similar to example 1, thus redundant descriptions thereof is omitted.

The zoom lens system according to example 3 includes a first lens group G1 to a fourth lens group G4 and an optical element P. The first lens group G1 having a positive power is constituted of a first lens element L1 to a 16th lens element L16, including a surface 1 to a surface 32 (see the numerical examples described later). The second lens group G2 having a positive power is constituted of a 17th lens element L17 to a 19th lens element L19, including a surface 33 to a surface 38. The third lens group G3 having a negative power is constituted of a 20th lens element L20 to a 23rd lens element L23, including a surface 39 to a surface 47. The fourth lens group G4 having a positive power is constituted of a 24th lens element L24 to a 26th lens element L26, including a surface 48 to a surface 53. The optical element P includes a surface 54 to a surface 55.

Polygonal line arrows shown between each of FIGS. 2A, 5A, 8A, 11A, 14A, 17A and 20A and each of FIGS. 2B, 5B, 8B, 11B, 14B, 17B and 20B include straight lines obtained by connecting the positions of the first lens group G1 to the fourth lens group G4 corresponding to each of the states of the wide-angle end, the intermediate position, and the telephoto end ranked in order from the top in the drawing. The wide-angle end and the intermediate position, and the intermediate position and the telephoto end are simply connected by a straight line, which is different from the actual movement of each of the lens groups G1 to G4. The symbols (+) and (−) attached to the reference numerals of the respective lens groups G1 to G4 indicate the positive or negative power of each of the lens groups G1 to G4.

The zoom lens systems according to examples 1 to 7 may include a focusing adjustment lens group that adjusts the focus when an object distance is changed, and a field curvature correction lens group that corrects the field curvature aberration after focus adjustment by the focusing adjustment lens group.

In each of the drawings, an imaging position on the magnification side (i.e., the magnification conjugate point) is located on the left side, and an imaging position on the reduction side (i.e., the reduction conjugate point) is located on the right side. Further, in each of the drawings, the straight line drawn closest to the reduction side represents a position of the original image S, and an optical element P is located on the magnification side of the original image S. The optical element P represents different optical elements, such as a prism for color separation and color synthesis, an optical filter, a flat-parallel glass plate, a crystal low-pass filter, and an infrared cut filter.

The zoom lens system according to each of examples 1 to 7 internally has an intermediate imaging position MI that is conjugated to the magnification conjugate point on the magnification side and the reduction conjugate point on the reduction side, respectively. Further, in each of the drawings, a magnification optical system Op is positioned on the magnification side with respect to the intermediate imaging position MI, and a relay optical system Ol is positioned on the reduction side with respect to the intermediate imaging position MI.

Figures 2A, 2B, 2C:
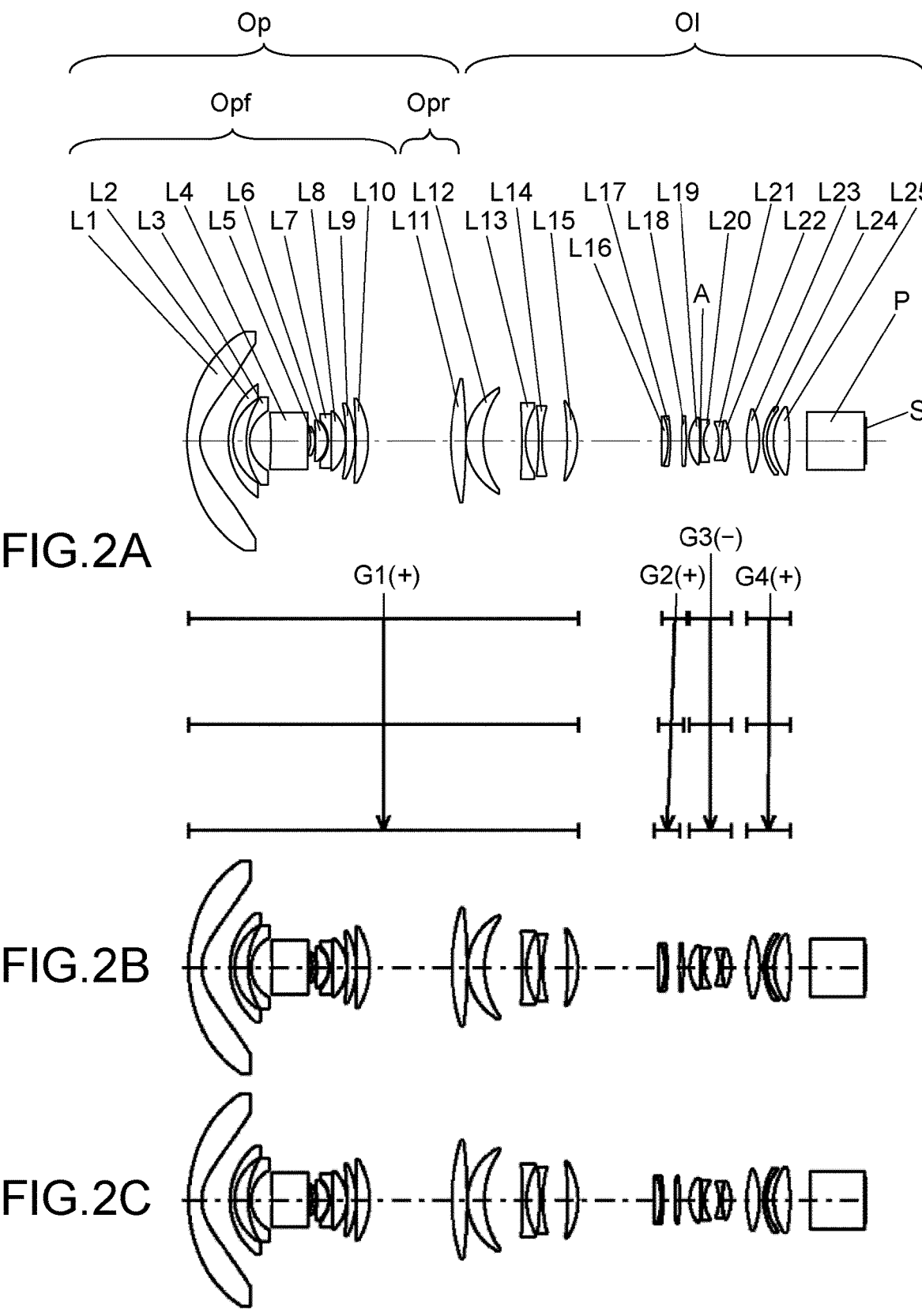
FIGS. 2A-2C are layout diagrams of the zoom lens system of example 1 for an object distance of 1066 mm.
Figures 5A, 5B, 5C:
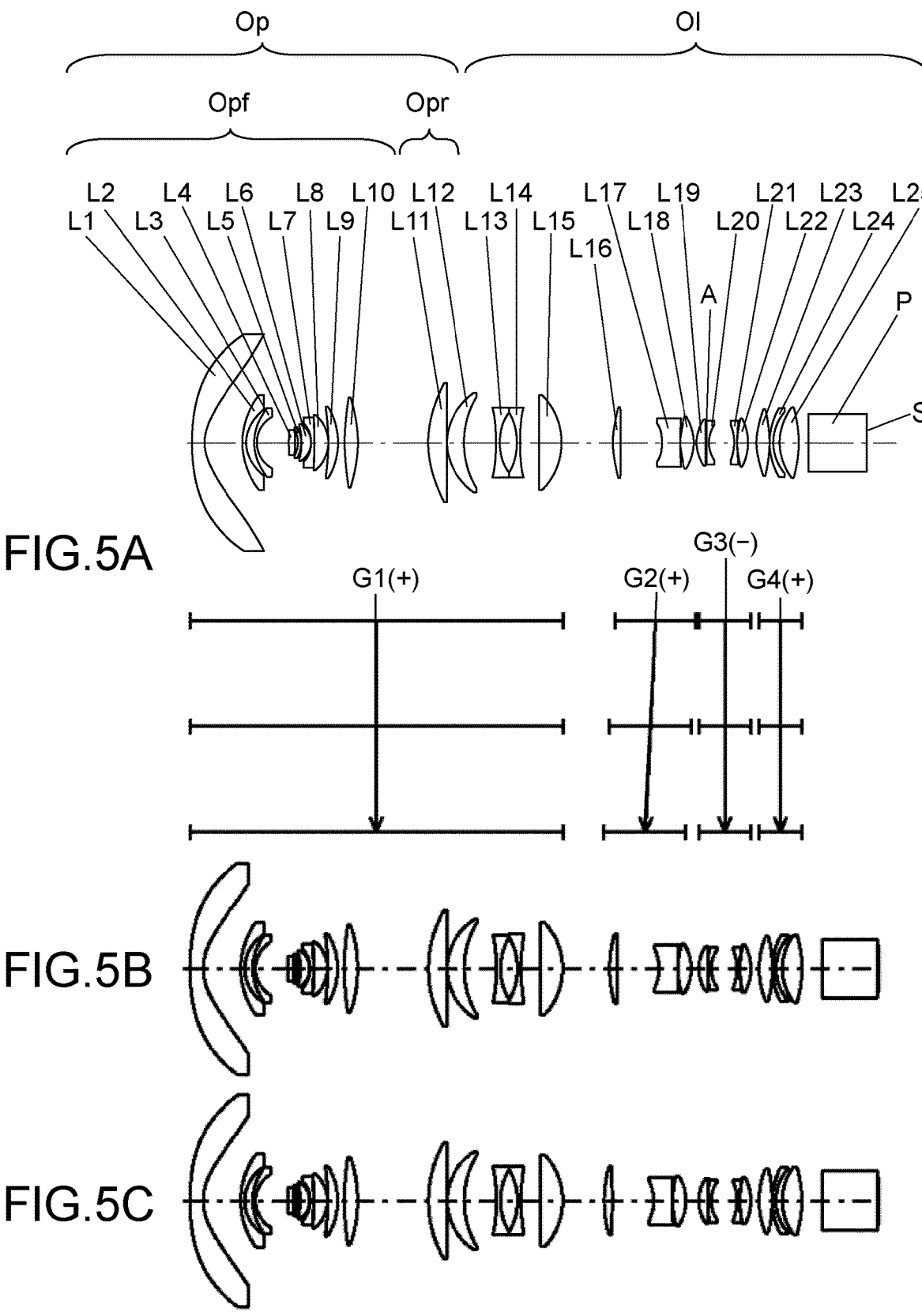
FIGS. 5A-5C are layout diagrams of the zoom lens system of example 2 for an object distance of 1066 mm.
Figures 6A, 6B, 6C:
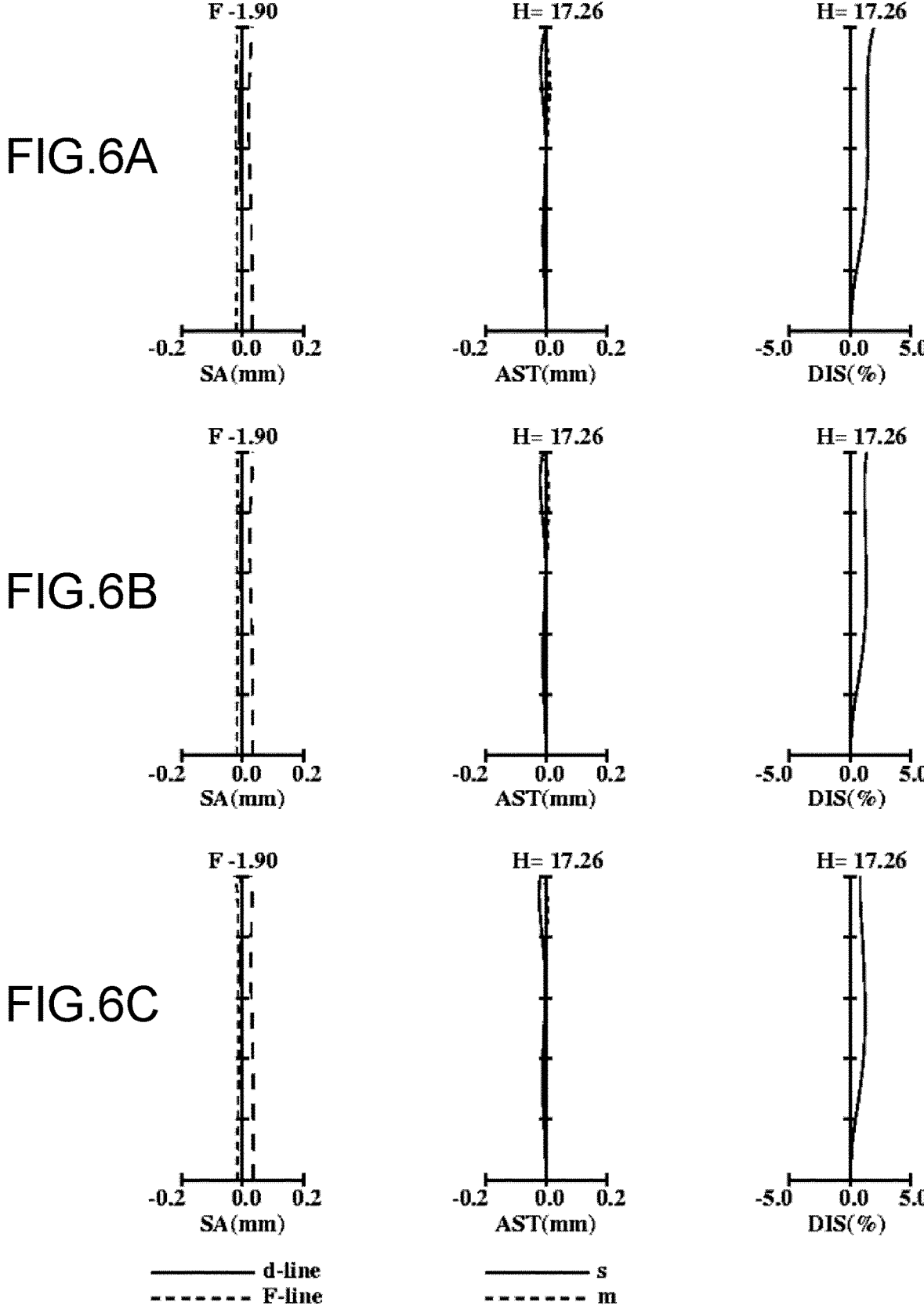
FIGS. 6A-6C are a longitudinal aberration diagrams of the zoom lens system of example 2 for an object distance of 1066 mm.
Figures 8A, 8B, 8C:
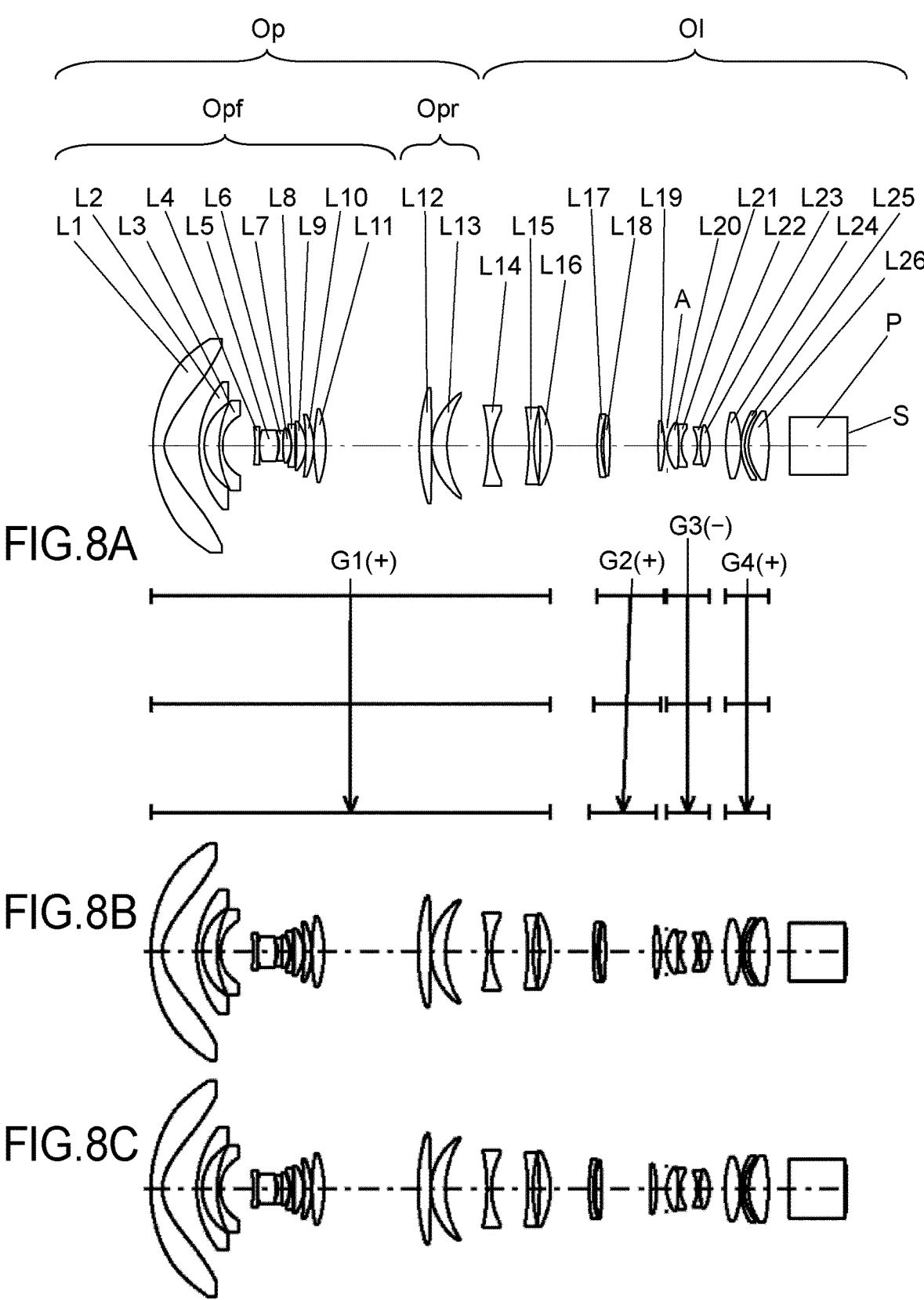
FIGS. 8A-8C are layout diagrams of the zoom lens system of example 3 for an object distance of 1066 mm.
Figures 9A, 9B, 9C:
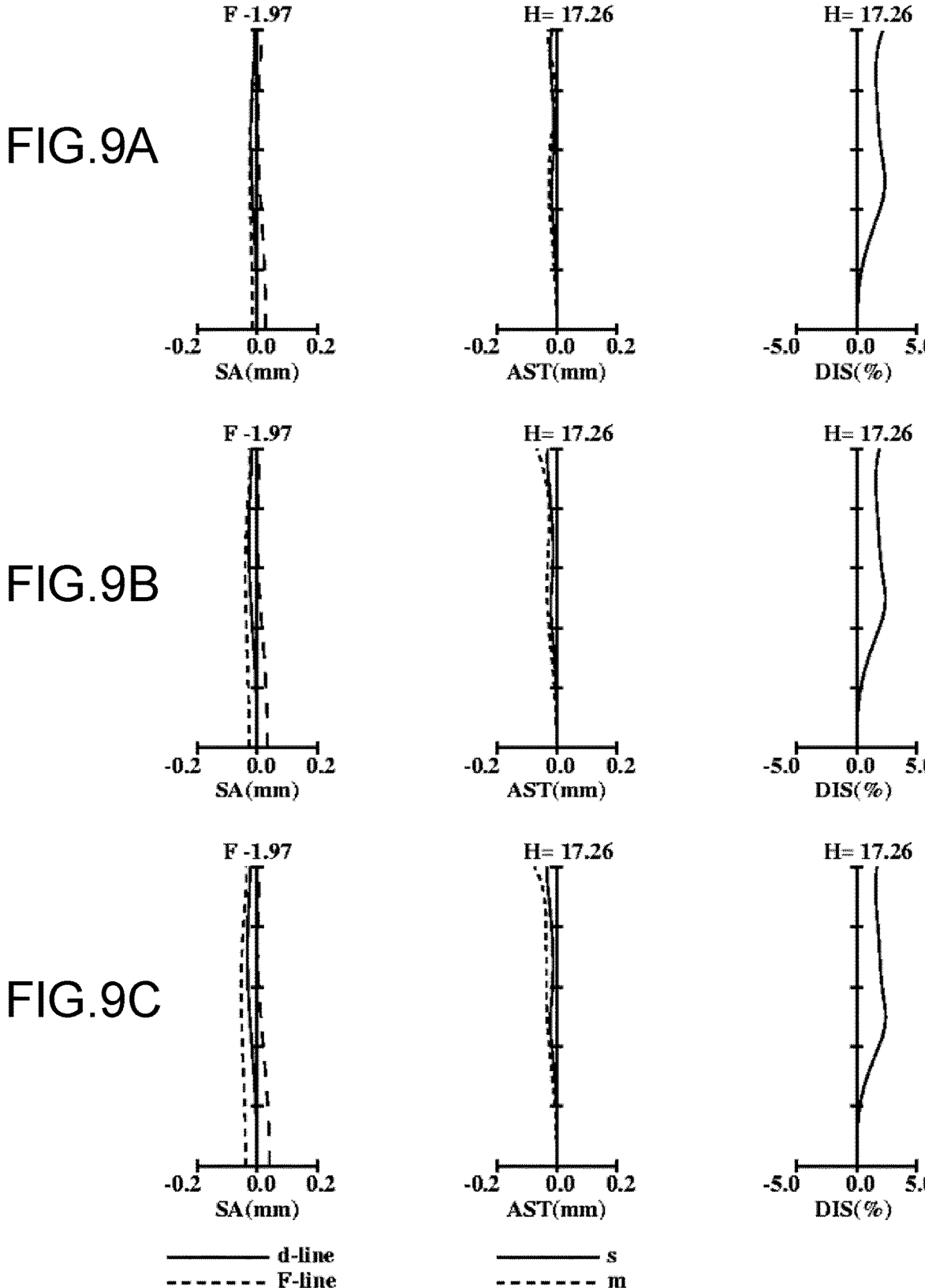
FIGS. 9A-9C are longitudinal aberration diagrams of the zoom lens system of example 3 for an object distance of 1066 mm.
Figure 10:
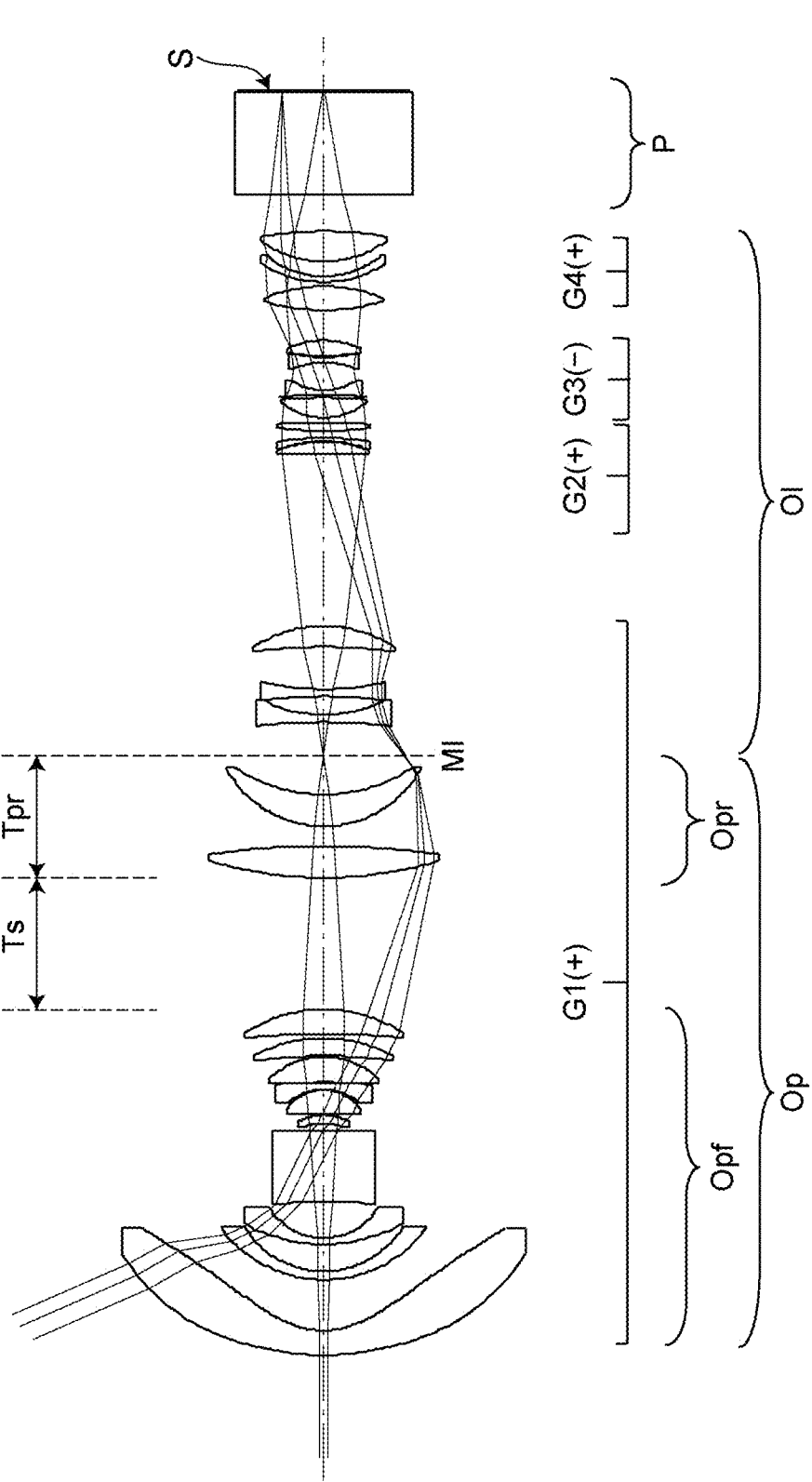
FIG. 10 is a layout diagram showing an optical path at a wide-angle end in a zoom lens system of example 4 for an object distance of 1066 mm.
Figures 11A, 11B, 11C:
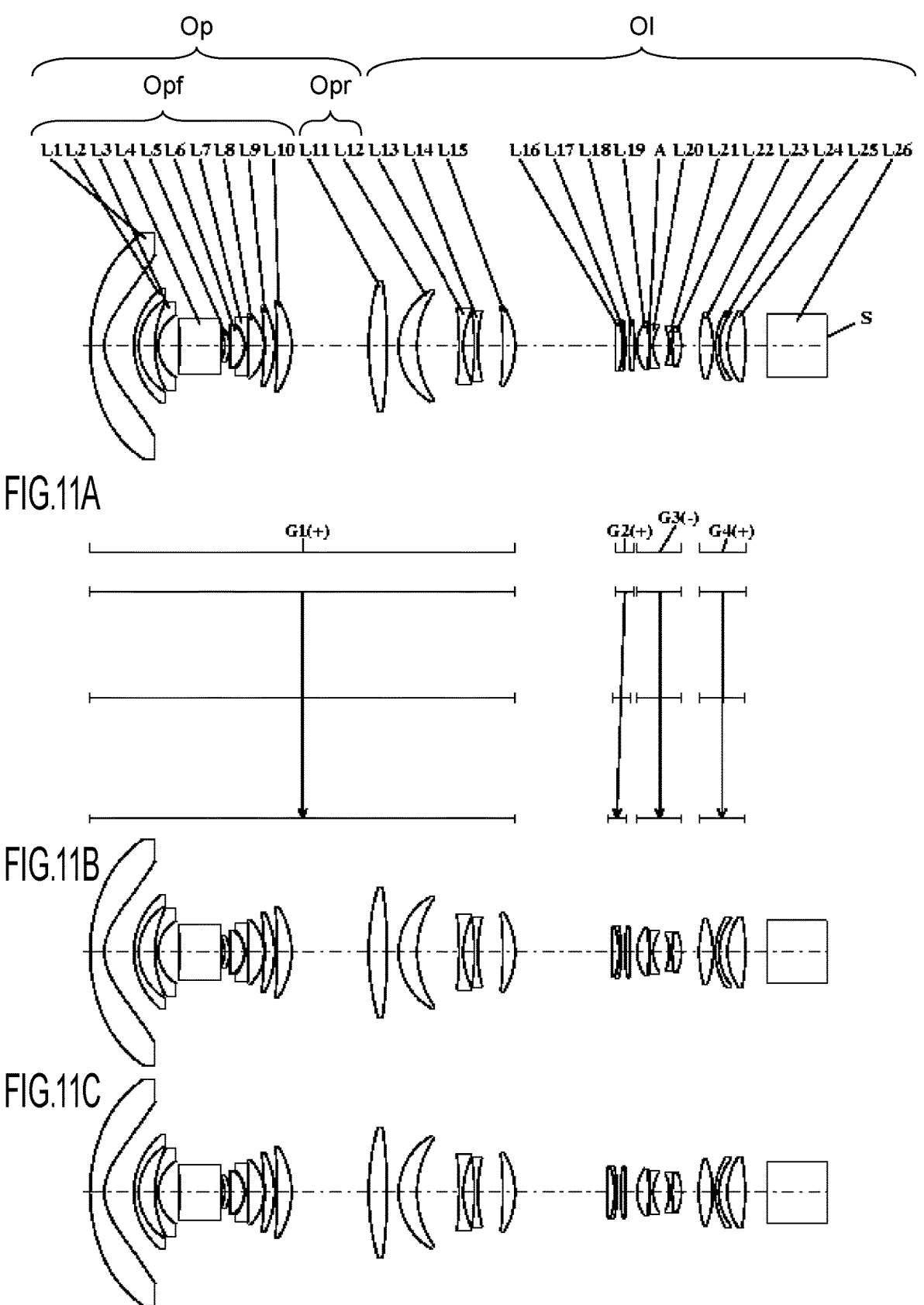
FIGS. 11A-11C are layout diagrams of the zoom lens system of example 4 for an object distance of 1066 mm.
Figures 12A, 12B, 12C:
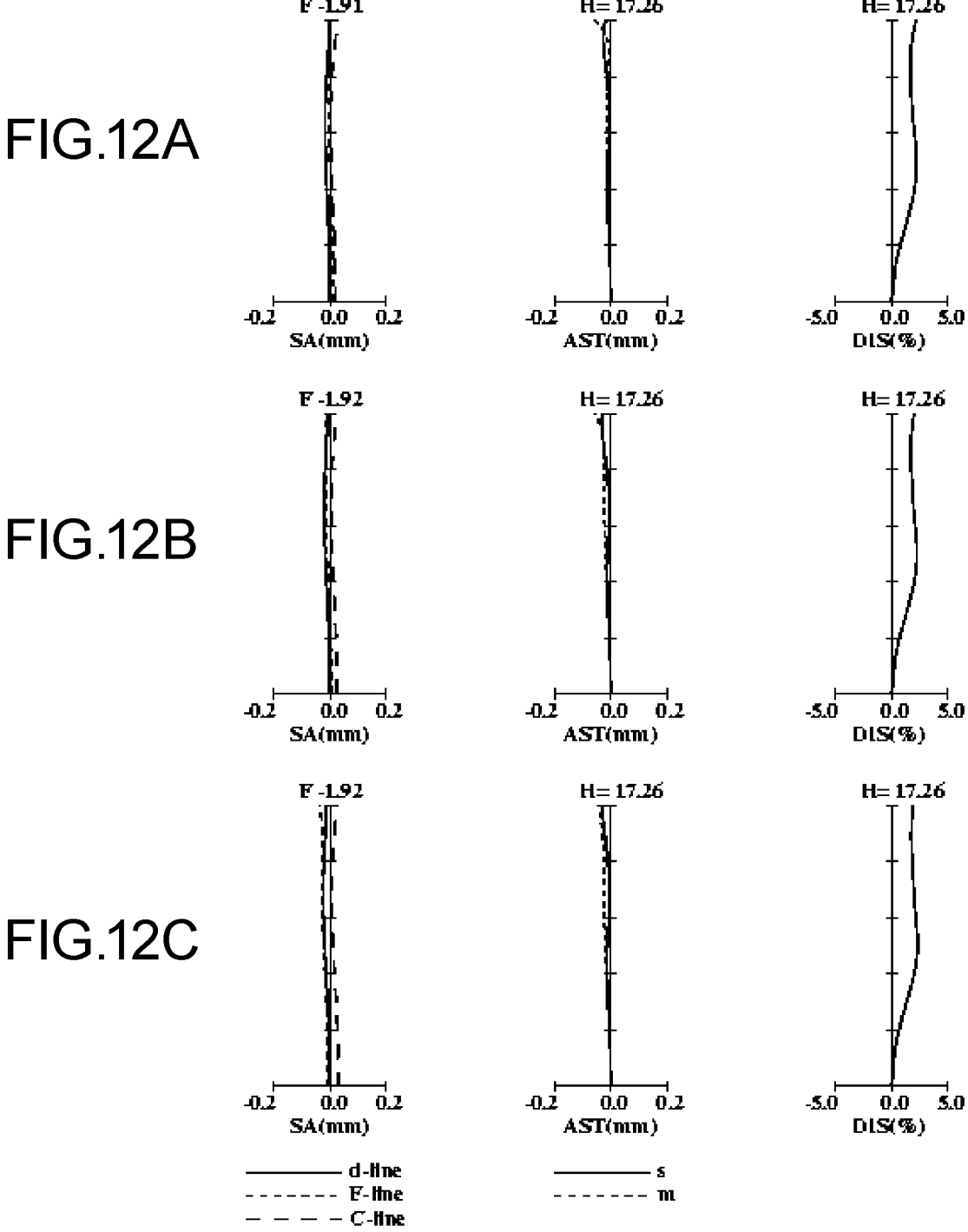
FIGS. 12A-12C are longitudinal aberration diagrams of the zoom lens system of example 4 for an object distance of 1066 mm.
Figure 13:
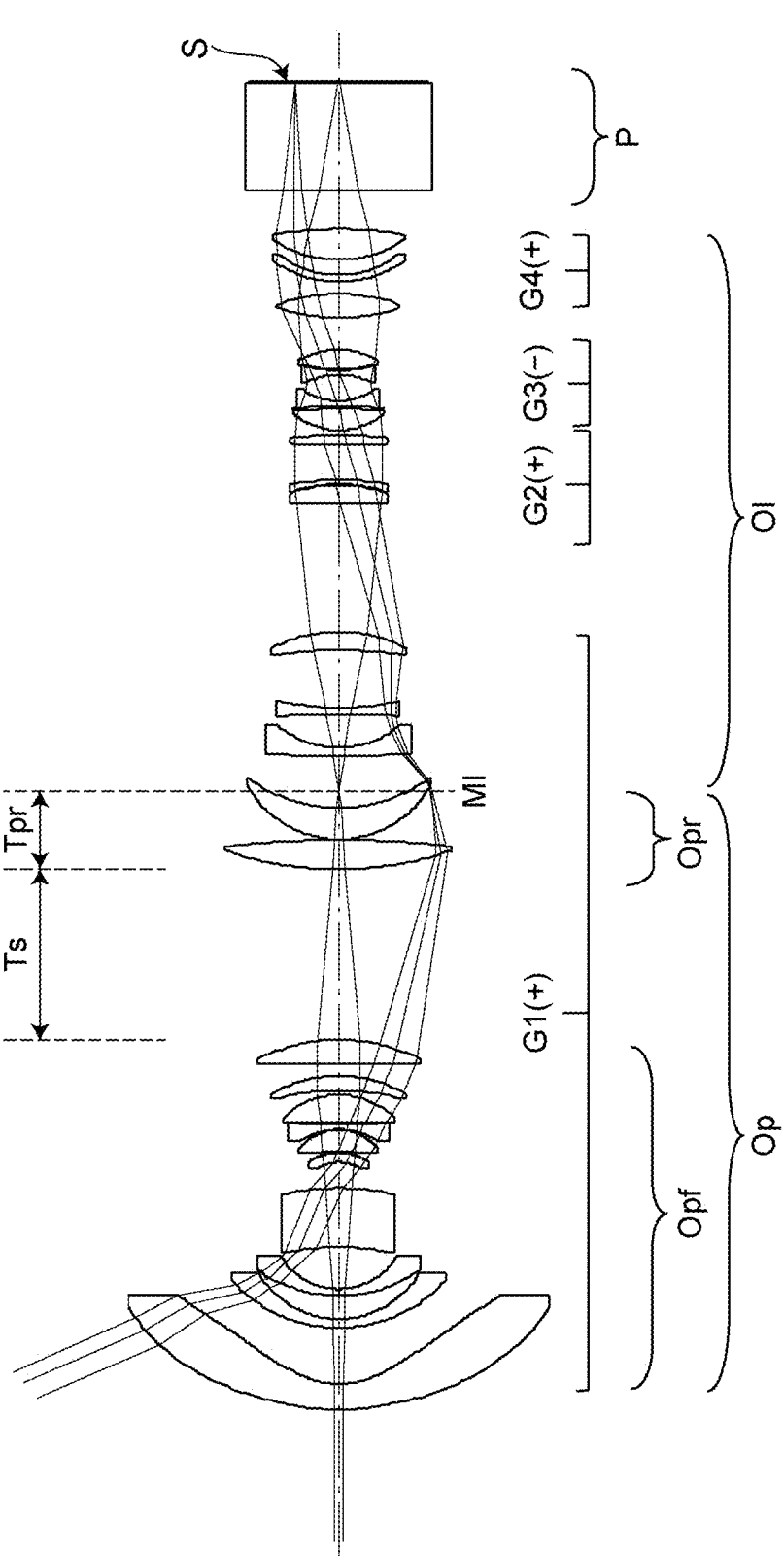
FIG. 13 is a layout diagram showing an optical path at a wide-angle end in a zoom lens system of example 5 for an object distance of 1066 mm.
Figures 14A, 14B, 14C:
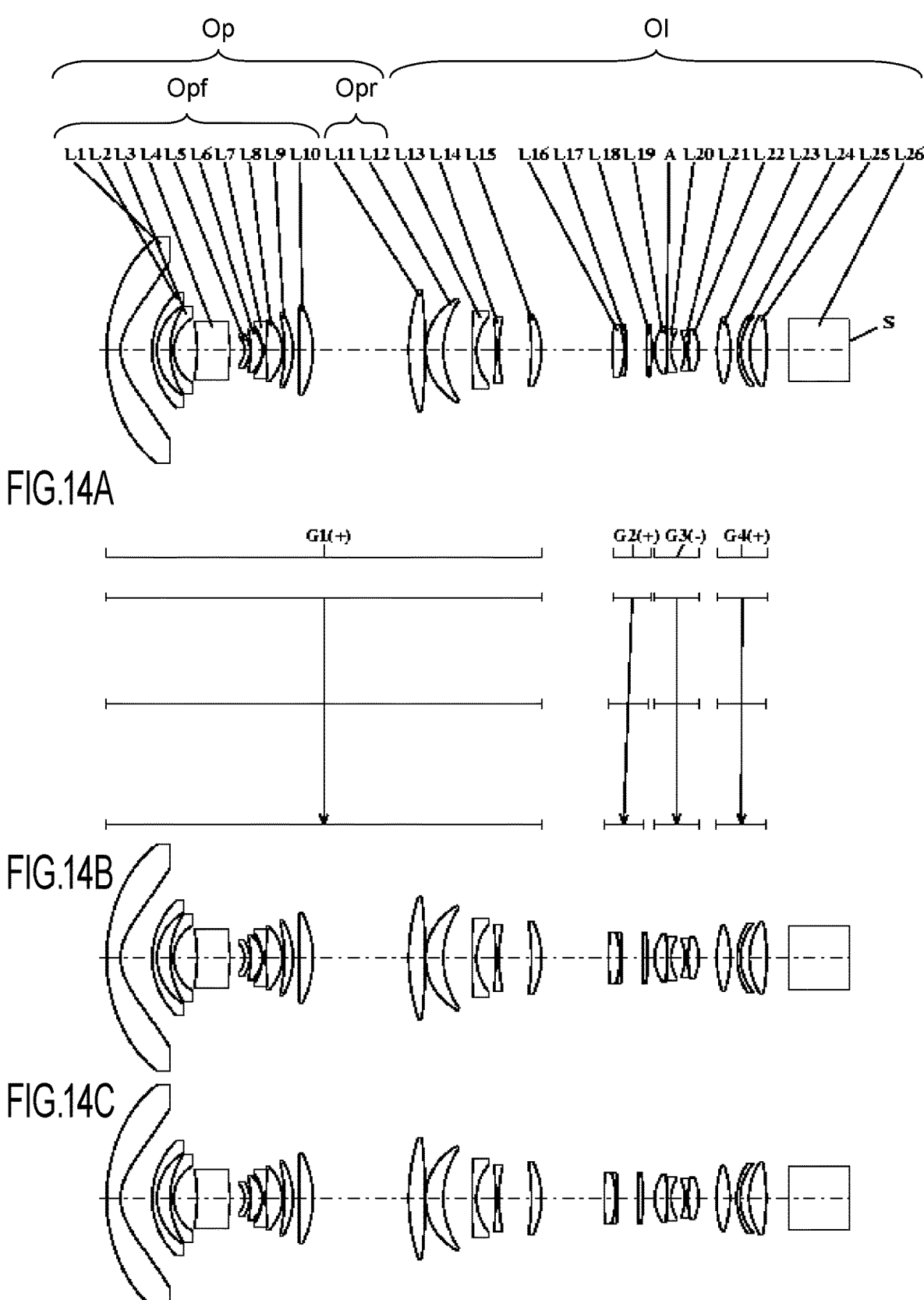
FIGS. 14A-14C are layout diagrams of the zoom lens system of example 5 for an object distance of 1066 mm.
Figure 16:
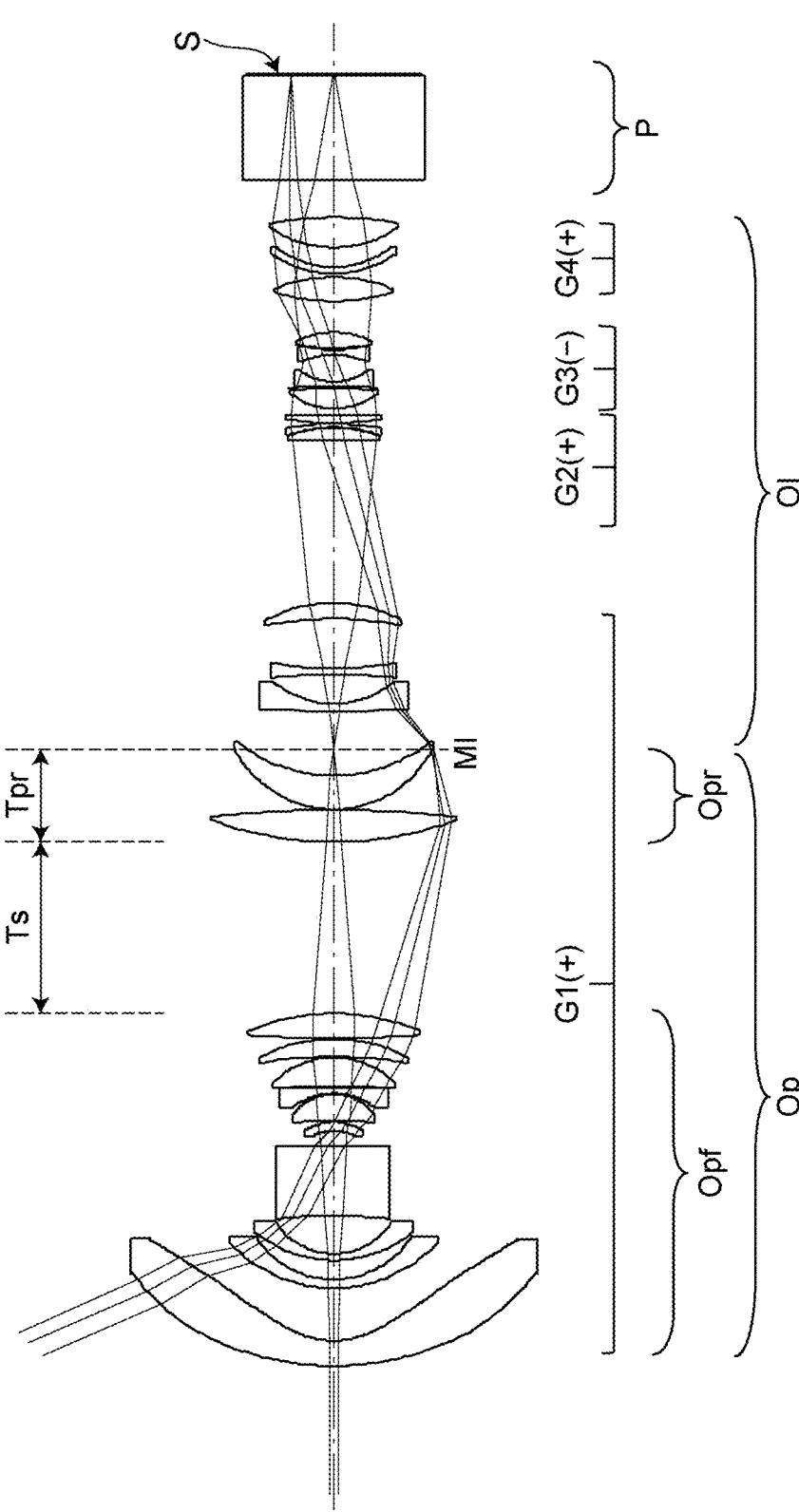
FIG. 16 is a layout diagram showing an optical path at a wide-angle end in a zoom lens system of example 6 for an object distance of 1066 mm.
Figures 17A, 17B, 17C:
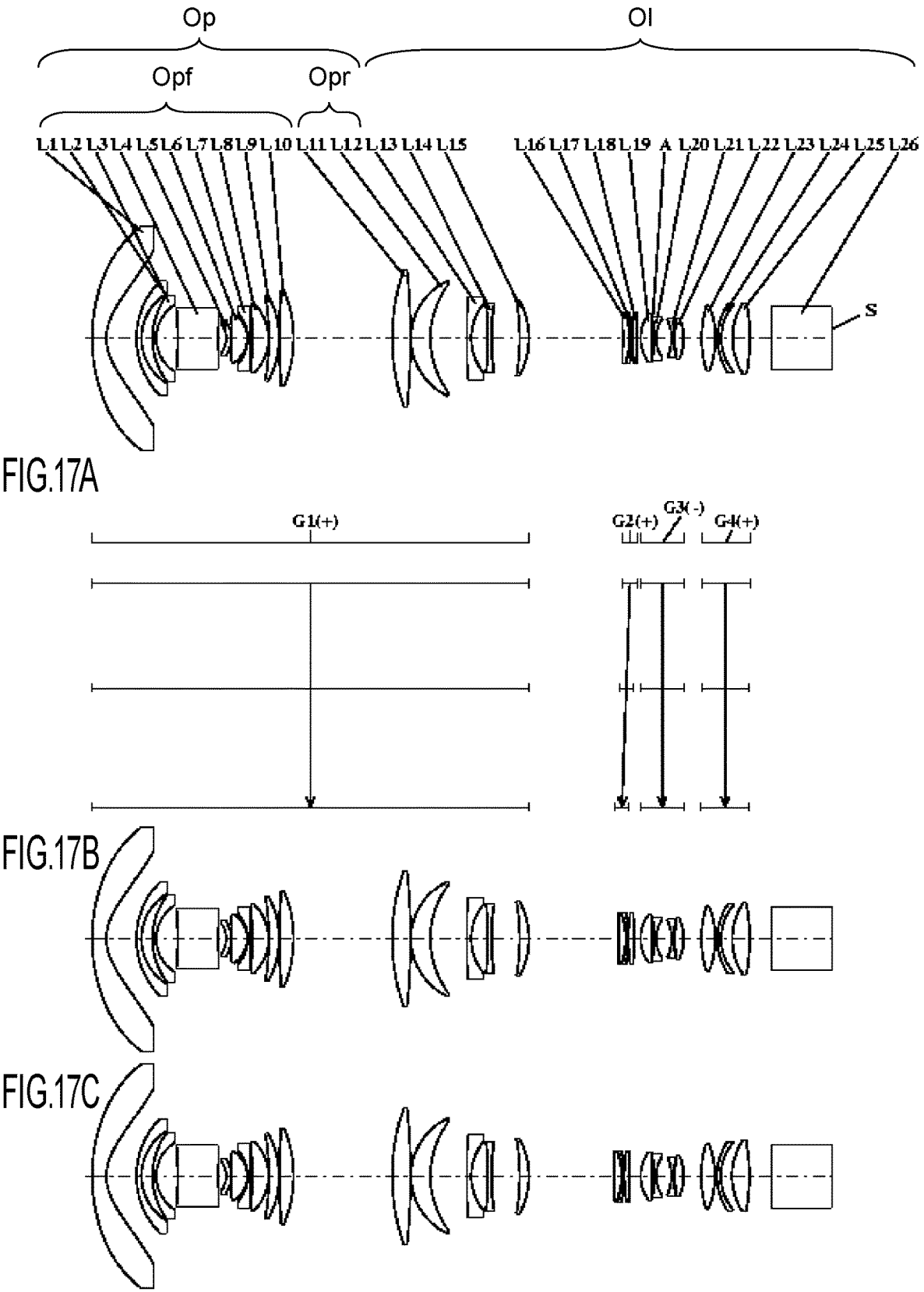
FIGS. 17A-17C are layout diagrams of the zoom lens system of example 6 for an object distance of 1066 mm.
Figures 18A, 18B, 18C:
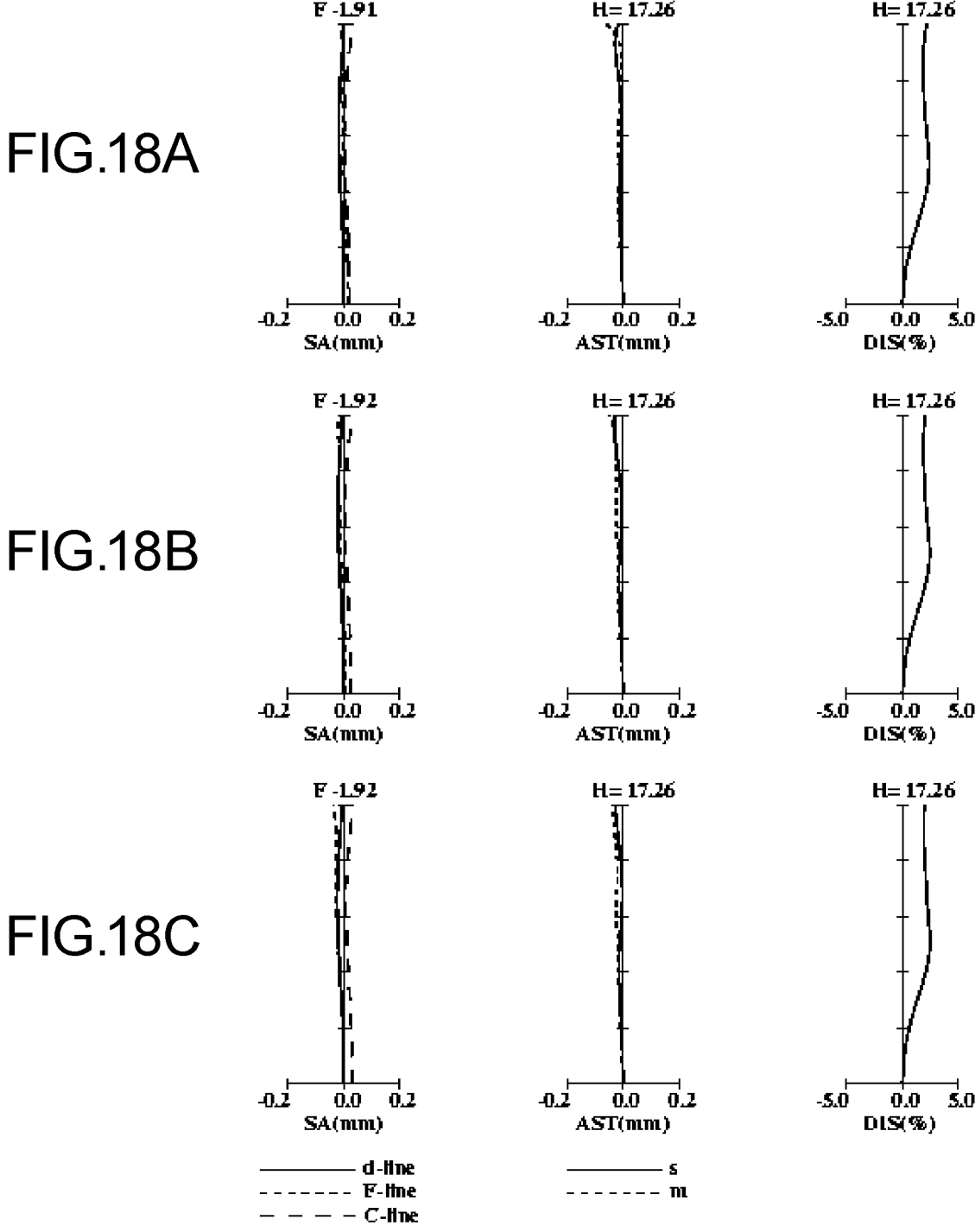
FIGS. 18A-18C are longitudinal aberration diagrams of the zoom lens system of example 6 for an object distance of 1066 mm.
Figure 19:
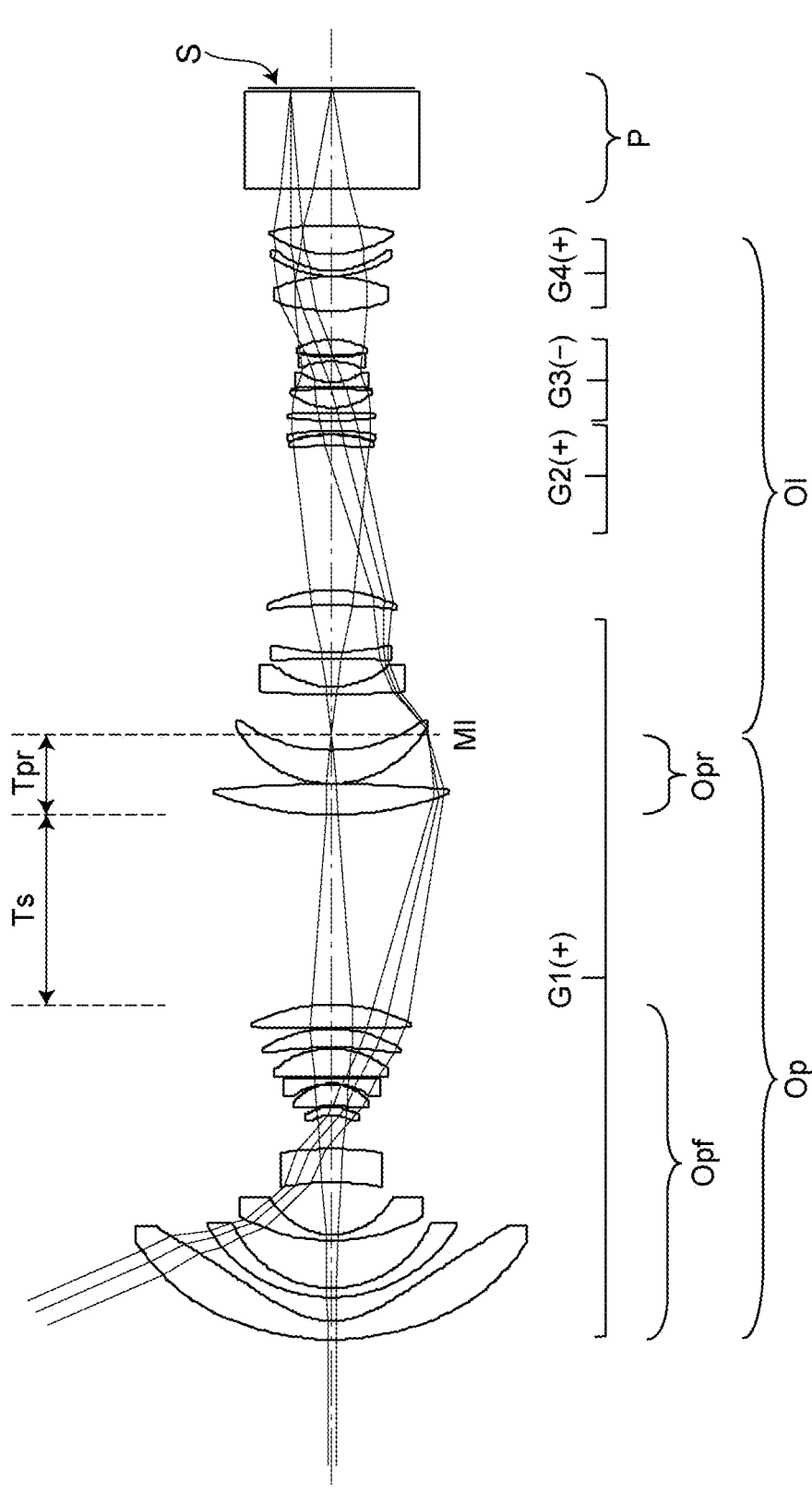
FIG. 19 is a layout diagram showing an optical path at a wide-angle end in a zoom lens system of example 7 for an object distance of 1066 mm.
Figures 20A, 20B, 20C:
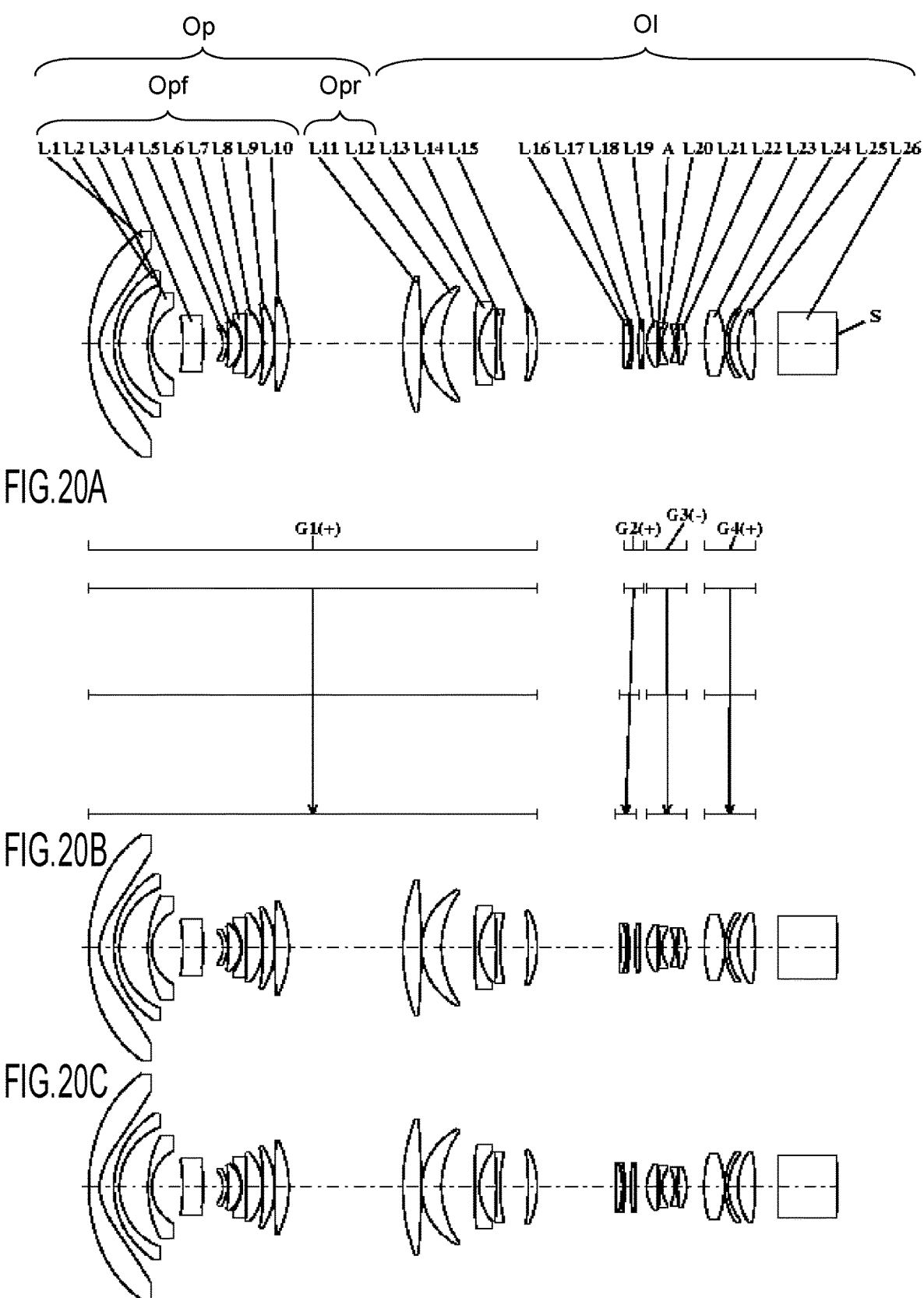
FIGS. 20A-20C are layout diagrams of the zoom lens system of example 7 for an object distance of 1066 mm.

In the zoom lens system according to each of examples 1 to 7, there are a plurality of air distances among the first lens element L1 to the 25th lens element L25 (or 26th lens element L26) and the optical element P. The magnification optical system Op has the longest air distance along an optical axis in the magnification optical system. For example, in examples 1 and 2, as shown in FIGS. 2A and 5A, there is the longest air distance between the 10th lens element L10 and the 11th lens element L11. The magnification optical system Op includes magnification optical system front group Opf positioned on the magnification side with respect to the longest air distance and a magnification optical system rear group Opr positioned on the reduction side with respect to the longest air distance. The front group Opf and the rear group Opr may have a single lens element or plural lens elements.

FIGS. 3A-3C, 6A-6C, 9A-9C, 12A-12C, 15A-15C, 18A-18C and 21A-21C are longitudinal aberration diagrams of the zoom lens system according to examples 1 to 7 for an object distance of 1066 mm. FIGS. 3A, 6A, 9A, 12A, 15A, 18A and 21A show longitudinal aberration diagrams at the wide-angle end of the zoom lens system, and FIGS. 3B, 6B, 9B, 12B, 15B, 18B and 21B show longitudinal aberration diagrams at the intermediate position, and 3C, 6C, 9C, 12C, 15C, 18C and 21C show longitudinal aberration diagrams at the telephoto end.

Each of the longitudinal aberration diagrams shows spherical aberration (SA (mm)), astigmatism (AST (mm)), and distortion (DIS (%)) in order from the left side. In the spherical aberration diagram, the vertical axis represents a pupil height, and a solid line shows the characteristic of the d-line, a short dashed line shows the characteristic of the F-line, and a long dashed line shows the characteristic of the C-line. In the astigmatism diagram, the vertical axis represents an image height, and a solid line shows the characteristic of the sagittal plane (indicated by s in the drawing), and a dashed line shows the characteristic of the meridional plane (indicated by m in the drawing). In the distortion diagram, the vertical axis represents the image height. The distortion represents distortion with respect to equidistant projection.

Example 1

As shown in FIGS. 1 and 2A-2C, the zoom lens system according to example 1 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the 10th lens element L10 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a biconcave shape. The fifth lens element L5 has a negative meniscus shape with the convex surfaces facing the reduction side. The sixth lens element L6 has a positive meniscus shape with the convex surfaces facing the reduction side. The seventh lens element L7 has a negative meniscus shape with the convex surfaces facing the reduction side. The eighth lens element L8 has a positive meniscus shape with the convex surfaces facing the reduction side. The ninth lens element L9 has a positive meniscus shape with the convex surfaces facing the reduction side. The 10th lens element L10 has a positive meniscus shape with the convex surfaces facing the reduction side.

The rear group Opr of the magnification optical system Op is constituted of the 11th lens element L11 to the 12th lens element L12 in this order from the magnification side to the reduction side. The 11th lens element L11 has a biconvex shape. The 12th lens element L12 has a positive meniscus shape with the convex surfaces facing the magnification side.

The relay optical system Ol is constituted of the 13th lens element L13 to the 25th lens element L25 in order from the magnification side to the reduction side. The 13th lens element L13 has a biconcave shape. The 14th lens element L14 has a biconcave shape. The 15th lens element L15 has a positive meniscus shape with the convex surfaces facing the reduction side. The 16th lens element L16 has a biconvex shape. The 17th lens element L17 has a negative meniscus shape with the convex surfaces facing the reduction side.

The 18th lens element L18 has a biconvex shape. The 19th lens element L19 has a biconvex shape. The 20th lens element L20 has a biconcave shape. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a negative power, the second lens group (L16 to L18) having a positive power, the third lens group (L19 to L22) having a negative power, and the fourth lens group (L23 to L25) having a positive power in order from the magnification side to the reduction side. During zooming the first lens group and the third lens group are fixed, and the second lens group and the fourth lens group are displaced along the optical axis.

By way of example, the first lens element L1 corresponds to the first lens element recited in claims.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 2

As shown in FIGS. 4 and 5A-5C, the zoom lens system according to example 2 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the 10th lens element L10 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a biconvex shape. The fifth lens element L5 has a positive meniscus shape with the convex surfaces facing the reduction side. The sixth lens element L6 has a positive meniscus shape with the convex surfaces facing the reduction side. The seventh lens element L7 has a negative meniscus shape with the convex surfaces facing the reduction side. The eighth lens element L8 has a positive meniscus shape with the convex surfaces facing the reduction side. The ninth lens element L9 has a positive meniscus shape with the convex surfaces facing the reduction side. The 10th lens element L10 has a biconvex shape.

The rear group Opr of the magnification optical system Op is constituted of the 11th lens element L11 to the 12th lens element L12 in this order from the magnification side to the reduction side. The 11th lens element L11 has a biconvex shape. The 12th lens element L12 has a positive meniscus shape with the convex surfaces facing the magnification side.

The relay optical system Ol is constituted of the 13th lens element L13 to the 25th lens element L25 in order from the magnification side to the reduction side. The 13th lens element L13 has a biconcave shape. The 14th lens element L14 has a biconcave shape. The 15th lens element L15 has a biconvex shape. The 16th lens element L16 has a biconvex shape. The 17th lens element L17 has a biconcave shape. The 18th lens element L18 has a biconvex shape. The 19th lens element L19 has a positive meniscus shape with the convex surfaces facing the magnification side. The 20th lens element L20 has a negative meniscus shape with the convex surfaces facing the magnification side. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a negative power, the second lens group (L16 to L18) having a positive power, the third lens group (L19 to L22) having a negative power, and the fourth lens group (L23 to L25) having a positive power in order from the magnification side to the reduction side. During zooming the first lens group and the third lens group are fixed, and the second lens group and the fourth lens group are displaced along the optical axis.

By way of example, the first lens element L1 corresponds to the first lens element recited in claims.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 3

As shown in FIGS. 7 and 8A-8C, the zoom lens system according to example 3 includes the magnification optical system Op and the relay optical system Ol. The magnification optical system Op is constituted of the first lens element L1 to the 13th lens element L13. The magnification optical system Op includes the front group Opf and the rear group Opr.

The front group Opf of the magnification optical system Op is constituted of the first lens element L1 to the 11th lens element L11 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a biconcave shape. The fifth lens element L5 has a biconvex shape. The sixth lens element L6 has a biconcave shape. The seventh lens element L7 has a biconvex shape. The eighth lens element L8 has a negative meniscus shape with the convex surfaces facing the reduction side. The ninth lens element L9 has a positive meniscus shape with the convex surfaces facing the reduction side. The 10th lens element L10 has a positive meniscus shape with the convex surfaces facing the reduction side. The 11th lens element L11 has a biconvex shape.

The rear group Opr of the magnification optical system Op is constituted of the 12th lens element L12 to the 13th lens element L13 in this order from the magnification side to the reduction side. The 12th lens element L12 has a biconvex shape. The 13th lens element L13 has a positive meniscus shape with the convex surfaces facing the magnification side.

The relay optical system Ol is constituted of the 14th lens element L14 to the 26th lens element L26 in order from the magnification side to the reduction side. The 14th lens element L14 has a biconcave shape. The 15th lens element L15 has a biconcave shape. The 16th lens element L16 has a positive meniscus shape with the convex surfaces facing the reduction side. The 17th lens element L17 has a negative meniscus shape with the convex surfaces facing the magnification side. The 18th lens element L18 has a biconvex shape. The 19th lens element L19 has a biconvex shape. The 20th lens element L20 has a biconvex shape. The 21st lens element L21 has a biconcave shape. The 22nd lens element L22 has a biconcave shape. The 23rd lens element L23 has a biconvex shape. The 24th lens element L24 has a biconvex shape. The 25th lens element L25 has a negative meniscus shape with the convex surfaces facing the magnification side. The 26th lens element L26 has a biconvex shape.

The relay optical system Ol is constituted of the first lens group (L14 to L16) having a negative power, the second lens group (L17 to L19) having a positive power, the third lens group (L20 to L23) having a negative power, and the fourth lens group (L24 to L26) having a positive power in order from the magnification side to the reduction side. During zooming the first lens group and the third lens group are fixed, and the second lens group and the fourth lens group are displaced along the optical axis.

By way of example, the first lens element L1 corresponds to the first lens element recited in claims.

The intermediate imaging position MI is located between the 13th lens element L13 and the 14th lens element L14. Further, an aperture A is arranged between the 19th lens element L19 and the 20th lens element L20. The optical element P having zero optical power is arranged on the reduction side of the relay optical system Ol.

Example 4

As shown in FIGS. 10 and 11A-11C, the zoom lens system according to example 4 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the 10th lens element L10 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a biconvex shape. The fifth lens element L5 has a positive meniscus shape with the convex surfaces facing the reduction side. The sixth lens element L6 has a positive meniscus shape with the convex surfaces facing the reduction side. The seventh lens element L7 has a negative meniscus shape with the convex surfaces facing the reduction side. The eighth lens element L8 has a positive meniscus shape with the convex surfaces facing the reduction side. The ninth lens element L9 has a positive meniscus shape with the convex surfaces facing the reduction side. The 10th lens element L10 has a positive meniscus shape with the convex surfaces facing the reduction side.

The rear group Opr of the magnification optical system Op is constituted of the 11th lens element L11 to the 12th lens element L12 in this order from the magnification side to the reduction side. The 11th lens element L11 has a biconvex shape. The 12th lens element L12 has a positive meniscus shape with the convex surfaces facing the magnification side.

The relay optical system Ol is constituted of the 13th lens element L13 to the 25th lens element L25 in order from the magnification side to the reduction side. The 13th lens element L13 has a biconcave shape. The 14th lens element L14 has a biconcave shape. The 15th lens element L15 has a positive meniscus shape with the convex surfaces facing the reduction side. The 16th lens element L16 has a positive meniscus shape with the convex surfaces facing the reduction side. The 17th lens element L17 has a negative meniscus shape with the convex surfaces facing the reduction side. The 18th lens element L18 has a biconvex shape. The 19th lens element L19 has a biconvex shape. The 20th lens element L20 has a biconcave shape. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a negative power, the second lens group (L16 to L18) having a positive power, the third lens group (L19 to L22) having a negative power, and the fourth lens group (L23 to L25) having a positive power in order from the magnification side to the reduction side. During zooming the first lens group and the third lens group are fixed, and the second lens group and the fourth lens group are displaced along the optical axis.

By way of example, the first lens element L1 corresponds to the first lens element recited in claims.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 5

As shown in FIGS. 13 and 14A-14C, the zoom lens system according to example 5 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the 10th lens element L10 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a positive meniscus shape with the convex surfaces facing the reduction side. The fifth lens element L5 has a negative meniscus shape with the convex surfaces facing the reduction side. The sixth lens element L6 has a positive meniscus shape with the convex surfaces facing the reduction side. The seventh lens element L7 has a biconcave shape. The eighth lens element L8 has a biconvex shape. The ninth lens element L9 has a positive meniscus shape with the convex surfaces facing the reduction side. The 10th lens element L10 has a biconvex shape.

The rear group Opr of the magnification optical system Op is constituted of the 11th lens element L11 to the 12th lens element L12 in this order from the magnification side to the reduction side. The 11th lens element L11 has a biconvex shape. The 12th lens element L12 has a positive meniscus shape with the convex surfaces facing the magnification side.

The relay optical system Ol is constituted of the 13th lens element L13 to the 25th lens element L25 in order from the magnification side to the reduction side. The 13th lens element L13 has a negative meniscus shape with the convex surfaces facing the magnification side. The 14th lens element L14 has a biconcave shape. The 15th lens element L15 has a positive meniscus shape with the convex surfaces facing the reduction side. The 16th lens element L16 has a biconvex shape. The 17th lens element L17 has a negative meniscus shape with the convex surfaces facing the reduction side. The 18th lens element L18 has a biconvex shape. The 19th lens element L19 has a biconvex shape. The 20th lens element L20 has a biconcave shape. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a negative power, the second lens group (L16 to L18) having a positive power, the third lens group (L19 to L22) having a negative power, and the fourth lens group (L23 to L25) having a positive power in order from the magnification side to the reduction side. During zooming the first lens group and the third lens group are fixed, and the second lens group and the fourth lens group are displaced along the optical axis.

By way of example, the first lens element L1 corresponds to the first lens element recited in claims.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 6

As shown in FIGS. 16 and 17A-17C, the zoom lens system according to example 6 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the 10th lens element L10 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a negative meniscus shape with the convex surfaces facing the reduction side. The fifth lens element L5 has a negative meniscus shape with the convex surfaces facing the reduction side. The sixth lens element L6 has a positive meniscus shape with the convex surfaces facing the reduction side. The seventh lens element L7 has a negative meniscus shape with the convex surfaces facing the reduction side. The eighth lens element L8 has a positive meniscus shape with the convex surfaces facing the reduction side. The ninth lens element L9 has a positive meniscus shape with the convex surfaces facing the reduction side. The 10th lens element L10 has a biconvex shape.

The rear group Opr of the magnification optical system Op is constituted of the 11th lens element L11 to the 12th lens element L12 in this order from the magnification side to the reduction side. The 11th lens element L11 has a biconvex shape. The 12th lens element L12 has a positive meniscus shape with the convex surfaces facing the magnification side.

The relay optical system Ol is constituted of the 13th lens element L13 to the 25th lens element L25 in order from the magnification side to the reduction side. The 13th lens element L13 has a biconcave shape. The 14th lens element L14 has a biconcave shape. The 15th lens element L15 has a positive meniscus shape with the convex surfaces facing the reduction side. The 16th lens element L16 has a positive meniscus shape with the convex surfaces facing the reduction side. The 17th lens element L17 has a negative meniscus shape with the convex surfaces facing the reduction side. The 18th lens element L18 has a biconvex shape. The 19th lens element L19 has a biconvex shape. The 20th lens element L20 has a biconcave shape. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a negative power, the second lens group (L16 to L18) having a positive power, the third lens group (L19 to L22) having a negative power, and the fourth lens group (L23 to L25) having a positive power in order from the magnification side to the reduction side. During zooming the first lens group and the third lens group are fixed, and the second lens group and the fourth lens group are displaced along the optical axis.

By way of example, the first lens element L1 corresponds to the first lens element recited in claims.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

Example 7

As shown in FIGS. 19 and 20A-20C, the zoom lens system according to example 7 includes the magnification optical system Op and the relay optical system Ol. The magnification optical system Op is constituted of the first lens element L1 to the 12th lens element L12. The magnification optical system Op includes the front group Opf and the rear group Opr.

The front group Opf of the magnification optical system Op is constituted of the first lens element L1 to the 10th lens element L10 in order from the magnification side to the reduction side. The first lens element L1 has a negative meniscus shape with the convex surfaces facing the magnification side. The second lens element L2 has a negative meniscus shape with the convex surfaces facing the magnification side. The third lens element L3 has a negative meniscus shape with the convex surfaces facing the magnification side. The fourth lens element L4 has a negative meniscus shape with the convex surfaces facing the reduction side. The fifth lens element L5 has a negative meniscus shape with the convex surfaces facing the reduction side. The sixth lens element L6 has a positive meniscus shape with the convex surfaces facing the reduction side. The seventh lens element L7 has a biconcave shape. The eighth lens element L8 has a positive meniscus shape with the convex surfaces facing the reduction side. The ninth lens element L9 has a positive meniscus shape with the convex surfaces facing the reduction side. The 10th lens element L10 has a biconvex shape.

The rear group Opr of the magnification optical system Op is constituted of the 11th lens element L11 to the 12th lens element L12 in this order from the magnification side to the reduction side. The 11th lens element L11 has a biconvex shape. The 12th lens element L12 has a positive meniscus shape with the convex surfaces facing the magnification side.

The relay optical system Ol is constituted of the 13th lens element L13 to the 25th lens element L25 in order from the magnification side to the reduction side. The 13th lens element L13 has a negative meniscus shape with the convex surfaces facing the magnification side. The 14th lens element L14 has a biconcave shape. The 15th lens element L15 has a positive meniscus shape with the convex surfaces facing the reduction side. The 16th lens element L16 has a positive meniscus shape with the convex surfaces facing the reduction side. The 17th lens element L17 has a negative meniscus shape with the convex surfaces facing the reduction side. The 18th lens element L18 has a biconvex shape. The 19th lens element L19 has a biconvex shape. The 20th lens element L20 has a biconcave shape. The 21st lens element L21 has a biconcave shape. The 22nd lens element L22 has a biconvex shape. The 23rd lens element L23 has a biconvex shape. The 24th lens element L24 has a negative meniscus shape with the convex surfaces facing the magnification side. The 25th lens element L25 has a biconvex shape.

The relay optical system Ol is constituted of the first lens group (L13 to L15) having a negative power, the second lens group (L16 to L18) having a positive power, the third lens group (L19 to L22) having a negative power, and the fourth lens group (L23 to L25) having a positive power in order from the magnification side to the reduction side. During zooming the first lens group and the third lens group are fixed, and the second lens group and the fourth lens group are displaced along the optical axis.

By way of example, the first lens element L1 corresponds to the first lens element recited in claims.

The intermediate imaging position MI is located between the 12th lens element L12 and the 13th lens element L13. Further, an aperture A is arranged between the 19th lens element L19 and the 20th lens element L20. The optical element P having zero optical power is arranged on the reduction side of the relay optical system Ol.

The zoom lens system according to each of examples 1 to 7 may include not only lens elements having an optical power but also elements having zero or substantially zero optical power, such as mirrors, apertures, masks, cover glasses, filters, prisms, wave plates, and polarizing elements.

Next, conditions which the zoom lens system according to examples 1 to 3 can satisfy are described below. Although a plurality of the conditions are defined for the zoom lens system according to each of the examples, all of these plurality of conditions may be satisfied, or the individual conditions may be satisfied to obtain the corresponding effects.

A zoom lens system according to each of examples 1 to is an optical system internally having an intermediate imaging position that is conjugate to a magnification conjugate point on a magnification side and a reduction conjugate point on a reduction side, respectively, the optical system including:

a magnification optical system having a plurality of lens elements, positioned on the magnification side with respect to the intermediate imaging position; and a relay optical system having a plurality of lens elements, positioned on the reduction side with respect to the intermediate imaging position, wherein a first lens element located closest to the magnification side among the plurality of lens elements in magnification optical system is an aspherical lens having a negative power, the optical system satisfies the following conditions (1) to (3):

$$0.0055 < \Delta pgfn < 0.030 \tag{1}$$

$$53 < vdn < 58 \tag{2}$$

$$0.28 < fp/fr < 1.0 \tag{3}$$

where, $\Delta pgfn = (ngn - nfn)/(nfn - ncn) - (-2.20599 \times 10^{-3} \cdot vdn + 6.69612 \times 10^{-1})$, vdn is an Abbe number of the first lens element, ngn is a refractive index of the first lens element for a g-line, nfn is a refractive index of the first lens element for an F-line, ncn is a refractive index of the first lens element for a C-line, fp is a focal length of the magnification optical system, and fr is a focal length of the relay optical system at the wide-angle end.

The condition (1) is a conditional expression for defining a partial dispersion ratio of the g-line and the F-line of the first lens element. When satisfying the condition (1), the axial chromatic aberration of each wavelength can be satisfactorily suppressed over the entire zoom range from the wide-angle end to the telephoto end. If falling below the lower limit value of the condition (1), the axial chromatic aberration at the wide-angle end is increased. If exceeding the upper limit value of the condition (1), the axial chromatic aberration at the telephoto end is increased.

The condition (2) is a conditional expression for defining the Abbe number of the first lens element. When satisfying the condition (2), the axial chromatic aberration can be satisfactorily suppressed. If falling below the lower limit value of the condition (2), the axial chromatic aberration on the short-wavelength side occurs in an over side and is increased. On the other hand, if exceeding the upper limit value, the axial chromatic aberration on the short-wavelength side occurs in an under side and is increased. In order to satisfy both of the conditions (1) and (2), the first lens element may be made of synthetic resin.

The condition (3) is a conditional expression for defining the relationship between the composite focal lengths of the magnification optical system and the relay optical system. When satisfying this, an optical system having a wide angle and a small lens diameter can be realized. If falling below the lower limit value of the conditional expression (3), the effective diameter of the positive power lens element which is located on the magnification side with respect to the intermediate imaging position and closest to the intermediate imaging position becomes too large, and the lens becomes heavier. On the other hand, if exceeding the upper limit value, the effective diameter of the lens located closest to the magnification side becomes too large, and the lens becomes heavier.

In addition to the conditions (1) to (3), more advantageous effects can be obtained by further satisfying at least one of the following conditions (1A), (2A), and (3A):

$$0.0060 < \Delta pgfn < 0.028 \tag{1A}$$

$$53.5 < Vd < 57.5 \tag{2A}$$

$$0.30 < fp/fr < 0.95 \tag{3A}.$$

Further, in the zoom lens system according to each of examples 1 to 7, there are a plurality of air distances among the lens elements, the magnification optical system may include a magnification optical system front group positioned on the magnification side with respect to the longest air distance along an optical axis in the magnification optical system and a magnification optical system rear group positioned on the reduction side with respect to the longest air distance, and the optical system may satisfy the following conditions (4) and (5):

$$7 < |Ts/fw| < 15 \tag{4}$$

$$2 < |Tpr/fw| < 7 \tag{5}$$

where, Ts is the longest air distance, fw is a focal length of the entire optical system at the wide-angle end, and Tpr is a distance from a surface closest to the magnification side of the magnification optical system rear group to the intermediate imaging position.

The condition (4) is a conditional expression for defining the relationship between the longest air distance in the magnification optical system and the focal length of the entire optical system at the wide-angle end. When satisfying the condition (4), the optical system can achieve a wider angle. If falling below the lower limit of the condition (4), the lens of the magnification optical system front group becomes heavier. If exceeding the upper limit of the condition (4), the center of gravity of the entire optical system is moved to the magnification side. The condition (5) is a conditional expression for defining the relationship between the distance between the surface of the magnification optical system rear group on the magnification side to the intermediate imaging position and the focal length of the entire optical system at the wide-angle end. When satisfying the condition (5), the effect of the condition (4) can be exhibited.

In addition to the conditions (4) and (5), more advantageous effects can be obtained by further satisfying at least one of the following conditions (4A) and (5A):

$$7.2 < |Ts/fw| < 12 \tag{4A}$$

$$3 < |Tpr/fw| < 6.9 \tag{5A}.$$

Further, in the zoom lens system according to each of examples 1 to 7, all the lens elements that satisfy the condition (6) among the plurality of lens elements may satisfy the condition (7), and one lens element among the plurality of lens elements may not satisfy both of the conditions (6) and (7):

$$|ym/(fw \cdot \tan(\omega m))| < 3.0 \tag{6}$$

$$Tg > 300^\circ \text{ C.} \tag{7}$$

where, fw is a focal length of the entire optical system at the wide-angle end, ωm is a maximum half angle of view at the wide-angle end, ym is a height at the telephoto end at which the most off-axis main ray passes through a lens surface, and Tg is a glass transition point of lens material.

The condition (6) is a conditional expression for defining the relationship among the height at the telephoto end at which the most off-axis main ray passes through the lens surface, the focal length of the entire optical system at the wide-angle end, and the maximum half angle of view at the wide-angle end. The condition (7) is a conditional expression for defining the glass transition point of the lens material. When both of the conditions (6) and (7) are satisfied, deterioration of the lens can be prevented when high intensity light passes through the lens. Note that ym is calculated as a lower one out of a height of the light passing through the surface on the magnification side and a height of the light passing through the surface on the reduction side of the lens.

Further, in the zoom lens system according to each of examples 1 to 7, the first lens element may have a first lens magnification side aspherical surface facing the magnification side and a first lens reduction side aspherical surface facing the reduction side, and the first lens magnification side surface and the first lens reduction side surface may satisfy the following condition (8):

$$dZ(r)/dr > 0 \tag{8}$$

where, r is a distance (r>0) from a vertex of a surface along a plane perpendicular to the optical axis of the optical system, and Z(r) is an amount of sag of the surface (assuming that Z=0 at the vertex (r=0), where Z has a sign + for reduction side displacement with respect to the vertex, and a sign − for magnification side displacement).

The condition (8) is a conditional expression for defining that the first derivative dZ(r)/dr of the amount of sag Z(r) of the surface is positive. When satisfying the condition (8), even when local heat is generated in the first lens element, a change in shape due to thermal expansion take places likewise in both the magnification side surface and the reduction side surface of the first lens element. As a result, the occurrence of field curvature and astigmatism can be suppressed.

Further, the zoom lens system according to each of examples 1 to 7 may satisfy the following condition (9):

$$0.5 < |(L1R1 + L1R2)/(L1R2 - L1R1)| < 5.0 \tag{9}$$

where, L1R1 is a center curvature radius of the first lens magnification side surface, and L1R2 is a center curvature radius of the first lens reduction side surface.

The condition (9) is a conditional expression for defining a shaping factor of the first lens element located closest to the magnification side of the magnification optical system. When satisfying the condition (9), the effective diameter of the lens can be reduced while the field curvature and distortion aberration are corrected. If falling below the lower limit value of the condition (9), the field curvature and distortion aberration are not sufficiently corrected. If exceeding the upper limit value, the effective diameter of the lens located closer to the magnification side with respect to the aspherical lens becomes large.

In addition to the condition (9), more advantageous effects can be obtained by further satisfying the following condition (9A):

$$0.8 < |(L1R1+L1R2)/(L1R2-L1R1)| < 4.7 \tag{9A}$$

Further, in the zoom lens system according to each of examples 1 to 7, a second lens element is arranged on the reduction side of the first lens element, and the optical system may satisfy the following condition (10):

$$1.2 < |T1/fw| < 10.0 \tag{10}$$

where, T1 is an air distance between the first lens element and the second lens element, and fw is a focal length of the entire optical system at the wide-angle end.

The condition (10) is a conditional expression for defining the relationship between the air distance between the first lens element and the second lens element and the focal length of the entire optical system at the wide-angle end. When satisfying the condition (10), a lens system having a wide angle and a small lens diameter can be realized. If falling below the lower limit of the condition (10), the air distance between the first lens element and the second lens element becomes too small, and the distortion aberration becomes difficult to be corrected. On the other hand, if exceeding the upper limit of the condition (10), the effective diameter of the first lens element located closest to the magnification side becomes large and heavier.

In addition to the condition (10), more advantageous effects can be obtained by further satisfying the following condition (10A):

$$1.3 < |CT1/fw| < 9.5 \tag{10A}$$

Further, the zoom lens system according to each of examples 1 to 7 may satisfy the following condition (11):

$$10.0 < |f1/fw| < 16.0 \tag{11}$$

where, f1 is a focal length of the first lens element, and fw is a focal length of the entire optical system at the wide-angle end.

The condition (11) is a conditional expression for defining the relationship between the focal length of the first lens element and the focal point of the entire optical system at the wide-angle end. When satisfying the condition (11), a lens system having a wide angle and a small lens diameter can be realized. If falling below the lower limit of the condition (11), the power of the first lens element becomes too weak, and the distortion aberration cannot be appropriately corrected. On the other hand, if exceeding the upper limit of the condition (11), the effective diameter of the first lens element located closest to the magnification side becomes large and heavier.

In addition to the condition (11), more advantageous effects can be obtained by further satisfying the following condition (11A):

$$10.2 < |f1/fw| < 15.8 \tag{11A}$$

Further, the zoom lens system according to each of examples 1 to 7 may satisfy the following condition (12):

$$-8.0 < f1/Ymax < -1.0 \tag{12}$$

where, f1 is a focal length of the first lens element, and Ymax is a maximum image height.

The condition (12) is a conditional expression for defining the relationship between the focal length of the first lens element and the maximum image height. When satisfying the condition (12), a lens system having a wide angle and a small lens diameter can be realized. If falling below the lower limit of the condition (12), the power of the first lens element becomes too weak, and the distortion aberration cannot be appropriately corrected. On the other hand, if exceeding the upper limit of the condition (12), the effective diameter of the first lens element located on the most magnified side becomes large and heavier.

In addition to the condition (12), more advantageous effects can be obtained by further satisfying the following condition (12A):

$$-7.8 < f1/Ymax < -1.2 \tag{12A}$$

Further, the zoom lens system according to each of examples 1 to 7 may satisfy the following condition (13):

$$1.5 < |f1/fp| < 10.0 \tag{13}$$

where, f1 is a focal length of the first lens element.

The condition (13) is a conditional expression for defining the relationship between the focal length of the first lens and the focal length of the magnification optical system. When satisfying the condition (13), a lens system having a wide angle and a small lens diameter can be realized. If falling below the lower limit of the condition (13), the distortion aberration cannot be appropriately corrected. On the other hand, if exceeding the upper limit of the condition (13), the effective diameter of the first lens located closest to the magnification side becomes large and heavier.

In addition to the condition (13), more advantageous effects can be obtained by further satisfying the following condition (13A):

$$2.0 < |f1/fp| < 9.8 \tag{13A}$$

Further, the zoom lens system according to each of examples 1 to 7 may satisfy the following condition (14):

$$1.0 < |L1R1/L1R2| < 10.0 \tag{14}$$

where, L1R1 is a center curvature radius of the first lens magnification side surface, and L1R2 is a center curvature radius of the first lens reduction side surface.

The condition (14) is a conditional expression for defining the relationship between the center curvature radius of the first lens magnification side surface and the center curvature radius of the first lens reduction side surface. If exceeding the upper limit of the condition (14), the difference in curvature is increased, and then the power in the peripheral portion of the lens also is increased, which is effective for the aberration correction but has a large influence on performance when a shape error occurs. If falling below the lower limit of the condition (14), because the refractive power becomes too strong, the aberration correction becomes insufficient.

In addition to the condition (14), more advantageous effects can be obtained by further satisfying the following condition (14A):

$$1.5 < |L1R1/L1R2| < 9.5 \tag{14A}$$

Further, the zoom lens system according to each of examples 1 to 7 may satisfy the following condition (15):

$$0.1 < TL1/Ymax < 5.0 \tag{15}$$

where, TL1 is a center thickness of the first lens element, and Ymax is a maximum image height.

The condition (15) is a conditional expression for defining the relationship between the center thickness of the first lens element and the maximum image height. Usually, as the image height is increased, the lens diameter also is increased. If exceeding the upper limit of the condition (15), the thickness of the lens becomes too large, and the chromatic aberration of magnification tends to occur easily particularly in the peripheral portion of a concave lens. If falling below the lower limit of the condition (15), the strength of the lens becomes insufficient and a shape error tends to occur easily during assembling the lens into a lens barrel or the like, which causes the performance to be deteriorated.

In addition to the condition (15), more advantageous effects can be obtained by further satisfying the following condition (15A):

$$0.15 < TL1/Ymax < 4.7 \quad (15A).$$

Further, the zoom lens system according to each of examples 1 to 7 may satisfy the following condition (16):

$$4 < L1R1/Ymax < 10.5 \quad (16)$$

where, L1R1 is a center curvature radius of the first lens magnification side surface, and Ymax is a maximum image height.

The condition (16) is a conditional expression for defining the relationship between the center curvature radius of the first lens magnification side surface, and the maximum image height. If exceeding the upper limit of the condition (16), in order to correct the distortion aberration of a barrel shape, the negative refractive power becomes strong near the outermost peripheral portion of the lens, and the lens tends to have an aspherical shape with a large inflection point. If falling below the lower limit of the condition (16), in order to correct the astigmatism of an intermediate image height, the negative refractive power tends to be strong in a region of the lens through which a light ray of the intermediate image height passes, and the lens tends to have an aspherical shape with a large inflection point. Therefore, the processing difficulty of the lens is increased, and the shape error tends to occur easily.

In addition to the condition (16), more advantageous effects can be obtained by further satisfying the following condition (16A):

$$5.0 < L1R1/Ymax < 9.6 \quad (16A).$$

Further, in the zoom lens system according to each of examples 1 to 7, during zooming the magnification optical system may be fixed, and a part or all of the lens elements in the relay optical system may be displaced along the optical axis.

According to this configuration, arrangement of a zoom mechanism closer to the reduction side with respect to the intermediate imaging position allows a zoom operation mechanism, such as, cam, motor, to be implemented on the reduction side. Therefore, the center of gravity of a lens barrel can be brought closer to the reduction side.

As described above, some examples have been described to exemplify the technology disclosed in the present application. The technology of the present disclosure, however, is not limited only to these examples, but also can be applied to other embodiments appropriately devised through modification, substitution, addition, omission and so on.

Hereinafter, numerical examples of the zoom lens system according to examples 1 to 7 are described. In each of the numerical examples, in the table, the unit of length is all "mm", and the unit of angle of view is all "°" (degree). Further, in each of the numerical examples, r is a radius of curvature, d is a surface interval, nd is a refractive index for d line, and vd is an Abbe number for d line. Further, in each of the numerical examples, a surface marked with "*" is aspherical, and the aspherical shape is defined by the following formula.

$$Z = \frac{h^2/r}{1+\sqrt{1-(1+\kappa)(h/r)^2}} + \sum A_n h^n \quad \text{[Mathematical Formula 1]}$$

where, Z is a distance from a point located on an aspherical surface at a height "h" from the optical axis, to the tangent plane of the aspherical vertex, h is a height from the optical axis, r is a radius of curvature of the vertex, $\kappa$ is a cone constant, and An is a nth-order aspherical coefficient.

Numerical Example 1

Regarding the zoom lens system of numerical example 1 (corresponding to example 1), Table 1 shows surface data, Table 2 shows various data, Table 3 shows single lens data, and Table 4 shows zoom lens group data (unit: mm).

TABLE 1

Surface data

| SURFACE NUMBER | r | d | nd | vd |
|---|---|---|---|---|
| Object plane | ∞(infinity) | | | |
| 1* | 97.69350 | 10.00000 | 1.50940 | 56.5 |
| 2* | 31.36770 | 22.18050 | | |
| 3 | 54.45170 | 3.50000 | 1.80420 | 46.5 |
| 4 | 36.74110 | 10.22980 | | |
| 5 | 60.03940 | 2.50000 | 1.74330 | 49.2 |
| 6 | 26.09880 | 16.03710 | | |
| 7 | −348.06090 | 27.99020 | 1.59270 | 35.4 |
| 8 | 1289.14890 | 2.72020 | | |
| 9* | −16.44190 | 3.13670 | 1.58699 | 59.5 |
| 10* | −17.87810 | 0.20000 | | |
| 11 | −348.97530 | 9.49740 | 1.49700 | 81.6 |
| 12 | −18.76270 | 0.20000 | | |
| 13 | −23.12320 | 2.50000 | 1.86966 | 20.0 |
| 14 | −732.20040 | 0.41780 | | |
| 15 | −346.16980 | 10.45900 | 1.49700 | 81.6 |
| 16 | −31.22520 | 0.20000 | | |
| 17 | −192.12440 | 7.03440 | 1.48749 | 70.2 |
| 18 | −59.47230 | 0.20000 | | |
| 19 | −876.82590 | 10.00000 | 1.49700 | 81.6 |
| 20 | −61.25280 | 63.22670 | | |
| 21 | 151.52720 | 11.91050 | 1.92286 | 20.9 |
| 22 | −375.29900 | 0.20000 | | |
| 23 | 45.77140 | 12.92810 | 1.92286 | 20.9 |
| 24 | 65.14770 | 29.26890 | | |
| 25 | −367.22620 | 3.00000 | 1.77250 | 49.6 |
| 26 | 50.66420 | 9.98110 | | |
| 27 | −205.48240 | 2.50000 | 1.69680 | 55.5 |
| 28 | 98.55830 | 19.30500 | | |
| 29 | −209.63120 | 7.75900 | 1.86966 | 20.0 |
| 30 | −55.21680 | variable | | |
| 31 | 1308.78740 | 5.01580 | 1.69680 | 55.5 |
| 32 | −53.85000 | 0.20000 | | |
| 33 | −54.57770 | 1.50000 | 1.73800 | 32.3 |
| 34 | −127.98930 | 8.99160 | | |
| 35 | 204.58150 | 3.58200 | 1.59282 | 68.6 |
| 36 | −192.87060 | variable | | |
| 37 | 27.84990 | 8.37540 | 1.59270 | 35.4 |
| 38 | −188.22480 | 0.20000 | | |
| 39(Aperture) | ∞ | 0.74080 | | |
| 40 | −206.46080 | 2.00000 | 1.67300 | 38.3 |
| 41 | 24.12340 | 11.45950 | | |
| 42 | −31.56750 | 2.00000 | 1.67300 | 38.3 |
| 43 | 64.18200 | 0.52060 | | |
| 44 | 80.45210 | 6.46490 | 1.43700 | 95.1 |
| 45 | −33.71550 | variable | | |
| 46 | 83.09620 | 9.68650 | 1.49700 | 81.6 |
| 47 | −63.78080 | 3.05650 | | |
| 48 | 45.51150 | 2.50000 | 1.62299 | 58.1 |
| 49 | 37.00910 | 5.33620 | | |
| 50 | 44.31030 | 12.35130 | 1.43700 | 95.1 |
| 51 | −149.35890 | variable | | |

TABLE 1-continued

Surface data

| SURFACE NUMBER | r | d | nd | vd |
|---|---|---|---|---|
| 52 | ∞ | 41.75000 | 1.51680 | 64.2 |
| 53 | ∞ | BF | | |
| Image plane | ∞ | | | |

Aspherical Data

1st Surface

K=0.00000E+00, A3=−7.25014E−06, A4=−1.15220E−06, A5=2.72823E−08, A6=−4.98172E−11, A7=−3.06439E−12, A8=5.81613E−15, A9=4.07487E−16, A10=−2.69504E−18

2nd Surface

K=−1.22715E+00, A3=1.40108E−05, A4=−2.62157E−06, A5=7.38521E−09, A6=2.80400E−10, A7=2.43598E−14, A8=−1.40378E−14, A9=−2.03884E−16, A10=1.80622E−18

9th Surface

K=0.00000E+00, A3=0.00000E+00, A4=2.14919E−05, A5=0.00000E+00, A6=2.07809E−07, A7=0.00000E+00, A8=−7.30054E−10, A9=0.00000E+00, A10=8.85358E−13

10th Surface

K=0.00000E+00, A3=0.00000E+00, A4=2.81203E−05, A5=0.00000E+00, A6=1.62721E−07, A7=0.00000E+00, A8=0.00000E+00, A9=0.00000E+00, A10=0.00000E+00

TABLE 2

Various data
Zoom ratio 1.07128

| | WIDE-ANGLE | INTER-MEDIATE | TELE-PHOTO |
|---|---|---|---|
| Focal length | −7.2355 | −7.4717 | −7.7512 |
| F number | −1.91298 | −1.91566 | −1.91968 |
| Angle of view | −66.8135 | −66.1719 | −65.4059 |
| Image height | 17.2650 | 17.2650 | 17.2650 |
| Total length of lens | 520.0129 | 520.0218 | 520.0245 |
| BF | 1.01329 | 1.02242 | 1.02517 |
| d30 | 64.3935 | 61.5954 | 58.4105 |
| d36 | 2.0000 | 4.7981 | 7.9829 |
| d45 | 12.4726 | 12.3440 | 12.1423 |
| d51 | 15.3200 | 15.4484 | 15.6501 |
| Position of entrance pupil | 42.2840 | 42.2972 | 42.3159 |
| Position of exit pupil | −595.1149 | −576.1453 | −548.7901 |
| Position of front principal point | 34.9607 | 34.7287 | 34.4554 |
| Position of rear principal point | 527.2011 | 527.4432 | 527.7214 |

TABLE 3

Single lens data

| Lens element | First surface | Focal length |
|---|---|---|
| 1 | 1 | −95.5628 |
| 2 | 3 | −154.0331 |
| 3 | 5 | −64.1256 |
| 4 | 7 | −459.4756 |
| 5 | 9 | −1814.3228 |
| 6 | 11 | 39.5198 |
| 7 | 13 | −27.5009 |

TABLE 3-continued

Single lens data

| Lens element | First surface | Focal length |
|---|---|---|
| 8 | 15 | 68.3037 |
| 9 | 17 | 173.6739 |
| 10 | 19 | 131.9648 |
| 11 | 21 | 118.2505 |
| 12 | 23 | 126.3105 |
| 13 | 25 | −57.4536 |
| 14 | 27 | −95.2714 |
| 15 | 29 | 84.2276 |
| 16 | 31 | 74.3399 |
| 17 | 33 | −130.0626 |
| 18 | 35 | 168.0277 |
| 19 | 37 | 41.5307 |
| 20 | 40 | −31.9830 |
| 21 | 42 | −31.1794 |
| 22 | 44 | 55.3204 |
| 23 | 46 | 74.2297 |
| 24 | 48 | −358.4389 |
| 25 | 50 | 79.7441 |

TABLE 4

Zoom lens group data

| Group | First surface | Focal length | Total length | Position of front principal point | Position of rear principal point |
|---|---|---|---|---|---|
| 1 | 1 | 17.89892 | 299.08240 | 61.92894 | 188.87067 |
| 2 | 31 | 88.42608 | 19.28940 | 9.02057 | 12.67491 |
| 3 | 37 | −84.47818 | 31.76120 | 30.16528 | 30.25589 |
| 4 | 46 | 47.05259 | 32.93050 | 10.59383 | 16.63543 |

Zoom lens group magnification

| Group | First surface | WIDE-ANGLE | INTER-MEDIATE | TELE-PHOTO |
|---|---|---|---|---|
| 1 | 1 | −0.01613 | −0.01613 | −0.01613 |
| 2 | 31 | −1.14821 | −1.19150 | −1.24493 |
| 3 | 37 | −1.26654 | −1.24728 | −1.21956 |
| 4 | 46 | −0.27843 | −0.28135 | −0.28570 |

Numerical Example 2

Regarding the zoom lens system of numerical example 2 (corresponding to example 2), Table 5 shows surface data, Table 6 shows various data, Table 7 shows single lens data, and Table 8 shows zoom lens group data (unit: mm).

TABLE 5

Surface data

| SURFACE NUMBER | r | d | nd | vd |
|---|---|---|---|---|
| Object plane | ∞(infinity) | | | |
| 1* | 165.06600 | 10.00000 | 1.50940 | 56.5 |
| 2* | 37.26640 | 28.66350 | | |
| 3 | 59.92230 | 3.00000 | 1.83400 | 37.3 |
| 4 | 30.05740 | 6.06970 | | |
| 5 | 40.76120 | 2.00000 | 1.80420 | 46.5 |
| 6 | 23.47790 | 24.51010 | | |
| 7 | 169.52580 | 4.45090 | 1.49700 | 81.6 |
| 8 | −232.47350 | 2.21550 | | |
| 9* | −21.41670 | 2.48360 | 1.58699 | 59.5 |
| 10* | −21.40060 | 0.20000 | | |
| 11 | −49.10900 | 7.08080 | 1.49700 | 81.6 |
| 12 | −16.94060 | 0.20000 | | |
| 13 | −22.49620 | 2.50000 | 1.86966 | 20.0 |

TABLE 5-continued

Surface data

| SURFACE NUMBER | r | d | nd | vd |
|---|---|---|---|---|
| 14 | −441.93320 | 0.49480 | | |
| 15 | −218.68930 | 10.07060 | 1.49700 | 81.6 |
| 16 | −27.20590 | 0.20000 | | |
| 17 | −181.89320 | 7.52360 | 1.48749 | 70.2 |
| 18 | −50.60870 | 4.98130 | | |
| 19 | 212.13330 | 10.00000 | 1.49700 | 81.6 |
| 20 | −103.26610 | 53.33790 | | |
| 21 | 89.06370 | 14.00000 | 1.80420 | 46.5 |
| 22 | −3267.89360 | 0.20000 | | |
| 23 | 43.66420 | 13.03580 | 1.92286 | 20.9 |
| 24 | 68.22500 | 24.37490 | | |
| 25 | −126.59430 | 3.00000 | 1.77250 | 49.6 |
| 26 | 46.11280 | 12.92370 | | |
| 27 | −46.42300 | 2.50000 | 1.62041 | 60.3 |
| 28 | 153.22030 | 14.38260 | | |
| 29 | 4963.70420 | 17.00000 | 1.80420 | 46.5 |
| 30 | −51.43220 | variable | | |
| 31 | 92.95090 | 6.03150 | 1.72916 | 54.7 |
| 32 | −730.31630 | 31.25490 | | |
| 33* | −31.49100 | 13.92770 | 1.58699 | 59.5 |
| 34* | 594.70610 | 0.20000 | | |
| 35 | 63.95900 | 10.36090 | 1.43700 | 95.1 |
| 36 | −34.56770 | variable | | |
| 37 | 29.89280 | 7.05260 | 1.59270 | 35.4 |
| 38 | 1341.86370 | 0.20000 | | |
| 39(Aperture) | ∞ | 0.21320 | | |
| 40 | 757.66530 | 2.00000 | 1.65844 | 50.9 |
| 41 | 25.51370 | 19.33080 | | |
| 42 | −37.71970 | 2.00000 | 1.67300 | 38.3 |
| 43 | 74.95530 | 0.31620 | | |
| 44 | 79.99120 | 8.20600 | 1.43700 | 95.1 |
| 45 | −37.31670 | variable | | |
| 46 | 63.06970 | 9.91920 | 1.49700 | 81.6 |
| 47 | −99.17320 | 0.20000 | | |
| 48 | 55.94260 | 2.50000 | 1.58144 | 40.7 |
| 49 | 36.03770 | 4.83460 | | |
| 50 | 43.09730 | 14.70570 | 1.43700 | 95.1 |
| 51 | −89.04820 | variable | | |
| 52 | ∞ | 41.75000 | 1.51680 | 64.2 |
| 53 | ∞ | BF | | |
| Image plane | ∞ | | | |

Aspherical Data

1st Surface

K=0.00000E+00, A3=−2.65067E−06, A4=4.62668E−07, A5=1.02356E−09, A6=−5.81330E−11, A7=8.20273E−14, A8=6.76604E−15, A9=2.18048E−17, A10=−5.71783E−19

2nd Surface

K=−9.55907E−01, A3=0.00000E+00, A4=−1.80425E−06, A5=0.00000E+00, A6=9.34430E−11, A7=0.00000E+00, A8=9.19265E−15, A9=0.00000E+00, A10=−1.18438E−18

9th Surface

K=0.00000E+00, A3=0.00000E+00, A4=4.18656E−06, A5=0.00000E+00, A6=4.74295E−08, A7=0.00000E+00, A8=−1.07013E−09, A9=0.00000E+00, A10=0.00000E+00

10th Surface

K=0.00000E+00, A3=0.00000E+00, A4=2.35037E−05, A5=0.00000E+00, A6=7.58692E−08, A7=0.00000E+00, A8=−4.25680E−10, A9=0.00000E+00, A10=0.00000E+00

33rd Surface

K=0.00000E+00, A3=0.00000E+00, A4=9.60708E−06, A5=0.00000E+00, A6=−8.51152E−09, A7=0.00000E+00, A8=4.75793E−12, A9=0.00000E+00, A10=0.00000E+00

34th Surface

K=0.00000E+00, A3=0.00000E+00, A4=9.30721E−06, A5=0.00000E+00, A6=−5.66264E−09, A7=0.00000E+00, A8=2.36850E−12, A9=0.00000E+00, A10=0.00000E+00

TABLE 6

Various data
Zoom ratio 1.07524

| | WIDE-ANGLE | INTER-MEDIATE | TELE-PHOTO |
|---|---|---|---|
| Focal length | −7.2781 | −7.5294 | −7.8257 |
| F number | −1.89960 | −1.90067 | −1.90235 |
| Angle of view | −66.7419 | −66.1476 | −65.4354 |
| Image height | 17.2650 | 17.2650 | 17.2650 |
| Total length of lens | 520.0163 | 520.0156 | 520.0152 |
| BF | 1.01640 | 1.01584 | 1.01552 |
| d30 | 38.9837 | 35.3568 | 31.2138 |
| d36 | 2.0000 | 5.6269 | 9.7698 |
| d45 | 6.2936 | 6.2335 | 6.1191 |
| d51 | 15.3200 | 15.3800 | 15.4944 |
| Position of entrance pupil | 40.7256 | 40.7551 | 40.7942 |
| Position of exit pupil | −616.7026 | −607.9230 | −591.9016 |
| Position of front principal point | 33.3618 | 33.1326 | 32.8652 |
| Position of rear principal point | 527.2465 | 527.4938 | 527.7856 |

TABLE 7

Single lens data

| Lens element | First surface | Focal length |
|---|---|---|
| 1 | 1 | −97.0535 |
| 2 | 3 | −75.7737 |
| 3 | 5 | −72.5965 |
| 4 | 7 | 197.9836 |
| 5 | 9 | 835.3507 |
| 6 | 11 | 48.4926 |
| 7 | 13 | −27.3309 |
| 8 | 15 | 61.4452 |
| 9 | 17 | 141.1827 |
| 10 | 19 | 141.2367 |
| 11 | 21 | 108.0110 |
| 12 | 23 | 104.7466 |
| 13 | 25 | −43.4262 |
| 14 | 27 | −57.1531 |
| 15 | 29 | 63.3946 |
| 16 | 31 | 113.4344 |
| 17 | 33 | −50.5350 |
| 18 | 35 | 53.0458 |
| 19 | 37 | 51.4808 |
| 20 | 40 | −40.1428 |
| 21 | 42 | −37.0201 |
| 22 | 44 | 59.4941 |
| 23 | 46 | 79.1774 |
| 24 | 48 | −182.6283 |
| 25 | 50 | 68.7848 |

TABLE 8

Zoom lens group data

| Group | First surface | Focal length | Total length | Position of front principal point | Position of rear principal point |
|---|---|---|---|---|---|
| 1 | 1 | 20.36658 | 281.39930 | 62.67798 | 133.51296 |
| 2 | 31 | 106.43172 | 61.77500 | 41.99245 | 33.45401 |

TABLE 8-continued

| | | | | | |
|---|---|---|---|---|---|
| 3 | 37 | 103.98710 | 39.31880 | 29.38709 | 30.25682 |
| 4 | 46 | 49.83733 | 32.15950 | 10.71081 | 17.31236 |

| | | Zoom lens group magnification | | |
|---|---|---|---|---|
| Group | First surface | WIDE-ANGLE | INTER-MEDIATE | TELE-PHOTO |
| 1 | 1 | −0.01838 | −0.01838 | −0.01838 |
| 2 | 31 | −1.04663 | −1.08534 | −1.13322 |
| 3 | 37 | −1.92102 | −1.90368 | −1.87104 |
| 4 | 46 | −0.17801 | −0.17920 | −0.18149 |

Numerical Example 3

Regarding the zoom lens system of numerical example 3 (corresponding to example 3), Table 9 shows surface data, Table 10 shows various data, Table 11 shows single lens data, and Table 12 shows zoom lens group data (unit: mm).

TABLE 9

Surface data

| SURFACE NUMBER | r | d | nd | vd |
|---|---|---|---|---|
| Object plane | ∞(infinity) | | | |
| 1* | 89.99630 | 8.59390 | 1.50940 | 56.5 |
| 2* | 29.83290 | 25.73990 | | |
| 3 | 73.68090 | 4.00000 | 1.72916 | 54.7 |
| 4 | 37.62120 | 11.07470 | | |
| 5 | 68.67760 | 2.50000 | 1.72916 | 54.7 |
| 6 | 26.46670 | 24.87000 | | |
| 7 | −82.72950 | 3.00000 | 1.48749 | 70.2 |
| 8 | 193.27580 | 0.20000 | | |
| 9 | 55.40140 | 13.86720 | 1.49700 | 81.6 |
| 10 | −38.61260 | 0.90070 | | |
| 11 | −23.10810 | 2.99370 | 1.73800 | 32.3 |
| 12 | 338.09410 | 0.20000 | | |
| 13 | 243.79390 | 5.98230 | 1.49700 | 81.6 |
| 14 | −22.38130 | 0.20000 | | |
| 15 | −33.81890 | 2.50000 | 1.86966 | 20.0 |
| 16 | −3046.30550 | 1.00820 | | |
| 17 | −129.36060 | 6.90580 | 1.49700 | 81.6 |
| 18 | −29.32500 | 0.20000 | | |
| 19 | −157.80220 | 5.57540 | 1.72916 | 54.7 |
| 20 | −52.92660 | 0.20000 | | |
| 21 | 137.68250 | 9.08670 | 1.49700 | 81.6 |
| 22 | −82.27180 | 70.03820 | | |
| 23 | 144.33300 | 9.45410 | 1.92286 | 20.9 |
| 24 | −743.83350 | 0.20000 | | |
| 25 | 46.39800 | 10.82830 | 1.92286 | 20.9 |
| 26 | 67.85260 | 31.36930 | | |
| 27 | −134.17810 | 3.49510 | 1.59349 | 67.0 |
| 28 | 58.02470 | 26.84610 | | |
| 29 | −174.53030 | 4.00000 | 1.48749 | 70.2 |
| 30 | 113.99230 | 4.75960 | | |
| 31 | −224.81500 | 8.24670 | 1.86966 | 20.0 |
| 32 | −58.15140 | variable | | |
| 33 | 146.52380 | 3.00000 | 1.73800 | 32.3 |
| 34 | 74.42940 | 1.69100 | | |
| 35 | 142.73740 | 4.65510 | 1.72916 | 54.7 |
| 36 | −204.20580 | 36.12080 | | |
| 37 | 255.70130 | 4.77470 | 1.59282 | 68.6 |
| 38 | −76.13990 | variable | | |
| 39(Aperture) | ∞ | 0.00000 | | |
| 40 | 27.70880 | 8.38830 | 1.59270 | 35.4 |
| 41 | −171.98430 | 0.20530 | | |
| 42 | −246.11820 | 2.00000 | 1.65844 | 50.9 |
| 43 | 23.65710 | 12.47240 | | |
| 44 | −30.41040 | 2.00000 | 1.73800 | 32.3 |
| 45 | 64.94710 | 0.44100 | | |
| 46 | 76.95830 | 6.79230 | 1.43700 | 95.1 |
| 47 | −31.53450 | variable | | |
| 48 | 78.74410 | 11.63740 | 1.49700 | 81.6 |
| 49 | −64.61500 | 0.20000 | | |

TABLE 9-continued

Surface data

| SURFACE NUMBER | r | d | nd | vd |
|---|---|---|---|---|
| 50 | 48.33940 | 2.50000 | 1.67300 | 38.3 |
| 51 | 36.05770 | 3.25360 | | |
| 52 | 40.85850 | 14.87760 | 1.43700 | 95.1 |
| 53 | −117.53200 | variable | | |
| 54 | ∞ | 41.75000 | 1.51680 | 64.2 |
| 55 | ∞ | BF | | |
| Image plane | ∞ | | | |

Aspherical Data

1st Surface

K=0.00000E+00, A3=−4.98082E−05, A4=1.02415E−06, A5=−2.94689E−08, A6=7.04235E−10, A7=−6.53517E−12, A8=−1.32511E−14, A9=4.97035E−16, A10=−1.16266E−18, A11=1.10076E−22, A12=−1.04222E−23, A13=−7.34121E−26, A14=−1.19521E−26, A15=5.84967E−29, A16=−1.36553E−32, A17=−1.81844E−33, A18=−1.06538E−35, A19=−2.13620E−37, A20=−9.95976E−39

2nd Surface

K=−9.54170E−01, A3=−1.48327E−05, A4=−2.41212E−06, A5=−5.68248E−10, A6=1.08199E−10, A7=−3.03274E−13, A8=3.45630E−15, A9=9.09825E−17, A10=4.23242E−18, A11=−4.76060E−21, A12=−5.81989E−22, A13=−8.46992E−24, A14=8.97671E−26, A15=−4.55046E−28, A16=−3.81800E−30, A17=1.48597E−32, A18=1.41251E−33, A19=3.80980E−35, A20=−4.85676E−37

TABLE 10

Various data
Zoom ratio 1.07159

| | WIDE-ANGLE | INTER-MEDIATE | TELE-PHOTO |
|---|---|---|---|
| Focal length | −7.2461 | −7.4838 | −7.7648 |
| F number | −1.97041 | −1.97181 | −1.97429 |
| Angle of view | −66.7864 | −66.1701 | −65.4248 |
| Image height | 17.2650 | 17.2650 | 17.2650 |
| Total length of lens | 520.0186 | 520.0315 | 520.0365 |
| BF | 1.01858 | 1.03157 | 1.03656 |
| d32 | 34.3954 | 31.8072 | 28.8643 |
| d38 | 2.0000 | 4.5882 | 7.5311 |
| d47 | 11.6892 | 11.6283 | 11.4986 |
| d53 | 15.3200 | 15.3808 | 15.5105 |
| Position of entrance pupil | 41.5035 | 41.5161 | 41.5337 |
| Position of exit pupil | −3602.6235 | −3265.6740 | −2723.7680 |
| Position of front principal point | 34.2428 | 34.0151 | 33.7467 |
| Position of rear principal point | 527.2172 | 527.4647 | 527.7469 |

TABLE 11

Single lens data

| Lens element | First surface | Focal length |
|---|---|---|
| 1 | 1 | −92.0424 |
| 2 | 3 | −110.5981 |
| 3 | 5 | −60.5692 |
| 4 | 7 | −118.4160 |
| 5 | 9 | 48.1403 |

TABLE 11-continued

| Single lens data | | |
| --- | --- | --- |
| Lens element | First surface | Focal length |
| 6 | 11 | −29.2058 |
| 7 | 13 | 41.5565 |
| 8 | 15 | −39.3391 |
| 9 | 17 | 74.5917 |
| 10 | 19 | 106.8222 |
| 11 | 21 | 105.0609 |
| 12 | 23 | 131.6545 |
| 13 | 25 | 127.9993 |
| 14 | 27 | −67.7935 |
| 15 | 29 | −140.8095 |
| 16 | 31 | 88.1681 |
| 17 | 33 | −208.6590 |
| 18 | 35 | 115.8747 |
| 19 | 37 | 99.4996 |
| 20 | 40 | 40.9024 |
| 21 | 42 | −32.6823 |
| 22 | 44 | −27.8176 |
| 23 | 46 | 52.1803 |
| 24 | 48 | 73.3900 |
| 25 | 50 | −229.6827 |
| 26 | 52 | 71.4189 |

TABLE 12

| Zoom lens group data | | | | | |
| --- | --- | --- | --- | --- | --- |
| Group | First surface | Focal length | Total length | Position of front principal point | Position of rear principal point |
| 1 | 1 | 16.36167 | 298.83590 | 59.39221 | 196.90868 |
| 2 | 33 | 80.54203 | 50.24160 | 37.19334 | 37.42587 |
| 3 | 39 | −74.04702 | 32.29930 | 27.69110 | 28.51657 |
| 4 | 48 | 45.95013 | 32.46860 | 9.73608 | 17.61383 |

| Zoom lens group magnification | | | | |
| --- | --- | --- | --- | --- |
| Group | First surface | WIDE-ANGLE | INTER-MEDIATE | TELE-PHOTO |
| 1 | 1 | −0.01476 | −0.01476 | −0.01476 |
| 2 | 33 | −1.05462 | −1.09161 | −1.13696 |
| 3 | 39 | −1.51335 | −1.50134 | −1.48004 |
| 4 | 48 | −0.27787 | −0.27948 | −0.28241 |

Numerical Example 4

Regarding the zoom lens system of numerical example 4 (corresponding to example 4), Table 13 shows surface data, Table 14 shows various data, Table 15 shows single lens data, and Table 16 shows zoom lens group data (unit: mm).

TABLE 13

| Surface data | | | | |
| --- | --- | --- | --- | --- |
| SURFACE NUMBER | r | d | nd | vd |
| Object plane | ∞(infinity) | | | |
| 1* | 102.89670 | 10.00000 | 1.50940 | 56.5 |
| 2* | 31.58350 | 20.90230 | | |
| 3 | 52.49390 | 3.50000 | 1.80420 | 46.5 |
| 4 | 38.06810 | 11.11230 | | |
| 5 | 66.62750 | 2.50000 | 1.74330 | 49.2 |
| 6 | 25.91550 | 14.61510 | | |
| 7 | −476.15420 | 29.73760 | 1.59270 | 35.4 |
| 8 | 1818.52440 | 2.87470 | | |
| 9* | −17.79050 | 3.51460 | 1.58699 | 59.5 |
| 10* | −18.79510 | 0.20000 | | |

TABLE 13-continued

| Surface data | | | | |
| --- | --- | --- | --- | --- |
| SURFACE NUMBER | r | d | nd | vd |
| 11 | −596.56580 | 10.03480 | 1.49700 | 81.6 |
| 12 | −18.35160 | 0.20000 | | |
| 13 | −21.74040 | 2.50000 | 1.86966 | 20.0 |
| 14 | −618.61420 | 0.43790 | | |
| 15 | −312.69370 | 10.55520 | 1.49700 | 81.6 |
| 16 | −31.49520 | 0.20000 | | |
| 17 | −196.16590 | 7.17640 | 1.48749 | 70.2 |
| 18 | −60.18670 | 1.95440 | | |
| 19 | −346.58290 | 10.00000 | 1.49700 | 81.6 |
| 20 | −59.55810 | 54.34820 | | |
| 21 | 167.48040 | 12.82620 | 1.92286 | 20.9 |
| 22 | −331.21280 | 8.17680 | | |
| 23 | 45.65930 | 12.99900 | 1.92286 | 20.9 |
| 24 | 66.26060 | 29.76290 | | |
| 25 | −248.95030 | 3.00000 | 1.77250 | 49.6 |
| 26 | 54.43690 | 7.78420 | | |
| 27 | −159.54610 | 2.50000 | 1.69680 | 55.5 |
| 28 | 100.51300 | 17.58570 | | |
| 29 | −240.94020 | 8.61860 | 1.86966 | 20.0 |
| 30 | −53.28050 | variable | | |
| 31 | −5306.70620 | 4.91380 | 1.69680 | 55.5 |
| 32 | −53.10680 | 0.20000 | | |
| 33 | −53.99280 | 1.50000 | 1.73800 | 32.3 |
| 34 | −111.83480 | 2.73900 | | |
| 35 | 150.54590 | 3.50470 | 1.59282 | 68.6 |
| 36 | −331.21000 | variable | | |
| 37 | 27.97490 | 8.32580 | 1.59270 | 35.4 |
| 38 | −188.82190 | 0.20000 | | |
| 39(Aperture) | ∞ | 0.73020 | | |
| 40 | −210.55990 | 2.00000 | 1.67300 | 38.3 |
| 41 | 24.31650 | 11.54170 | | |
| 42 | −31.47630 | 2.00000 | 1.67300 | 38.3 |
| 43 | 63.67160 | 0.52010 | | |
| 44 | 79.82010 | 6.41460 | 1.43700 | 95.1 |
| 45 | −33.74870 | variable | | |
| 46 | 81.76500 | 9.78730 | 1.49700 | 81.6 |
| 47 | −63.07500 | 1.71080 | | |
| 48 | 46.02820 | 2.50000 | 1.62299 | 58.1 |
| 49 | 36.59500 | 5.98390 | | |
| 50 | 43.99590 | 12.49800 | 1.43700 | 95.1 |
| 51 | −142.71420 | variable | | |
| 52 | ∞ | 41.75000 | 1.51680 | 64.2 |
| 53 | ∞ | BF | | |
| Image plane | ∞ | | | |

Aspherical Data

1st Surface

K=0.00000E+00, A3=−5.32341E−06, A4=−1.08236E−06, A5=2.61031E−08, A6=−4.27853E−11, A7=−3.00834E−12, A8=5.23078E−15, A9=4.08999E−16, A10=−2.64786E−18

2nd Surface

K=−1.22711E+00, A3=1.51511E−05, A4=−2.64143E−06, A5=7.26941E−09, A6=2.79585E−10, A7=3.15970E−14, A8=−1.39833E−14, A9=−1.99424E−16, A10=1.77284E−18

9th Surface

K=0.00000E+00, A3=0.00000E+00, A4=1.92717E−05, A5=0.00000E+00, A6=1.99778E−07, A7=0.00000E+00, A8=−7.68502E−10, A9=0.00000E+00, A10=−1.41298E−13

10th Surface

K=0.00000E+00, A3=0.00000E+00, A4=2.60433E−05, A5=0.00000E+00, A6=1.52935E−07, A7=0.00000E+00, A8=0.00000E+00, A9=0.00000E+00, A10=0.00000E+00

TABLE 14

Various data
Zoom ratio 1.07110

| | WIDE-ANGLE | INTER-MEDIATE | TELE-PHOTO |
|---|---|---|---|
| Focal length | −7.2477 | −7.4838 | −7.7630 |
| F number | −1.91302 | −1.91539 | −1.91898 |
| Angle of view | −66.7797 | −66.1429 | −65.3812 |
| Image height | 17.2650 | 17.2650 | 17.2650 |
| Total length of lens | 520.0143 | 520.0225 | 520.0253 |
| BF | 1.01429 | 1.02263 | 1.02545 |
| d30 | 70.7792 | 68.0418 | 64.9273 |
| d36 | 2.0407 | 4.7781 | 7.8926 |
| d45 | 12.4233 | 12.3107 | 12.1307 |
| d51 | 15.3200 | 15.4325 | 15.6125 |
| Position of entrance pupil | 41.8940 | 41.9048 | 41.9207 |
| Position of exit pupil | −595.3865 | −578.5443 | −553.5762 |
| Position of front principal point | 34.5582 | 34.3244 | 34.0490 |
| Position of rear principal point | 527.2145 | 527.4558 | 527.7340 |

TABLE 15

Single lens data

| Lens element | First surface | Focal length |
|---|---|---|
| 1 | 1 | −93.9052 |
| 2 | 3 | −193.1403 |
| 3 | 5 | −58.5935 |
| 4 | 7 | −633.6045 |
| 5 | 9 | 1928.6388 |
| 6 | 11 | 37.8786 |
| 7 | 13 | −25.9598 |
| 8 | 15 | 69.6014 |
| 9 | 17 | 175.0808 |
| 10 | 19 | 143.0474 |
| 11 | 21 | 122.0383 |
| 12 | 23 | 122.1421 |
| 13 | 25 | −57.5761 |
| 14 | 27 | −88.1486 |
| 15 | 29 | 77.0151 |
| 16 | 31 | 76.9559 |
| 17 | 33 | −143.0283 |
| 18 | 35 | 175.0641 |
| 19 | 37 | 41.7044 |
| 20 | 40 | −32.2803 |
| 21 | 42 | −31.0355 |
| 22 | 44 | 55.2271 |
| 23 | 46 | 73.2885 |
| 24 | 48 | −319.0770 |
| 25 | 50 | 78.5527 |

TABLE 16

Zoom lens group data

| Group | First surface | Focal length | Total length | Position of front principal point | Position of rear principal point |
|---|---|---|---|---|---|
| 1 | 1 | 18.06918 | 299.61690 | 61.80676 | 194.14445 |
| 2 | 31 | 86.72560 | 12.85750 | 5.51839 | 9.42898 |
| 3 | 37 | −84.26874 | 31.73240 | 30.14098 | 30.24312 |
| 4 | 46 | 46.86150 | 32.48000 | 10.50105 | 16.64953 |

TABLE 16-continued

Zoom lens group magnification

| Group | First surface | WIDE-ANGLE | INTER-MEDIATE | TELE-PHOTO |
|---|---|---|---|---|
| 1 | 1 | −0.01629 | −0.01629 | −0.01629 |
| 2 | 31 | −1.13099 | −1.17286 | −1.22443 |
| 3 | 37 | −1.29779 | −1.28017 | −1.25429 |
| 4 | 46 | −0.27375 | −0.27633 | −0.28023 |

Numerical Example 5

Regarding the zoom lens system of numerical example 5 (corresponding to example 5), Table 17 shows surface data, Table 18 shows various data, Table 19 shows single lens data, and Table 20 shows zoom lens group data (unit: mm).

TABLE 17

Surface data

| SURFACE NUMBER | r | d | nd | vd |
|---|---|---|---|---|
| Object plane | ∞(infinity) | | | |
| 1* | 88.43730 | 10.00000 | 1.50940 | 56.5 |
| 2* | 30.98810 | 21.95040 | | |
| 3 | 56.04410 | 3.50000 | 1.80420 | 46.5 |
| 4 | 36.62330 | 9.14040 | | |
| 5 | 55.73150 | 2.50000 | 1.74330 | 49.2 |
| 6 | 26.55220 | 16.25210 | | |
| 7 | −105.61520 | 23.28420 | 1.59270 | 35.4 |
| 8 | −97.65610 | 10.06170 | | |
| 9* | −15.12600 | 3.96900 | 1.58699 | 59.5 |
| 10* | −17.25600 | 0.20000 | | |
| 11 | −104.21250 | 8.36620 | 1.49700 | 81.6 |
| 12 | −20.24120 | 0.20000 | | |
| 13 | −28.55900 | 2.50000 | 1.86966 | 20.0 |
| 14 | 848.41580 | 0.23680 | | |
| 15 | 1747.45800 | 10.90330 | 1.49700 | 81.6 |
| 16 | −31.06140 | 1.59470 | | |
| 17 | −104.66030 | 5.94050 | 1.48749 | 70.2 |
| 18 | −52.63830 | 4.37260 | | |
| 19 | 1915.34720 | 9.6134 | 1.49700 | 81.6 |
| 20 | −70.73170 | 66.78710 | | |
| 21 | 137.36750 | 11.53820 | 1.92286 | 20.9 |
| 22 | −372.10820 | 0.20000 | | |
| 23 | 40.92760 | 12.35270 | 1.92286 | 20.9 |
| 24 | 59.35410 | 20.43020 | | |
| 25 | 669.30860 | 3.02760 | 1.77250 | 49.6 |
| 26 | 36.71060 | 13.21340 | | |
| 27 | −371.44310 | 2.50000 | 1.69680 | 55.5 |
| 28 | 102.03360 | 22.62050 | | |
| 29 | −159.43290 | 7.07750 | 1.86966 | 20.0 |
| 30 | −57.60810 | variable | | |
| 31 | 466.10450 | 7.88750 | 1.69680 | 55.5 |
| 32 | −53.93730 | 0.20000 | | |
| 33 | −54.28910 | 1.50000 | 1.73800 | 32.3 |
| 34 | −143.19360 | 13.95850 | | |
| 35 | 354.82120 | 3.58320 | 1.59282 | 68.6 |
| 36 | −138.11420 | variable | | |
| 37 | 27.98990 | 8.45390 | 1.59270 | 35.4 |
| 38 | −196.94770 | 0.20000 | | |
| 39(Aperture) | ∞ | 0.69920 | | |
| 40 | −223.46150 | 2.00000 | 1.67300 | 38.3 |
| 41 | 23.80580 | 10.22400 | | |
| 42 | −32.31480 | 2.00000 | 1.67300 | 38.3 |
| 43 | 63.33780 | 0.49290 | | |
| 44 | 77.01980 | 7.22850 | 1.43700 | 95.1 |
| 45 | −33.87480 | variable | | |
| 46 | 78.21220 | 9.28860 | 1.49700 | 81.6 |
| 47 | −70.36380 | 4.75950 | | |
| 48 | 43.61550 | 2.50000 | 1.62299 | 58.1 |
| 49 | 36.62400 | 6.12930 | | |

TABLE 17-continued

Surface data

| SURFACE NUMBER | r | d | nd | vd |
|---|---|---|---|---|
| 50 | 45.69070 | 12.00850 | 1.43700 | 95.1 |
| 51 | −149.98300 | variable | | |
| 52 | ∞ | 41.75000 | 1.51680 | 64.2 |
| 53 | ∞ | BF | | |
| Image plane | ∞ | | | |

Aspherical Data

1st Surface

K=0.00000E+00, A3=−1.80686E−05, A4=−1.24260E−06, A5=2.82728E−08, A6=−4.68886E−11, A7=−3.14281E−12, A8=3.69704E−15, A9=4.05487E−16, A10=−2.70992E−18

2nd Surface

K=−1.29848E+00, A3=9.60558E−06, A4=−2.58551E−06, A5=8.15356E−09, A6=2.89291E−10, A7=7.31407E−14, A8=−1.40654E−14, A9=−2.05740E−16, A10=1.87867E−18

9th Surface

K=0.00000E+00, A3=0.00000E+00, A4=2.17129E−05, A5=0.00000E+00, A6=2.20039E−07, A7=0.00000E+00, A8=−6.23863E−10, A9=0.00000E+00, A10=1.23212E−12

10th Surface

K=0.00000E+00, A3=0.00000E+00, A4=2.79313E−05, A5=0.00000E+00, A6=1.44206E−07, A7=0.00000E+00, A8=0.00000E+00, A9=0.00000E+00, A10=0.00000E+00

TABLE 18

Various data
Zoom ratio 1.07174

| | WIDE-ANGLE | INTER-MEDIATE | TELE-PHOTO |
|---|---|---|---|
| Focal length | −7.2510 | −7.4894 | −7.7712 |
| F number | −1.91320 | −1.91666 | −1.92171 |
| Angle of view | −66.7701 | −66.1350 | −65.3775 |
| Image height | 17.2650 | 17.2650 | 17.2650 |
| Total length of lens | 520.0113 | 520.0208 | 520.0231 |
| BF | 1.01163 | 1.02116 | 1.02339 |
| d30 | 49.7749 | 46.9581 | 43.7513 |
| d36 | 2.0000 | 4.8168 | 8.0236 |
| d45 | 12.7087 | 12.5347 | 12.2749 |
| d51 | 15.3200 | 15.4939 | 15.7538 |
| Position of entrance pupil | 43.3307 | 43.3465 | 43.3682 |
| Position of exit pupil | −594.6793 | −570.5253 | −538.0230 |
| Position of front principal point | 35.9915 | 35.7590 | 35.4849 |
| Position of rear principal point | 527.2149 | 527.4596 | 527.7398 |

TABLE 19

Single lens data

| Lens element | First surface | Focal length |
|---|---|---|
| 1 | 1 | −99.4905 |
| 2 | 3 | −142.8978 |
| 3 | 5 | −70.8149 |
| 4 | 7 | 1046.7742 |
| 5 | 9 | −671.7381 |

TABLE 19-continued

Single lens data

| Lens element | First surface | Focal length |
|---|---|---|
| 6 | 11 | 48.9258 |
| 7 | 13 | −31.7277 |
| 8 | 15 | 61.5319 |
| 9 | 17 | 209.3991 |
| 10 | 19 | 137.4705 |
| 11 | 21 | 109.9108 |
| 12 | 23 | 108.0791 |
| 13 | 25 | −50.3847 |
| 14 | 27 | −114.6269 |
| 15 | 29 | 100.4704 |
| 16 | 31 | 69.8133 |
| 17 | 33 | −119.3380 |
| 18 | 35 | 168.1546 |
| 19 | 37 | 41.9344 |
| 20 | 40 | −31.8635 |
| 21 | 42 | −31.5293 |
| 22 | 44 | 54.9265 |
| 23 | 46 | 76.1079 |
| 24 | 48 | −425.0804 |
| 25 | 50 | 81.6652 |

TABLE 20

Zoom lens group data

| Group | First surface | Focal length | Total length | Position of front principal point | Position of rear principal point |
|---|---|---|---|---|---|
| 1 | 1 | 17.35441 | 304.33250 | 62.31153 | 187.32213 |
| 2 | 31 | 88.53910 | 27.12920 | 13.11252 | 17.33570 |
| 3 | 37 | −86.17768 | 31.29850 | 27.74377 | 28.59629 |
| 4 | 46 | 48.19888 | 34.68590 | 11.58527 | 16.86729 |

Zoom lens group magnification

| Group | First surface | WIDE-ANGLE | INTER-MEDIATE | TELE-PHOTO |
|---|---|---|---|---|
| 1 | 1 | −0.01563 | −0.01563 | −0.01563 |
| 2 | 31 | −1.20081 | −1.24850 | −1.30763 |
| 3 | 37 | −1.24638 | −1.22154 | −1.18740 |
| 4 | 46 | −0.27960 | −0.28341 | −0.28884 |

Numerical Example 6

Regarding the zoom lens system of numerical example 6 (corresponding to example 6), Table 91 shows surface data, Table 22 shows various data, Table 23 shows single lens data, and Table 24 shows zoom lens group data (unit: mm).

TABLE 21

Surface data

| SURFACE NUMBER | r | d | nd | vd |
|---|---|---|---|---|
| Object plane | ∞(infinity) | | | |
| 1* | 99.66580 | 10.00000 | 1.50940 | 56.5 |
| 2* | 31.15430 | 21.16210 | | |
| 3 | 57.06200 | 3.50000 | 1.80420 | 46.5 |
| 4 | 36.93080 | 7.73380 | | |
| 5 | 50.81200 | 2.50000 | 1.74330 | 49.2 |
| 6 | 27.51500 | 15.31740 | | |
| 7 | −205.41930 | 28.15950 | 1.59270 | 35.4 |
| 8 | −642.59470 | 6.06970 | | |
| 9* | −16.11230 | 3.67340 | 1.58699 | 59.5 |
| 10* | −18.27770 | 0.20000 | | |
| 11 | −302.65750 | 10.86660 | 1.49700 | 81.6 |

TABLE 21-continued

Surface data

| SURFACE NUMBER | r | d | nd | vd |
|---|---|---|---|---|
| 12 | −20.29530 | 0.20000 | | |
| 13 | −27.24440 | 2.50000 | 1.86966 | 20.0 |
| 14 | −3012.85830 | 0.48370 | | |
| 15 | −539.62060 | 11.67900 | 1.49700 | 81.6 |
| 16 | −33.64020 | 0.20000 | | |
| 17 | −180.36270 | 7.17790 | 1.48749 | 70.2 |
| 18 | −62.86680 | 0.20000 | | |
| 19 | 456.34570 | 10.00000 | 1.49700 | 81.6 |
| 20 | −87.38400 | 69.03230 | | |
| 21 | 143.62540 | 12.97490 | 1.92286 | 20.9 |
| 22 | −438.58710 | 0.20000 | | |
| 23 | 44.62770 | 13.58550 | 1.92286 | 20.9 |
| 24 | 62.77010 | 25.96680 | | |
| 25 | 1119.09760 | 3.00000 | 1.77250 | 49.6 |
| 26 | 38.04470 | 11.59990 | | |
| 27 | −248.66770 | 2.50000 | 1.69680 | 55.5 |
| 28 | 143.52430 | 19.89390 | | |
| 29 | −149.66720 | 6.44170 | 1.86966 | 20.0 |
| 30 | −56.09200 | variable | | |
| 31 | −663.22970 | 4.75210 | 1.69680 | 55.5 |
| 32 | −52.42210 | 0.20000 | | |
| 33 | −54.07600 | 1.50000 | 1.73800 | 32.3 |
| 34 | −100.66200 | 0.20000 | | |
| 35 | 120.83860 | 3.54940 | 1.59282 | 68.6 |
| 36 | −594.16750 | variable | | |
| 37 | 27.69060 | 8.19560 | 1.59270 | 35.4 |
| 38 | −222.25250 | 0.20000 | | |
| 39(Aperture) | ∞ | 0.59300 | | |
| 40 | −283.00080 | 2.00000 | 1.67300 | 38.3 |
| 41 | 23.87620 | 10.74910 | | |
| 42 | −32.12210 | 2.00000 | 1.67300 | 38.3 |
| 43 | 62.94480 | 0.60160 | | |
| 44 | 83.73990 | 6.33940 | 1.43700 | 95.1 |
| 45 | −34.32250 | variable | | |
| 46 | 80.53540 | 9.61270 | 1.49700 | 81.6 |
| 47 | −63.58790 | 1.57030 | | |
| 48 | 44.32190 | 2.50000 | 1.62299 | 58.1 |
| 49 | 36.50970 | 7.88690 | | |
| 50 | 46.15500 | 12.12990 | 1.43700 | 95.1 |
| 51 | −138.83570 | variable | | |
| 52 | ∞ | 41.75000 | 1.51680 | 64.2 |
| 53 | ∞ | BF | | |
| Image plane | ∞ | | | |

Aspherical Data

1st Surface

K=0.00000E+00, A3=−1.74067E−05, A4=−8.55706E−07, A5=2.47548E−08, A6=−5.71120E−11, A7=−2.95249E−12, A8=6.30469E−15, A9=4.04186E−16, A10=−2.73602E−18

2nd Surface

K=−1.29979E+00, A3=3.56842E−06, A4=−2.46793E−06, A5=9.34818E−09, A6=2.89223E−10, A7=−1.38298E−13, A8=−1.85781E−14, A9=−2.48923E−16, A10=2.68573E−18

9th Surface

K=0.00000E+00, A3=0.00000E+00, A4=2.51303E−05, A5=0.00000E+00, A6=1.94136E−07, A7=0.00000E+00, A8=−4.58227E−10, A9=0.00000E+00, A10=4.69317E−13

10th Surface

K=0.00000E+00, A3=0.00000E+00, A4=2.81131E−05, A5=0.00000E+00, A6=1.45179E−07, A7=0.00000E+00, A8=0.00000E+00, A9=0.00000E+00, A10=0.00000E+00

TABLE 22

Various data
Zoom ratio 1.07125

| | WIDE-ANGLE | INTER-MEDIATE | TELE-PHOTO |
|---|---|---|---|
| Focal length | −7.2308 | −7.4669 | −7.7460 |
| F number | −1.91327 | −1.91616 | −1.92042 |
| Angle of view | −66.8273 | −66.1800 | −65.4092 |
| Image height | 17.2650 | 17.2650 | 17.2650 |
| Total length of lens | 520.0160 | 520.0238 | 520.0243 |
| BF | 1.01594 | 1.02379 | 1.02437 |
| d30 | 65.7460 | 63.0911 | 60.0737 |
| d36 | 2.2088 | 4.8638 | 7.8811 |
| d45 | 12.5772 | 12.4452 | 12.2397 |
| d51 | 15.3200 | 15.4518 | 15.6573 |
| Position of entrance pupil | 41.3329 | 41.3427 | 41.3572 |
| Position of exit pupil | −595.0768 | −575.7057 | −548.0188 |
| Position of front principal point | 34.0143 | 33.7791 | 33.5018 |
| Position of rear principal point | 527.1996 | 527.4403 | 527.7161 |

TABLE 23

Single lens data

| Lens element | First surface | Focal length |
|---|---|---|
| 1 | 1 | −93.5797 |
| 2 | 3 | −141.1025 |
| 3 | 5 | −84.6081 |
| 4 | 7 | −521.9422 |
| 5 | 9 | −621.9251 |
| 6 | 11 | 43.2188 |
| 7 | 13 | −31.6257 |
| 8 | 15 | 71.6381 |
| 9 | 17 | 194.0754 |
| 10 | 19 | 148.4734 |
| 11 | 21 | 118.5059 |
| 12 | 23 | 123.0784 |
| 13 | 25 | −51.0437 |
| 14 | 27 | −130.2570 |
| 15 | 29 | 99.9603 |
| 16 | 31 | 81.4290 |
| 17 | 33 | −160.5229 |
| 18 | 35 | 169.7001 |
| 19 | 37 | 42.0565 |
| 20 | 40 | −32.6314 |
| 21 | 42 | −31.3371 |
| 22 | 44 | 56.6327 |
| 23 | 46 | 73.1136 |
| 24 | 48 | −379.0439 |
| 25 | 50 | 80.8789 |

TABLE 24

Zoom lens group data

| Group | First surface | Focal length | Total length | Position of front principal point | Position of rear principal point |
|---|---|---|---|---|---|
| 1 | 1 | 17.56673 | 306.81810 | 60.72090 | 201.50830 |
| 2 | 31 | 84.37000 | 10.20150 | 4.28026 | 8.19655 |
| 3 | 37 | −82.72585 | 30.67870 | 28.45123 | 28.97178 |
| 4 | 46 | 47.12030 | 33.69980 | 11.38892 | 16.93941 |

TABLE 24-continued

| | | Zoom lens group magnification | | |
|---|---|---|---|---|
| Group | First surface | WIDE-ANGLE | INTER-MEDIATE | TELE-PHOTO |
| 1 | 1 | −0.01584 | −0.01584 | −0.01584 |
| 2 | 31 | −1.15384 | −1.19731 | −1.25088 |
| 3 | 37 | −1.24721 | −1.22845 | −1.20166 |
| 4 | 46 | −0.28652 | −0.28949 | −0.29386 |

Numerical Example 7

Regarding the zoom lens system of numerical example 7 (corresponding to example 7), Table 25 shows surface data, Table 26 shows various data, Table 27 shows single lens data, and Table 28 shows zoom lens group data (unit: mm).

TABLE 25

| | Surface data | | | |
|---|---|---|---|---|
| SURFACE NUMBER | r | d | nd | vd |
| Object plane | ∞(infinity) | | | |
| 1* | 94.83650 | 8.00000 | 1.50940 | 56.5 |
| 2* | 32.65770 | 9.89290 | | |
| 3 | 61.26280 | 4.00000 | 1.80420 | 46.5 |
| 4 | 45.77930 | 20.08130 | | |
| 5 | 79.19320 | 2.66040 | 1.74330 | 49.2 |
| 6 | 29.23810 | 22.00300 | | |
| 7 | −115.06770 | 14.29440 | 1.59270 | 35.4 |
| 8 | −125.93070 | 14.25190 | | |
| 9* | −15.41130 | 3.48450 | 1.58699 | 59.5 |
| 10* | −17.51970 | 0.20000 | | |
| 11 | −154.21760 | 9.42060 | 1.49700 | 81.6 |
| 12 | −20.48120 | 0.20000 | | |
| 13 | −27.55080 | 2.50000 | 1.86966 | 20.0 |
| 14 | 2376.06500 | 0.62580 | | |
| 15 | −1176.16180 | 11.72110 | 1.49700 | 81.6 |
| 16 | −37.11450 | 0.50060 | | |
| 17 | −155.74230 | 7.86250 | 1.48749 | 70.2 |
| 18 | −54.47480 | 0.20000 | | |
| 19 | 869.16730 | 10.00000 | 1.49700 | 81.6 |
| 20 | −77.39740 | 80.24410 | | |
| 21 | 136.35560 | 13.12770 | 1.92286 | 20.9 |
| 22 | −534.37280 | 0.20000 | | |
| 23 | 45.70790 | 14.00000 | 1.92286 | 20.9 |
| 24 | 65.18520 | 23.73660 | | |
| 25 | 383.53820 | 3.50000 | 1.77250 | 49.6 |
| 26 | 38.19620 | 11.98520 | | |
| 27 | −272.93710 | 2.50000 | 1.69680 | 55.5 |
| 28 | 103.79030 | 19.81240 | | |
| 29 | −215.45580 | 6.46750 | 1.86966 | 20.0 |
| 30 | −61.70410 | variable | | |
| 31 | −564.66740 | 4.81810 | 1.69680 | 55.5 |
| 32 | −56.30910 | 0.20000 | | |
| 33 | −58.46110 | 1.57040 | 1.73800 | 32.3 |
| 34 | −97.51240 | 3.96420 | | |
| 35 | 123.37100 | 3.46770 | 1.59282 | 68.6 |
| 36 | −494.17440 | variable | | |
| 37 | 27.47700 | 8.07910 | 1.59270 | 35.4 |
| 38 | −193.85750 | 0.20000 | | |
| 39(Aperture) | ∞ | 0.63890 | | |
| 40 | −234.45360 | 2.00000 | 1.67300 | 38.3 |
| 41 | 23.51640 | 8.71820 | | |
| 42 | −32.12530 | 2.00000 | 1.67300 | 38.3 |
| 43 | 65.03560 | 0.67300 | | |
| 44 | 94.76020 | 6.39860 | 1.43700 | 95.1 |
| 45 | −33.49250 | variable | | |
| 46 | 81.67170 | 14.24010 | 1.49700 | 81.6 |
| 47 | −62.18810 | 0.27720 | | |
| 48 | 44.33880 | 2.50000 | 1.62299 | 58.1 |
| 49 | 36.77280 | 6.81730 | | |

TABLE 25-continued

| | Surface data | | | |
|---|---|---|---|---|
| SURFACE NUMBER | r | d | nd | vd |
| 50 | 45.41700 | 12.12120 | 1.43700 | 95.1 |
| 51 | −147.50210 | variable | | |
| 52 | ∞ | 41.75000 | 1.51680 | 64.2 |
| 53 | ∞ | BF | | |
| Image plane | ∞ | | | |

Aspherical Data

1st Surface
K=0.00000E+00, A3=−1.52651E−05, A4=−9.94232E−07, A5=2.44429E−08, A6=−1.95730E−11, A7=−3.08842E−12, A8=2.25161E−15, A9=4.13973E−16, A10=−2.55437E−18

2nd Surface
K=−1.34729E+00, A3=9.87687E−06, A4=−2.47222E−06, A5=9.33782E−09, A6=2.90162E−10, A7=−1.04007E−13, A8=−1.82010E−14, A9=−2.48249E−16, A10=2.59959E−18

9th Surface
K=0.00000E+00, A3=0.00000E+00, A4=2.53409E−05, A5=0.00000E+00, A6=2.16366E−07, A7=0.00000E+00, A8=−3.24181E−10, A9=0.00000E+00, A10=1.24182E−13

10th Surface
K=0.00000E+00, A3=0.00000E+00, A4=2.70872E−05, A5=0.00000E+00, A6=1.50922E−07, A7=0.00000E+00, A8=0.00000E+00, A9=0.00000E+00, A10=0.00000E+00

TABLE 26

| | Various data Zoom ratio 1.07093 | | |
|---|---|---|---|
| | WIDE-ANGLE | INTER-MEDIATE | TELE-PHOTO |
| Focal length | −7.2295 | −7.4654 | −7.7423 |
| F number | −1.91923 | −1.92230 | −1.92676 |
| Angle of view | −66.8342 | −66.1810 | −65.4093 |
| Image height | 17.2650 | 17.2650 | 17.2650 |
| Total length of lens | 530.0173 | 530.0245 | 530.0243 |
| BF | 1.01775 | 1.02488 | 1.02469 |
| d30 | 60.9650 | 58.3362 | 55.3677 |
| d36 | 2.1970 | 4.8259 | 7.7943 |
| d45 | 12.6019 | 12.4620 | 12.2498 |
| d51 | 15.3292 | 15.4690 | 15.6813 |
| Position of entrance pupil | 41.5519 | 41.5637 | 41.5806 |
| Position of exit pupil | −594.4349 | −573.6290 | −544.7992 |
| Position of front principal point | 34.2345 | 34.0013 | 33.7285 |
| Position of rear principal point | 537.1997 | 537.4395 | 537.7124 |

TABLE 27

| | Single lens data | |
|---|---|---|
| Lens element | First surface | Focal length |
| 1 | 1 | −102.2211 |
| 2 | 3 | −254.5452 |
| 3 | 5 | −63.8070 |
| 4 | 7 | −4410.2316 |
| 5 | 9 | −561.2435 |

TABLE 27-continued

| Single lens data | | |
|---|---|---|
| Lens element | First surface | Focal length |
| 6 | 11 | 46.4351 |
| 7 | 13 | −31.3016 |
| 8 | 15 | 76.8482 |
| 9 | 17 | 167.5923 |
| 10 | 19 | 143.4998 |
| 11 | 21 | 118.8321 |
| 12 | 23 | 123.2428 |
| 13 | 25 | −55.1573 |
| 14 | 27 | −107.6219 |
| 15 | 29 | 97.5183 |
| 16 | 31 | 89.4138 |
| 17 | 33 | −201.2403 |
| 18 | 35 | 166.8811 |
| 19 | 37 | 41.1628 |
| 20 | 40 | −31.6586 |
| 21 | 42 | −31.6891 |
| 22 | 44 | 57.4995 |
| 23 | 46 | 73.4509 |
| 24 | 48 | −396.1540 |
| 25 | 50 | 81.0098 |

TABLE 28

| Zoom lens group data | | | | | |
|---|---|---|---|---|---|
| Group | First surface | Focal length | Total length | Position of front principal point | Position of rear principal point |
| 1 | 1 | 17.67884 | 317.47250 | 61.08007 | 212.01761 |
| 2 | 31 | 83.48585 | 14.02040 | 6.33935 | 10.23768 |
| 3 | 37 | −82.35184 | 28.70780 | 25.69887 | 26.84023 |
| 4 | 46 | 46.71049 | 35.95580 | 12.56350 | 19.78117 |

| Zoom lens group magnification | | | | |
|---|---|---|---|---|
| Group | First surface | WIDE-ANGLE | INTER-MEDIATE | TELE-PHOTO |
| 1 | 1 | −0.01594 | −0.01594 | −0.01594 |
| 2 | 31 | −1.17070 | −1.21551 | −1.27041 |
| 3 | 37 | −1.22561 | −1.20566 | −1.17781 |
| 4 | 46 | −0.28551 | −0.28865 | −0.29319 |

Table 29 below shows the corresponding values of the respective conditions (1) to (17) in the respective numerical examples.

TABLE 29

| Cond. | Ex. 1 | Ex. 2 | Ex. 3 | Ex. 4 | Ex. 5 | Ex. 6 | Ex. 7 |
|---|---|---|---|---|---|---|---|
| (1) | 0.016 | 0.016 | 0.016 | 0.016 | 0.016 | 0.016 | 0.016 |
| (2) | 56.5 | 56.5 | 56.5 | 56.5 | 56.5 | 56.5 | 56.5 |
| (3) | 0.48 | 0.5 | 0.37 | 0.47 | 0.56 | 0.60 | 0.62 |
| (4) | 8.74 | 7.60 | 9.67 | 7.50 | 9.21 | 9.55 | 11.10 |
| (5) | 5.5 | 5.18 | 5.22 | 6.84 | 4.03 | 5.07 | 4.73 |
| (6) | | | See (6), (7) in Tables 33 and 34 | | | | |
| (7) | | | | | | | |
| (8) | >0 | >0 | >0 | >0 | >0 | >0 | >0 |
| (9) | 1.9459 | 1.5832 | 1.9917 | 1.8858 | 2.0788 | 1.9095 | 2.0504 |
| (10) | 3.07 | 3.94 | 3.55 | 2.88 | 3.03 | 2.93 | 1.37 |
| (11) | 13.207 | 13.335 | 12.702 | 12.957 | 13.721 | 12.942 | 14.139 |
| (12) | −5.5351 | −5.6214 | −5.3312 | −5.4391 | −5.7626 | −5.4202 | −5.9207 |
| (13) | 7.1185 | 7.4505 | 7.1145 | 7.0394 | 6.9722 | 6.2401 | 6.5704 |
| (14) | 3.1145 | 4.4294 | 3.0167 | 3.2579 | 2.8539 | 3.1991 | 2.9040 |
| (15) | 0.5792 | 0.5792 | 0.4978 | 0.5792 | 0.5792 | 0.5792 | 0.4634 |
| (16) | 5.6585 | 9.5607 | 5.2126 | 5.9598 | 5.1223 | 5.7727 | 5.4930 |

Table 30 below shows values of the variables of the respective conditions (1) to (17) in the respective numerical examples.

TABLE 30

| Var. | Ex. 1 | Ex. 2 | Ex. 3 | Ex. 4 | Ex. 5 | Ex. 6 | Ex. 7 |
|---|---|---|---|---|---|---|---|
| vdn | 56.5 | 56.5 | 56.5 | 56.5 | 56.5 | 56.5 | 56.5 |
| ngn | 1.52080 | 1.52080 | 1.52080 | 1.52080 | 1.52080 | 1.52080 | 1.52080 |
| nfn | 1.51574 | 1.51574 | 1.51574 | 1.51574 | 1.51574 | 1.51574 | 1.51574 |
| ncn | 1.50672 | 1.50672 | 1.50672 | 1.50672 | 1.50672 | 1.50672 | 1.50672 |
| Ts | 63.2 | 55.3 | 70.0 | 54.3 | 66.8 | 69.0 | 80.2 |
| Tpr | 39.77 | 37.71 | 38.24 | 49.56 | 29.21 | 36.65 | 34.23 |
| T1 | 22.18 | 28.66 | 25.74 | 20.90 | 21.95 | 21.16 | 9.89 |
| TL1 | 10.0000 | 10.0000 | 8.5939 | 10.0000 | 10.0000 | 10.0000 | 8.0000 |
| fp | 13.59 | 13.18 | 13.10 | 13.34 | 14.27 | 15.00 | 15.56 |
| fr | 28.25 | 26.61 | 35.16 | 28.63 | 25.58 | 25.06 | 24.92 |
| fw | −7.24 | −7.28 | −7.25 | −7.25 | −7.25 | −7.23 | −7.23 |
| f1 | −95.56 | −97.05 | −92.04 | −93.91 | −99.49 | −93.58 | −102.22 |
| ωm | 66.38 | 66.31 | 66.30 | 66.34 | 66.39 | 66.45 | 66.39 |
| ym | | | See ym in Tables 31 and 32 | | | | |
| L1R1 | 97.6935 | 165.066 | 89.9963 | 102.8967 | 88.4373 | 99.6658 | 94.8365 |
| L1R2 | 31.3677 | 37.2664 | 29.8329 | 31.5835 | 30.9881 | 31.1543 | 32.6577 |
| Ymax | 17.265 | 17.265 | 17.265 | 17.265 | 17.265 | 17.265 | 17.265 | vdn is an Abbe number of the first lens element, ngn is a refractive index of the first lens element for a g-line, nfn is a refractive index of the first lens element for an F-line, ncn is a refractive index of the first lens element for a C-line, Ts is the longest air distance, Tpr is a distance from a surface closest to the magnification side of the magnification optical system rear group to the intermediate imaging position.

T1 is an air distance between the first lens element and the second lens element, TL1 is a center thickness of the first lens element, fp is a focal length of the magnification optical system, fr is a focal length of the relay optical system at the wide-angle end.

fw is a focal length of the entire optical system at the wide-angle end, f1 is a focal length of the first lens element, ωm is a maximum half angle of view at the wide-angle end, ym is a height at the telephoto end at which the most off-axis main ray passes through a lens surface, L1R1 is a center curvature radius of the first lens magnification side surface, L1R2 is a center curvature radius of the first lens reduction side surface, and Ymax is a maximum image height.

Tables 31 and 32A-32B below show values of |ym/ (fw·tan(ωm))| in the condition (6) and Tg in the condition (7) in the respective numerical examples. Note that the lens material, Z330R, is the product name of cyclo-olefin polymers (COP) (ZEON). The lens element L1 can be also made of various synthetic resins, resulting in a lightweight lens. The remaining lens elements L2 to L26 can be also made of various synthetic resins, resulting in lightweight lenses.

TABLE 31

| | Example 1 | | Example 2 | | Example 3 | |
|---|---|---|---|---|---|---|
| | Lens material | ym | Lens material | ym | Lens material | ym |
| L1 | Z330R | 54.6 | Z330R | 55.9 | Z330R | 59.4 |
| L2 | TAF3D | 28.8 | NBFD10 | 22.6 | TAC8 | 29.6 |
| L3 | NBF1 | 19.4 | TAF3D | 17.1 | TAC8 | 19.8 |
| L4 | FF5 | −0.8 | FCD1 | 0.1 | S–FSL 5 | 4.3 |
| L5 | K-CSK120 | −3.0 | K-CSK120 | −1.8 | FCD1 | −2.5 |
| L6 | FCD1 | −5.2 | FCD1 | −3.3 | S-NBH53V | −3.1 |
| L7 | FDS20-W | −9.0 | FDS20-W | −6.5 | FCD1 | −4.8 |
| L8 | FCD1 | −11.2 | FCD1 | −8.4 | FDS20-W | −7.7 |
| L9 | S-FSL 5 | −17.2 | S-FSL 5 | −14.1 | FCD1 | −10.0 |
| L10 | FCD1 | −20.4 | FCD1 | −19.9 | TAC8 | −14.5 |
| L11 | E-FDS1-W | −39.8 | TAF3D | −37.1 | FCD1 | −17.9 |
| L12 | E-FDS1-W | −34.7 | E-FDS1-W | −32.0 | E-FDS1-W | −39.0 |
| L13 | TAF1 | −21.1 | TAF1 | −19.9 | E-FDS1-W | −36.2 |
| L14 | LAC14 | −20.3 | BACD16 | −19.7 | PCD51 | −23.6 |
| L15 | FDS20-W | −21.6 | TAF3D | −25.3 | S-FSL 5 | −21.4 |
| L16 | LAC14 | −7.6 | TAC8 | −19.2 | FDS20-W | −21.5 |
| L17 | S-NBH53V | −7.3 | K-CSK120 | −6.1 | S-NBH53V | −12.4 |
| L18 | FCD515 | −4.2 | FCD100 | −4.4 | TAC8 | −11.7 |
| L19 | FF5 | −0.1 | FF5 | −0.1 | FCD515 | −0.6 |
| L20 | S-NBH52V | 0.3 | BACED5 | 0.1 | FF5 | 0.0 |
| L21 | S-NBH52V | 4.7 | S-NBH52V | 6.9 | BACED5 | 1.6 |
| L22 | FCD100 | 5.7 | FCD100 | 7.9 | S-NBH53V | 6.1 |
| L23 | FCD1 | 13.3 | FCD1 | 13.6 | FCD100 | 7.2 |
| L24 | BACD15 | 15.9 | S-TIL25 | 15.3 | FCD1 | 15.5 |
| L25 | FCD100 | 17.2 | FCD100 | 16.7 | S-NBH52V | 17.7 |
| L26 | | | | | FCD100 | 18.6 |

TABLE 32A

| | Example 4 | | Example 5 | |
|---|---|---|---|---|
| | Lens material | ym | Lens material | ym |
| L1 | Z330R | 54.7 | Z330R | 54.5 |
| L2 | TAF3D | 29.7 | TAF3D | 28.8 |
| L3 | NBF1 | 19.2 | NBF1 | 20.2 |
| L4 | FF5 | 0.6 | FF5 | 5.0 |
| L5 | K-CSK120 | 3.0 | K-CSK120 | 2.9 |
| L6 | FCD1 | 5.5 | FCD1 | 5.3 |
| L7 | FDS20-W | 9.3 | FDS20-W | 8.6 |
| L8 | FCD1 | 11.7 | FCD1 | 10.2 |
| L9 | S-FSL 5 | 17.9 | S-FSL 5 | 15.9 |
| L10 | FCD1 | 21.9 | FCD1 | 20.4 |
| L11 | E-FDS1-W | 39.8 | E-FDS1-W | 37.6 |
| L12 | E-FDS1-W | 34.4 | E-FDS1-W | 32.1 |
| L13 | TAF1 | 21.0 | TAF1 | 20.6 |
| L14 | LAC14 | 20.5 | LAC14 | 19.2 |
| L15 | FDS20-W | 22.1 | FDS20-W | 19.5 |
| L16 | LAC14 | 5.9 | LAC14 | 9.0 |
| L17 | S-NBH53V | 5.6 | S-NBH53V | 8.7 |
| L18 | FCD515 | 4.2 | FCD515 | 4.3 |
| L19 | FF5 | 0.1 | FF5 | 0.1 |
| L20 | S-NBH52V | 0.3 | S-NBH52V | 0.2 |
| L21 | S-NBH52V | 4.8 | S-NBH52V | 4.3 |
| L22 | FCD100 | 5.8 | FCD100 | 5.3 |
| L23 | FCD1 | 13.4 | FCD1 | 13.0 |
| L24 | BACD15 | 15.7 | BACD15 | 15.8 |
| L25 | FCD100 | 17.2 | FCD100 | 17.2 |

TABLE 32B

| | Example 6 | | Example 7 | |
|---|---|---|---|---|
| | Lens material | ym | Lens material | ym |
| L1 | Z330R | 52.8 | Z330R | 57.7 |
| L2 | TAF3D | 28.4 | TAF3D | 39.5 |
| L3 | NBF1 | 20.6 | NBF1 | 22.9 |
| L4 | FF5 | 1.4 | FF5 | 7.6 |
| L5 | K-CSK120 | 3.8 | K-CSK120 | 3.9 |
| L6 | FCD1 | 6.6 | FCD1 | 6.4 |
| L7 | FDS20-W | 10.8 | FDS20-W | 10.0 |
| L8 | FCD1 | 13.2 | FCD1 | 12.3 |
| L9 | S-FSL 5 | 19.6 | S-FSL 5 | 18.5 |
| L10 | FCD1 | 23.3 | FCD1 | 22.3 |
| L11 | E-FDS1-W | 42.2 | E-FDS1-W | 42.7 |
| L12 | E-FDS1-W | 35.9 | E-FDS1-W | 35.9 |
| L13 | TAF1 | 21.4 | TAF1 | 21.9 |
| L14 | LAC14 | 20.5 | LAC14 | 20.6 |
| L15 | FDS20-W | 20.7 | FDS20-W | 20.8 |
| L16 | LAC14 | 5.2 | LAC14 | 6.4 |
| L17 | S-NBH53V | 4.9 | S-NBH53V | 6.1 |
| L18 | FCD515 | 4.2 | FCD515 | 4.3 |
| L19 | FF5 | 0.1 | FF5 | 0.1 |
| L20 | S-NBH52V | 0.2 | S-NBH52V | 0.2 |
| L21 | S-NBH52V | 4.4 | S-NBH52V | 3.9 |
| L22 | FCD100 | 5.5 | FCD100 | 4.9 |
| L23 | FCD1 | 13.0 | FCD1 | 12.5 |
| L24 | BACD15 | 15.3 | BACD15 | 15.6 |
| L25 | FCD100 | 17.2 | FCD100 | 17.2 |

TABLE 33

| | Example 1 | | Example 2 | | Example 3 | |
|---|---|---|---|---|---|---|
| | (6) | (7) | (6) | (7) | (6) | (7) |
| L1 | 3.3 | 123 | 3.4 | 123 | 3.6 | 123 |
| L2 | 1.7 | 692 | 1.4 | 585 | 1.8 | 679 |
| L3 | 1.2 | 588 | 1.0 | 692 | 1.2 | 679 |
| L4 | 0.1 | 515 | 0.0 | 457 | 0.3 | 500 |
| L5 | 0.2 | 498 | 0.1 | 498 | 0.2 | 457 |
| L6 | 0.3 | 457 | 0.2 | 457 | 0.2 | 538 |
| L7 | 0.5 | 589 | 0.4 | 589 | 0.3 | 457 |

TABLE 33-continued

| | Example 1 | | Example 2 | | Example 3 | |
|---|---|---|---|---|---|---|
| | (6) | (7) | (6) | (7) | (6) | (7) |
| L8 | 0.7 | 457 | 0.5 | 457 | 0.5 | 589 |
| L9 | 1.0 | 500 | 0.9 | 500 | 0.6 | 457 |
| L10 | 1.2 | 457 | 1.2 | 457 | 0.9 | 679 |
| L11 | 2.4 | 666 | 2.2 | 692 | 1.1 | 457 |
| L12 | 2.1 | 666 | 1.9 | 666 | 2.4 | 666 |
| L13 | 1.3 | 655 | 1.2 | 655 | 2.2 | 666 |
| L14 | 1.2 | 637 | 1.2 | 644 | 1.4 | 499 |
| L15 | 1.3 | 589 | 1.5 | 692 | 1.3 | 500 |
| L16 | 0.5 | 637 | 1.2 | 679 | 1.3 | 589 |
| L17 | 0.4 | 538 | 0.4 | 498 | 0.8 | 538 |
| L18 | 0.3 | 540 | 0.3 | 404 | 0.7 | 679 |
| L19 | 0.0 | 515 | 0.0 | 515 | 0.0 | 540 |
| L20 | 0.0 | 497 | 0.0 | 601 | 0.0 | 515 |
| L21 | 0.3 | 497 | 0.4 | 497 | 0.1 | 601 |
| L22 | 0.4 | 404 | 0.5 | 404 | 0.4 | 538 |
| L23 | 0.8 | 457 | 0.8 | 457 | 0.4 | 404 |
| L24 | 1.0 | 656 | 0.9 | 588 | 0.9 | 457 |
| L25 | 1.0 | 404 | 1.0 | 404 | 1.1 | 497 |
| L26 | | | | | 1.1 | 404 |

TABLE 34

| | Example 4 | | Example 5 | | Example 6 | | Example 7 | |
|---|---|---|---|---|---|---|---|---|
| | (6) | (7) | (6) | (7) | (6) | (7) | (6) | (7) |
| L1 | 3.3 | 123 | 3.3 | 123 | 3.2 | 123 | 3.5 | 123 |
| L2 | 1.8 | 692 | 1.7 | 692 | 1.7 | 692 | 2.4 | 692 |
| L3 | 1.2 | 588 | 1.2 | 588 | 1.2 | 588 | 1.4 | 588 |
| L4 | 0.0 | 515 | 0.3 | 515 | 0.1 | 515 | 0.5 | 515 |
| L5 | 0.2 | 498 | 0.2 | 498 | 0.2 | 498 | 0.2 | 498 |
| L6 | 0.3 | 457 | 0.3 | 457 | 0.4 | 457 | 0.4 | 457 |
| L7 | 0.6 | 589 | 0.5 | 589 | 0.7 | 589 | 0.6 | 589 |
| L8 | 0.7 | 457 | 0.6 | 457 | 0.8 | 457 | 0.7 | 457 |
| L9 | 1.1 | 500 | 1.0 | 500 | 1.2 | 500 | 1.1 | 500 |
| L10 | 1.3 | 457 | 1.2 | 457 | 1.4 | 457 | 1.3 | 457 |
| L11 | 2.4 | 666 | 2.3 | 666 | 2.5 | 666 | 2.6 | 666 |
| L12 | 2.1 | 666 | 1.9 | 666 | 2.2 | 666 | 2.2 | 666 |
| L13 | 1.3 | 655 | 1.2 | 655 | 1.3 | 655 | 1.3 | 655 |
| L14 | 1.2 | 637 | 1.2 | 637 | 1.2 | 637 | 1.2 | 637 |
| L15 | 1.3 | 589 | 1.2 | 589 | 1.2 | 589 | 1.3 | 589 |
| L16 | 0.4 | 637 | 0.5 | 637 | 0.3 | 637 | 0.4 | 637 |
| L17 | 0.3 | 538 | 0.5 | 538 | 0.3 | 538 | 0.4 | 538 |
| L18 | 0.3 | 540 | 0.3 | 540 | 0.3 | 540 | 0.3 | 540 |
| L19 | 0.0 | 515 | 0.0 | 515 | 0.0 | 515 | 0.0 | 515 |
| L20 | 0.0 | 497 | 0.0 | 497 | 0.0 | 497 | 0.0 | 497 |
| L21 | 0.3 | 497 | 0.3 | 497 | 0.3 | 497 | 0.2 | 497 |
| L22 | 0.3 | 404 | 0.3 | 404 | 0.3 | 404 | 0.3 | 404 |
| L23 | 0.8 | 457 | 0.8 | 457 | 0.8 | 457 | 0.8 | 457 |
| L24 | 0.9 | 656 | 0.9 | 656 | 0.9 | 656 | 0.9 | 656 |
| L25 | 1.0 | 404 | 1.0 | 404 | 1.0 | 404 | 1.0 | 404 |

Second Embodiment

Figure 22:
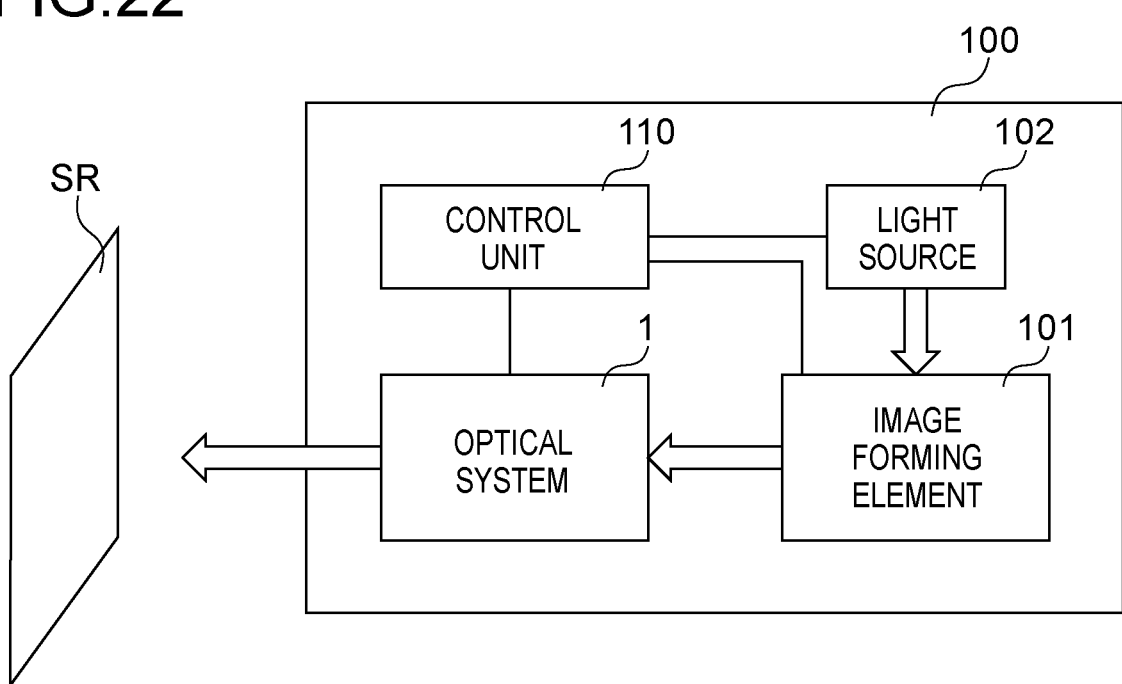
FIG. 22 is a block diagram showing an example of an image projection apparatus according to the present disclosure.

Hereinafter, a second embodiment of the present disclosure is described with reference to FIG. 22. FIG. 22 is a block diagram showing an example of the image projection apparatus according to the present disclosure. The image projection apparatus 100 includes such an optical system 1 as disclosed in the first embodiment, an image forming element 101, a light source 102, a control unit 110, and others. The image forming element 101 is constituted of, for example, liquid crystal or DMD, for generating an image to be projected through the optical system 1 onto a screen SR. The light source 102 is constituted of such as a light emitting diode (LED) or a laser, and supplies light to the image forming element 101. The control unit 110 is constituted of, for example, central processing unit (CPU) or micro-processing unit (MPU), for controlling the entire apparatus and respective components. The optical system 1 may be configured as an interchangeable lens that can be detachably attached to the image projection apparatus 100. In this case, an apparatus in which the optical system 1 is removed from the image projection apparatus 100 is an example of a main body apparatus.

The image projection apparatus 100 described above can realize a wide-angle zoom function while reducing a moment acting on the center of gravity and mitigating thermal effect by employing the optical system 1 according to the first embodiment.

Third Embodiment

Figure 23:
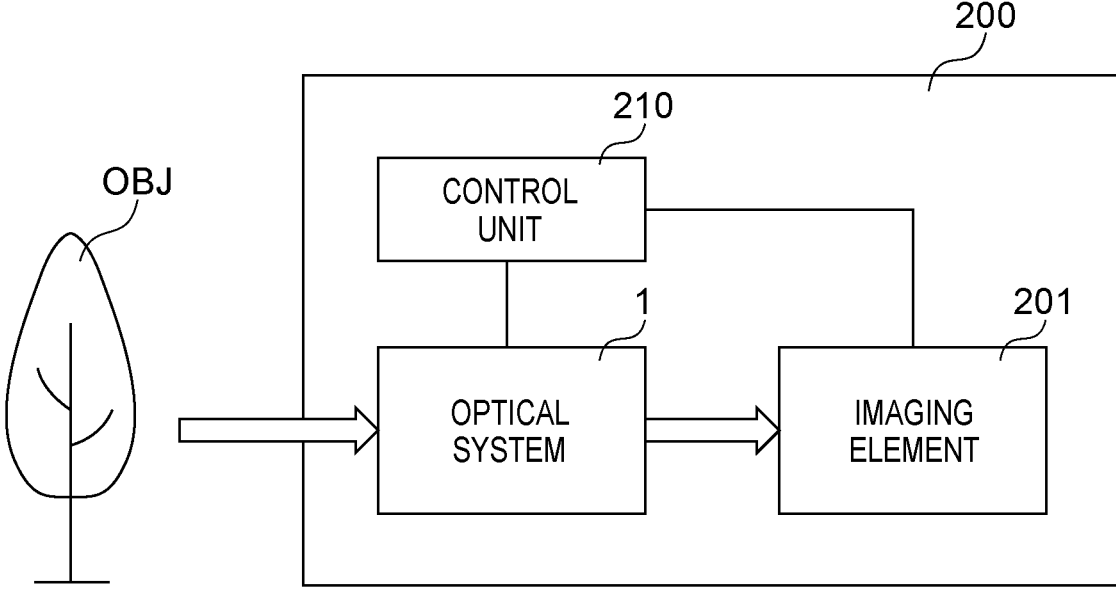
FIG. 23 is a block diagram showing an example of an imaging apparatus according to the present disclosure.

Hereinafter, a third embodiment of the present disclosure is described with reference to FIG. 23. FIG. 23 is a block diagram showing an example of the imaging apparatus according to the present disclosure. The imaging apparatus 200 includes such an optical system 1 as disclosed in the first embodiment, an imaging element 201, a control unit 210, and others. The imaging element 201 is constituted of, for example, charge coupled device (CCD) image sensor or complementary metal oxide semiconductor (CMOS) image sensor, for receiving an optical image of an object OBJ formed by the optical system 1 to convert the image into an electrical image signal. The control unit 110 is constituted of, for example, CPU or MPU, for controlling the entire apparatus and respective components. The optical system 1 may be configured as an interchangeable lens that can be detachably attached to the imaging apparatus 200. In this case, an apparatus in which the optical system 1 is removed from the imaging apparatus 200 is an example of a main body apparatus.

The imaging apparatus 200 described above can realize a wide-angle zoom function while reducing a moment acting on the center of gravity and mitigating thermal effect by employing the optical system 1 according to the first embodiment.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An optical system internally having an intermediate imaging position at which an intermediate image is formed, the intermediate imaging position being conjugate to a magnification conjugate point on a magnification side and a reduction conjugate point on a reduction side, respectively, the optical system comprising:

a magnification optical system having a plurality of lens elements, positioned on the magnification side with respect to the intermediate imaging position; and a relay optical system having a plurality of lens elements, positioned on the reduction side with respect to the intermediate imaging position, wherein a first lens element located closest to the magnification side among the plurality of lens elements in the magnification optical system is an aspherical lens having a negative power, the optical system simultaneously satisfies the following conditions (1) to (3):

wherein the plurality of lens elements include a lens element that satisfies both of the conditions (6) and (7) and one lens element that does not satisfy both of the conditions (6) and (7):

$$0.0055 < \Delta pgfn < 0.030 \qquad (1)$$

$$53 < vdn < 58 \qquad (2)$$

$$0.28 < fp/fr < 1.0 \qquad (3)$$

$$|ym/(fw \cdot \tan(\omega m))| < 3.0 \qquad (6)$$

$$Tg > 300° \text{ C.} \qquad (7)$$

where, $\Delta pgfn = (ngn - nfn)/(nfn - ncn) - (-2.20599 \times 10^{-3} \cdot vdn + 6.69612 \times 10^{-1})$, vdn is an Abbe number of the first lens element, ngn is a refractive index of the first lens element for a g-line, nfn is a refractive index of the first lens element for an F-line, non is a refractive index of the first lens element for a C-line, fp is a focal length of the magnification optical system, and fr is a focal length of the relay optical system at a wide-angle end, where, fw is a focal length of the entire optical system at the wide-angle end, om is a maximum half angle of view at the wide-angle end, ym is a height at the telephoto end at which the most off-axis main ray passes through a lens surface, and Tg is a glass transition point of lens material.

2. The optical system according to claim 1, wherein the first lens element has a first lens magnification side aspherical surface facing the magnification side and a first lens reduction side aspherical surface facing the reduction side, and the first lens magnification side aspherical surface and the first lens reduction side aspherical surface satisfies the following condition (8):

$$dZ(r)/dr > 0 \qquad (8)$$

where, r is a distance (r>0) from a vertex of a surface along a plane perpendicular to an optical axis of the optical system, and Z(r) is an amount of sag of the surface (in case that Z=0 at the vertex (r=0), where Z has a sign + for reduction side displacement with respect to the vertex, and a sign − for magnification side displacement).

3. The optical system according to claim 1, satisfying the following condition (9):

$$0.5 < |(L1R1 + L1R2)/(L1R2 - L1R1)| < 5.0 \qquad (9)$$

where, L1R1 is a center curvature radius of a first lens magnification side surface, and L1R2 is a center curvature radius of a first lens reduction side surface.

4. The optical system according to claim 1, wherein a second lens element is arranged on the reduction side of the first lens element, and the optical system satisfies the following condition (10):

$$1.2 < |T1/fw| < 10.0 \qquad (10)$$

where, T1 is an air distance between the first lens element and the second lens element, and fw is a focal length of the entire optical system at the wide-angle end.

5. The optical system according to claim 1, satisfying the following condition (11):

$$10.0 < |f1/fw| < 16.0 \qquad (11)$$

where, f1 is a focal length of the first lens element, and fw is a focal length of the entire optical system at the wide-angle end.

6. The optical system according to claim 1, satisfying the following condition (12):

$$-8.0 < f1/Ymax < -1.0 \qquad (12)$$

where, f1 is a focal length of the first lens element, and Ymax is a maximum image height.

7. The optical system according to claim 1, satisfying the following condition (13):

$$1.5 < |f1/fp| < 10.0 \qquad (13)$$

where, f1 is a focal length of the first lens element.

8. The optical system according to claim 1, satisfying the following condition (14):

$$1.0 < |L1R1/L1R2| < 10.0 \qquad (14)$$

where, L1R1 is a center curvature radius of the first lens magnification side surface, and L1R2 is a center curvature radius of the first lens reduction side surface.

9. The optical system according to claim 1, satisfying the following condition (15):

$$0.1 < TL1/Ymax < 5.0 \qquad (15)$$

where, TL1 is a center thickness of the first lens element, and Ymax is a maximum image height.

10. The optical system according to claim 1, satisfying the following condition (16):

$$4 < L1R1/Ymax < 10.5 \qquad (16)$$

where, L1R1 is a center curvature radius of the first lens magnification side surface, and Ymax is a maximum image height.

11. The optical system according to claim 1, wherein during zooming the magnification optical system is fixed, and a part or all of the plurality of lens elements in the relay optical system is displaced along an optical axis.

12. An image projection apparatus comprising:
the optical system according to claim 1; and
an image forming element that generates an image to be projected through the optical system onto a screen.

13. An imaging apparatus comprising:
the optical system according to claim 1; and
an imaging element that receives an optical image formed by the optical system to convert the optical image into an electrical image signal.

14. The optical system according to claim 1, satisfying the following conditions (4) and (5):

$$7 < |Ts/fw| < 15 \tag{4}$$

$$2 < |Tpr/fw| < 7 \tag{5}$$

where, Ts is the longest air distance along an optical axis in the magnification optical system, fw is the focal length of the entire optical system at the wide-angle end, and Tpr is a distance from a surface closest to the magnification side of the magnification optical system rear group to the intermediate imaging position.

* * * * *